(12) United States Patent
Wang et al.

(10) Patent No.: US 6,726,823 B1
(45) Date of Patent: Apr. 27, 2004

(54) METHODS AND APPARATUS FOR HOLDING AND POSITIONING SEMICONDUCTOR WORKPIECES DURING ELECTROPOLISHING AND/OR ELECTROPLATING OF THE WORKPIECES

(75) Inventors: Hui Wang, Fremont, CA (US); Felix Gutman, San Jose, CA (US); Voha Nuch, San Jose, CA (US)

(73) Assignee: ACM Research, Inc., Fremont, CA (US)

( * ) Notice: Subject to any disclaimer, the term of this patent is extended or adjusted under 35 U.S.C. 154(b) by 0 days.

(21) Appl. No.: 09/856,855

(22) PCT Filed: Nov. 24, 1999

(86) PCT No.: PCT/US99/28106
§ 371 (c)(1),
(2), (4) Date: May 23, 2001

(87) PCT Pub. No.: WO00/33356
PCT Pub. Date: Jun. 8, 2000

Related U.S. Application Data

(60) Provisional application No. 60/110,136, filed on Nov. 28, 1998.

(51) Int. Cl.[7] .............................. C25D 5/00; C25D 5/02; C25D 17/00; C25D 17/04; C25F 3/16

(52) U.S. Cl. .................. 205/80; 205/157; 205/640; 204/224 R; 204/224 M; 204/297.01; 204/297.14; 269/58

(58) Field of Search ................. 204/297.03, 297.14, 204/297.01, 224 R, 224 M; 205/157

(56) References Cited

U.S. PATENT DOCUMENTS

| | | | |
|---|---|---|---|
| 5,324,410 A | 6/1994 | Kummer et al. | |
| 5,405,518 A | 4/1995 | Hsieh et al. | |
| 5,932,077 A | 8/1999 | Reynolds | |
| 5,980,706 A | 11/1999 | Bleck et al. | |
| 6,416,647 B1 * | 7/2002 | Dordi et al. | 205/137 |
| 6,495,007 B2 * | 12/2002 | Wang | 204/297.01 |

FOREIGN PATENT DOCUMENTS

EP   0 831 526 A2   3/1998

* cited by examiner

Primary Examiner—Donald R. Valentine
(74) Attorney, Agent, or Firm—Morrison & Foerster/LLP

(57) ABSTRACT

A wafer chuck assembly for holding a wafer during electroplating and/or electropolishing of the wafer includes a wafer chuck for receiving the wafer. The wafer chuck assembly also includes an actuator assembly for moving the wafer chuck between a first and a second position. When in the first position, the wafer chuck is opened. When in the second position, the wafer chuck is closed.

150 Claims, 55 Drawing Sheets

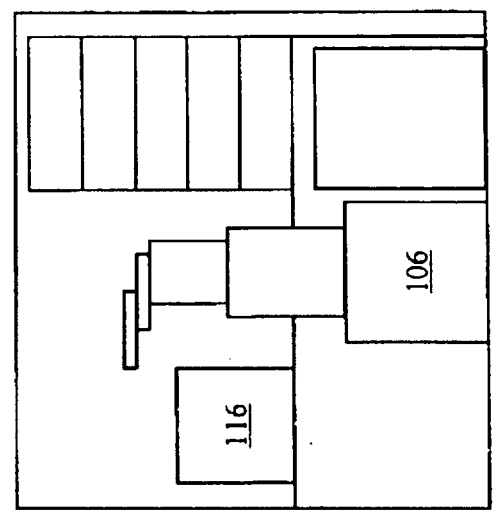
Fig. 3
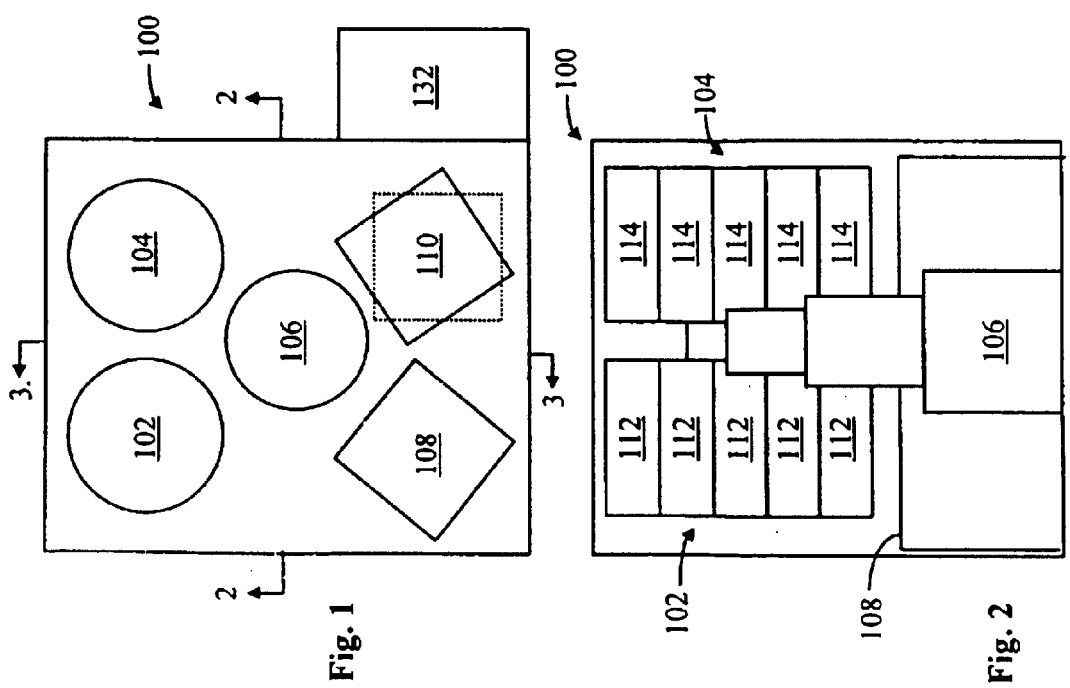
Fig. 1
Fig. 2

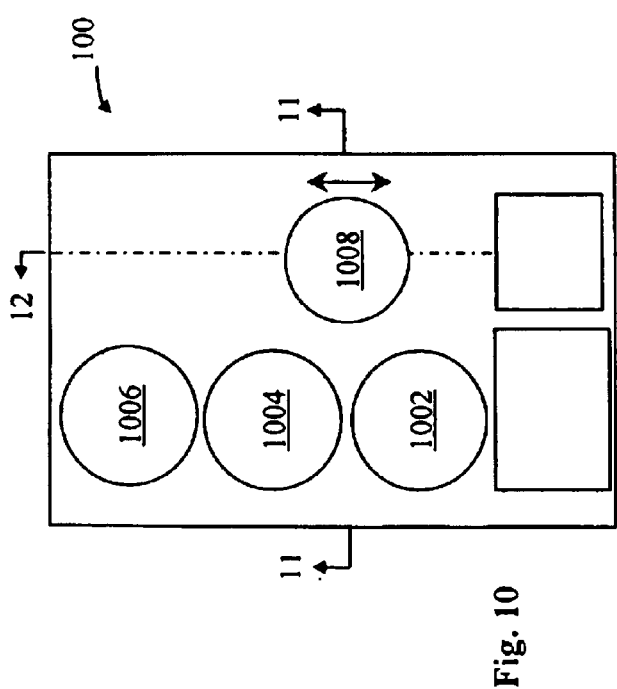
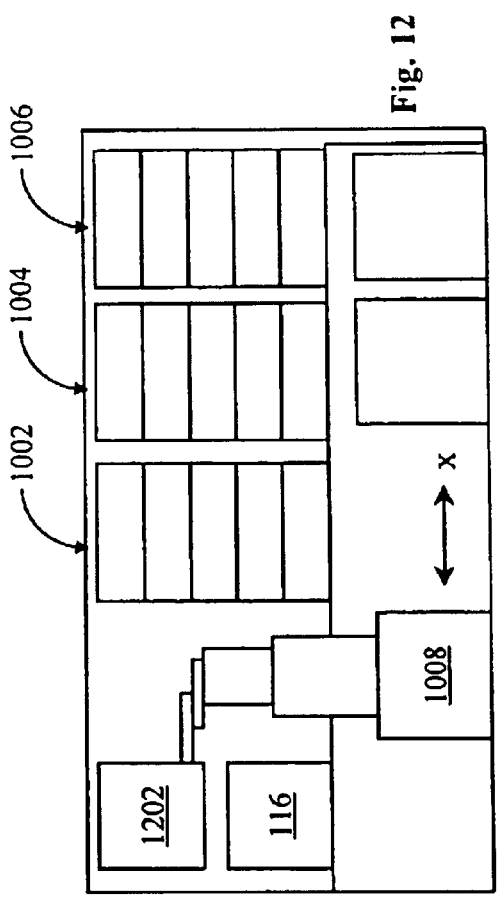
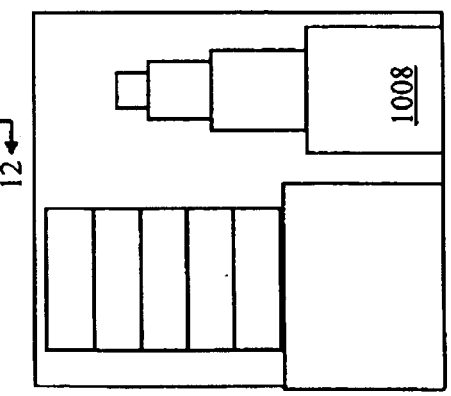
Fig. 10
Fig. 11
Fig. 12

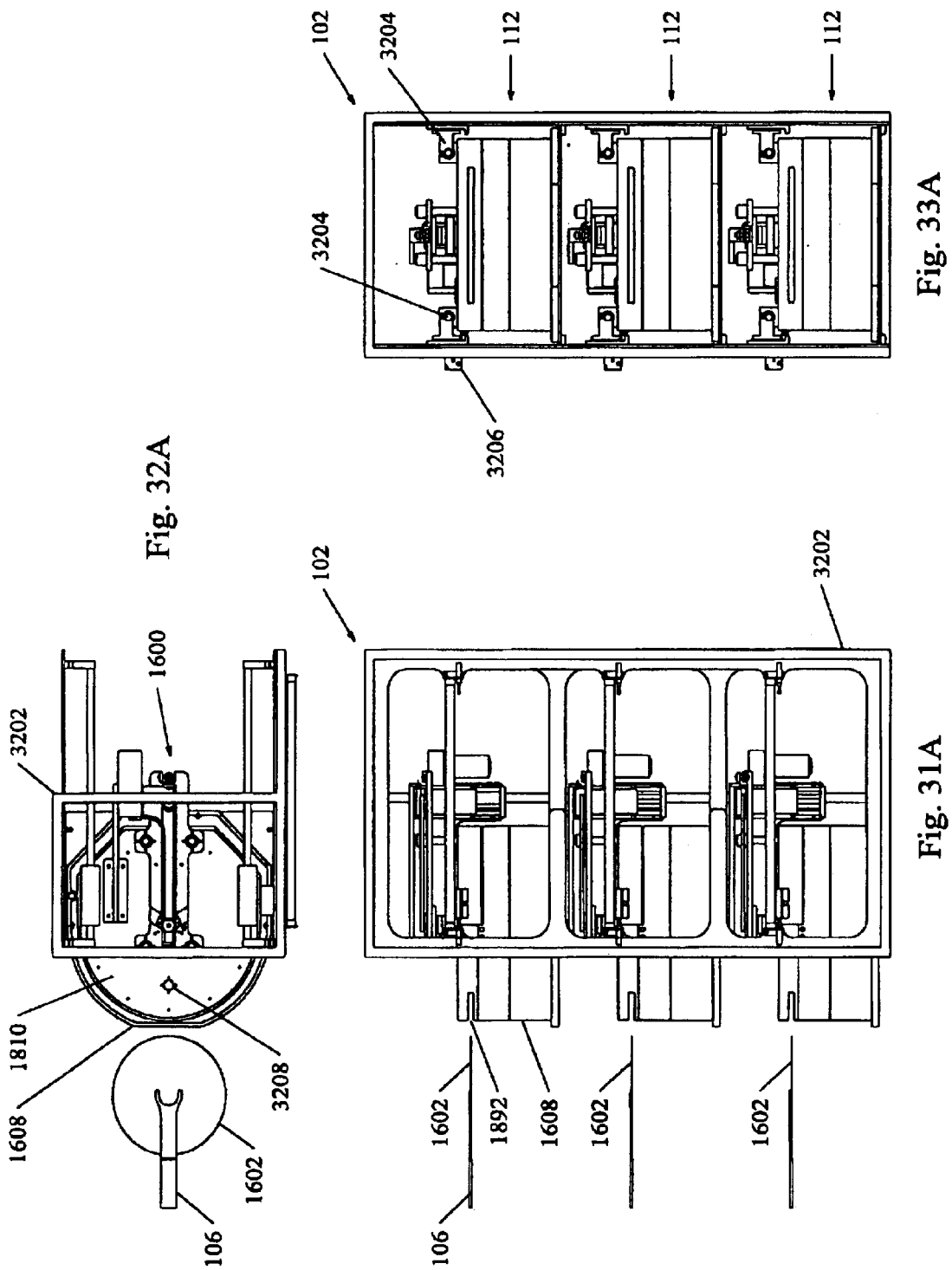

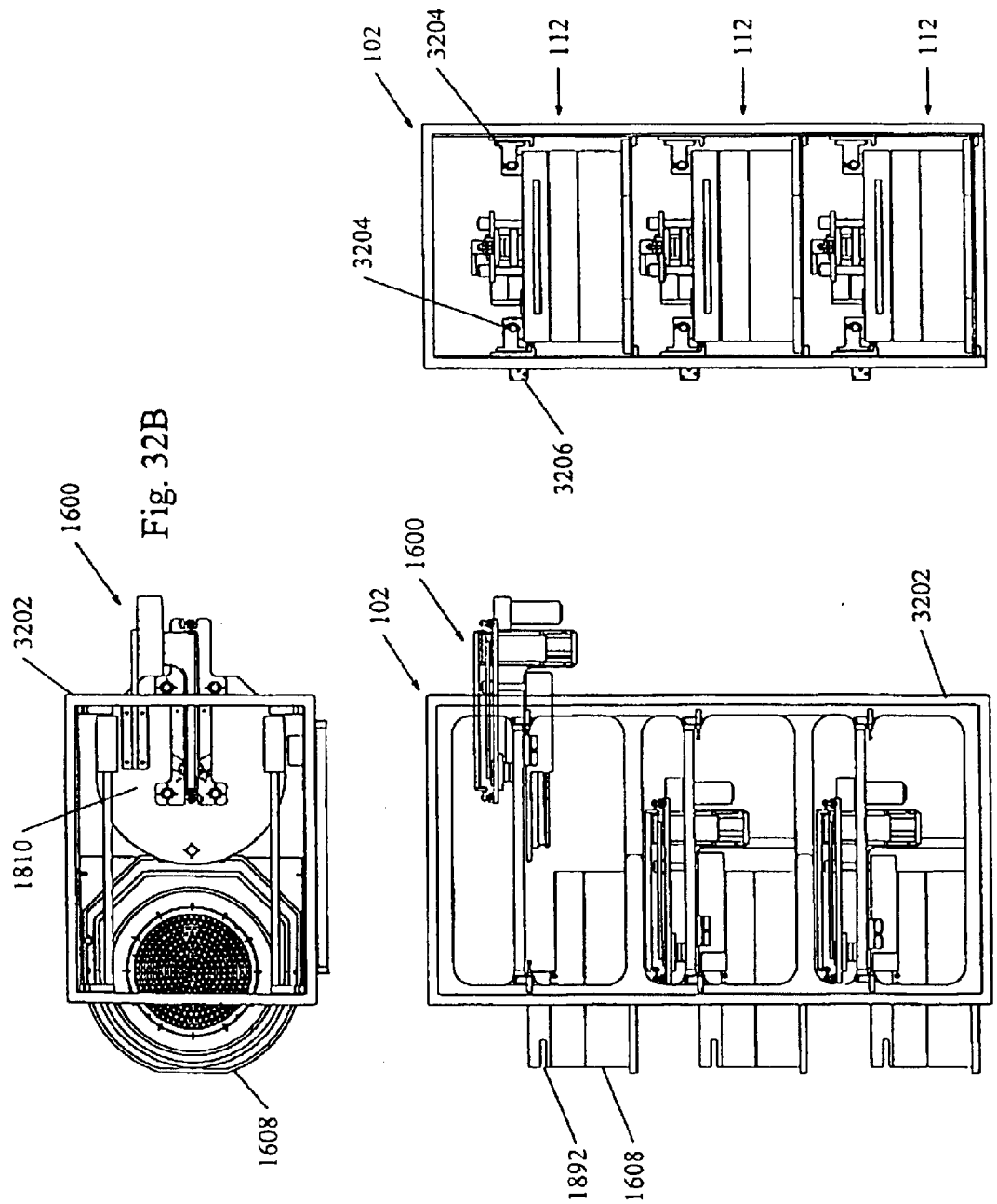

METHODS AND APPARATUS FOR HOLDING AND POSITIONING SEMICONDUCTOR WORKPIECES DURING ELECTROPOLISHING AND/OR ELECTROPLATING OF THE WORKPIECES

This application claims benefit of provisional application Ser. No. 60/110,136 filed Nov. 28, 1998 now abandoned.

BACKGROUND OF THE INVENTION

1. Field of the Invention

The present invention generally relates to methods and apparatus for holding and positioning semiconductor workpieces during processing of the workpieces. More particularly, the present invention relates to methods and apparatus for holding and positioning semiconductor workpieces during electroplating and/or electropolishing of semiconductor workpieces.

2. Description of the Related Art

In general, semiconductor devices are manufactured or fabricated on disks of semiconducting materials called wafers or slices. More particularly, wafers are initially sliced from a silicon ingot. The wafers then undergo multiple masking, etching, and deposition processes to form the electronic circuitry of semiconductor devices.

During the past decades, the semiconductor industry has increased the power of semiconductor devices in accordance with Moore's law, which predicts that the power of semiconductor devices will double every 18 months. This increase in the power of semiconductor devices has been achieved in part by decreasing the feature size (i.e., the smallest dimension present on a device) of these semiconductor devices. In fact, the feature size of semiconductor devices has quickly gone from 0.35 microns to 0.25 microns, and now to 0.18 microns. Undoubtedly, this trend toward smaller semiconductor devices is likely to proceed well beyond the sub-0.18 micron stage.

However, one potential limiting factor to developing more powerful semiconductor devices is the increasing signal delays at the interconnections (the lines of conductors, which connect elements of a single semiconductor device and/or connect any number of semiconductor devices together). As the feature size of semiconductor devices has decreased, the density of interconnections on the devices has increased. However, the closer proximity of interconnections increases the line-to-line capacitance of the interconnections, which results in greater signal delay at the interconnections. In general, interconnection delays have been found to increase with the square of the reduction in feature size. In contrast, gate delays (i.e., delay at the gates or mesas of semiconductor devices) have been found to increase linearly with the reduction in feature size.

One conventional approach to compensate for this increase in interconnection delay has been to add more layers of metal. However, this approach has the disadvantage of increasing production costs associated with forming the additional layers of metal. Furthermore, these additional layers of metal generate additional heat, which can be adverse to both chip performance and reliability.

Consequently, the semiconductor industry has started to use copper rather than aluminum to form the metal interconnections. One advantage of copper is that it has greater conductivity than aluminum. Also, copper is less resistant to electromigration (meaning that a line formed from copper will have less tendency to thin under current load) than aluminum.

However, before copper can be widely used by the semiconductor industry, new processing techniques are required. More particularly, a copper layer may be formed on a wafer using an electroplating process and/or etched using an electropolishing process. In general, in an electroplating and/or an electropolishing process, the wafer is held within an electrolyte solution and an electric charge is then applied to the wafer. Thus, a wafer chuck is needed for holding the wafer and applying the electric charge to the wafer during the electroplating and/or electropolishing process.

SUMMARY OF THE INVENTION

In an exemplary embodiment of the present invention, a wafer chuck assembly for holding a wafer during electroplating and/or electropolishing of the wafer includes a wafer chuck for receiving the wafer. The wafer chuck assembly also includes an actuator assembly for moving the wafer chuck between a first and a second position. When in the first position, the wafer chuck is opened. When in the first position, the wafer chuck is closed.

DESCRIPTION OF THE DRAWING FIGURES

The subject matter of the present invention is particularly pointed out and distinctly claimed in the concluding portion of the specification. The present invention, however, both as to organization and method of operation, may best be understood by reference to the following description taken in conjunction with the claims and the accompanying drawing figures, in which like parts may be referred to by like numerals:

FIG. 1 is a top view of an exemplary embodiment of a wafer-processing tool;

FIG. 2 is a cross sectional view of the wafer-processing tool shown in FIG. 1 taken through line 2—2;

FIG. 3 is another cross sectional view of the wafer-processing tool shown in FIG. 1 taken through line 3—3;

FIG. 10 is a top view of yet another alternative configuration of the wafer-processing tool shown in FIG. 1;

FIG. 11 is a cross sectional view of the wafer-processing tool shown in FIG. 10 taken through line 11—11;

FIG. 12 is another cross sectional view of the wafer-processing tool shown in FIG. 10 taken through line 12—12;

FIGS. 31A and 31B are side views of an alternative configuration of an electroplating and/or electropolishing station shown in FIG. 16;

FIGS. 32A and 32B are top views of the electroplating and/or electropolishing station shown in FIGS. 31A and 31B;

FIGS. 33A and 33B are front views of the electroplating and/or electropolishing station shown in FIGS. 31A and 31B;

DETAILED DESCRIPTION OF EXEMPLARY EMBODIMENTS

Figure 4:
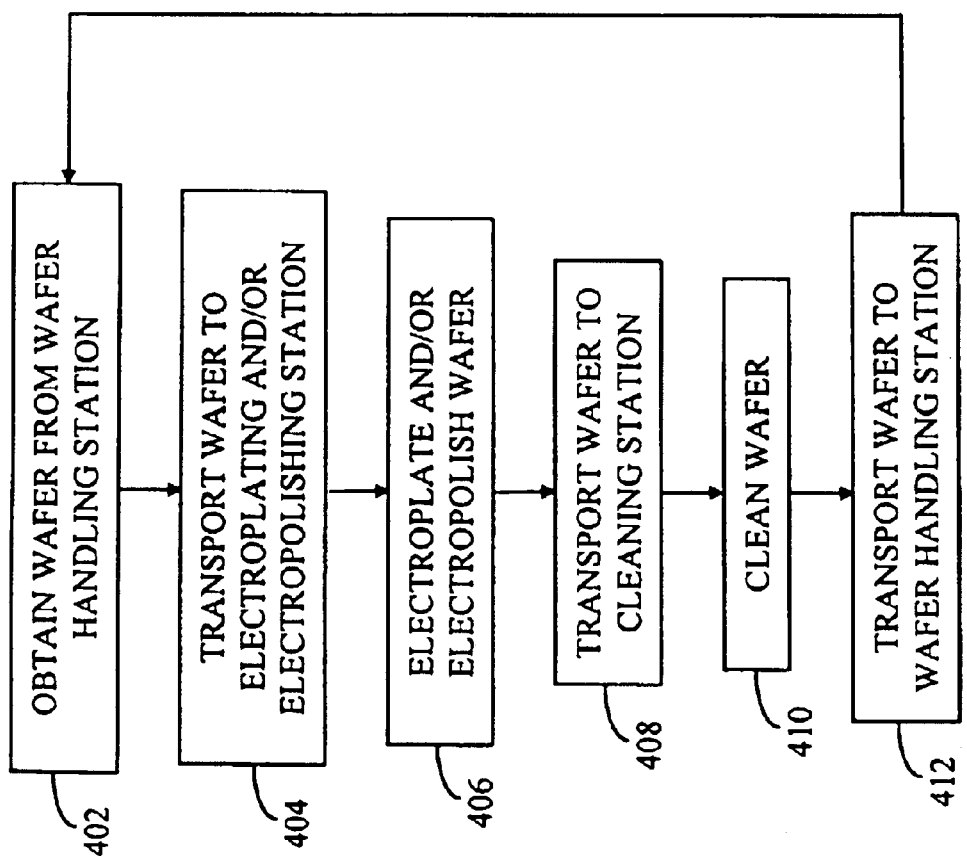
FIG. 4 is a flow chart for processing wafers using the wafer-processing tool shown in FIG. 1.

In order to provide a more thorough understanding of the present invention, the following description sets forth numerous specific details, such as specific material, parameters, and the like. It should be recognized, however, that such description is not intended as a limitation on the scope of the present invention, but is instead provided to enable a more full and a more complete description of the exemplary embodiments.

Additionally, the subject matter of the present invention is particularly suited for use in connection with electroplating and/or electropolishing of semiconductor workpieces or wafers. As a result, exemplary embodiments of the present invention are described in that context. It should be recognized, however, that such description is not intended as a limitation on the use or applicability of the present invention. Rather, such description is provided to enable a more full and a more complete description of the exemplary embodiments.

With reference now to FIG. 1, a wafer-processing tool 100 is configured to electroplate and/or electropolish semiconductor workpieces or wafers. In an exemplary embodiment, wafer-processing tool 100 includes an electroplating and/or electropolishing station 102, a cleaning station 104, wafer-handling stations 108 and 110, and a robot 106.

With reference now to FIG. 4, the processing steps performed by wafer-processing tool 100 are set forth in a flow chart format. With reference again to FIG. 1, unprocessed semiconductor workpieces or wafers are obtained by robot 106 from wafer-handling stations 108 and 110 (FIG. 4, block 402). The wafers are transported by robot 106 from wafer-handling stations 108 and 110 to electroplating and/or electropolishing station 102 (FIG. 4, block 404). As will be described in greater detail below, the wafers are electroplated and/or electropolished in electroplating and/or electropolishing station 102 (FIG. 4, block 406). The electroplated and/or electropolished wafers are transported by robot 106 to cleaning station 104 (FIG. 4, block 408). The wafers are cleaned and dried in cleaning station 104 (FIG. 4, block 410). The cleaned and dried wafers are transported by robot 106 back to wafer-handling stations 108 and 110 (FIG. 4, block 412). The entire process can then be repeated for another unprocessed wafer. It should be recognized, however, that various modifications can be made to the steps depicted in FIG. 4 and described above without deviating from the scope of the present invention.

With reference now to FIG. 2, in the present exemplary embodiment, electroplating and/or electropolishing station 102 and cleaning station 104 include five electroplating and/or electropolishing cells 112 and five cleaning cells 114. Accordingly, as many as five wafers can be electroplated and/or electropolished and cleaned at one time. It should be recognized, however, that electroplating and/or electropolishing station 102 and cleaning station 104 can include any number of electroplating and/or electropolishing cells 112 and cleaning cells 114 depending on the particular application. For example, for a low volume application, electroplating and/or electropolishing station 102 and cleaning station 104 can be configured with one electroplating and/or electropolishing cell 112 and one cleaning cell 114, respectively. Additionally, it should be recognized that the ratio of electroplating and/or electropolishing cells 112 to cleaning cells 114 can vary depending on the particular application. For example, in an application where the electroplating and/or electropolishing process requires more processing time than the cleaning process, wafer-processing tool 100 can be configured with more electroplating and/or electropolishing cells 112 than cleaning cells 114. Alternatively, in an application where the electroplating and/or electropolishing process requires less processing time than the cleaning process, wafer-processing tool 100 can be configured with fewer electroplating and/or electropolishing cells 112 than cleaning cells 114.

As depicted in FIG. 2, electroplating and/or electropolishing cells 112 and cleaning cells 114 are configured as vertical stacks. In this manner, the number of wafers processed can be increased without increasing the footprint of (the amount of floor space occupied by) wafer-processing tool 100. In the increasingly competitive semiconductor industry, increasing the ratio of wafers processed per square foot of fabrication floor space occupied by wafer-processing tool 100 can be advantageous.

With reference again to FIG. 1, as described above unprocessed wafers are obtained at wafer-handling station 108 and 110, then processed wafers are returned to wafer-handling stations 108 and 110. More particularly, with reference to FIG. 3, in the present exemplary embodiment, wafer-handling station 108 and 110 (FIG. 1) include a wafer cassette 116 for holding wafers. As depicted in FIG. 3, robot 106 is configured to remove an unprocessed wafer from wafer cassette 116 and transport the wafer to any one of the electroplating and/or electropolishing cells 112 (FIG. 2). Robot 106 is also configured to return a processed wafer from any one of the cleaning cells 114 (FIG. 2) to wafer cassette 116. Although a single wafer cassette 116 is depicted in FIG. 3, it should be recognized that wafer-handling station 108 and 110 (FIG. 1) can include any number of wafer cassettes 116.

Additionally, wafer-handling station 108 and 110 can include various configurations depending on the particular application. For example, wafer-handling station 108 and 110 can each include at least one wafer cassette 116. In one configuration, a wafer cassette 116 containing unprocessed wafers is provided at wafer-handling station 108. The wafers are removed, processed, then returned to the same wafer cassette 116 at wafer-handling station 108. Prior to the completion of the processing of wafers from wafer cassette 116 at wafer-handling station 108, another wafer cassette 116 containing unprocessed wafers is provided at wafer-handling station 110. Once the wafers from wafer cassette 116 at wafer-handling station 108 are processed, wafer-processing tool 100 can begin processing the unprocessed wafers from wafer cassette 116 at wafer-handling station 110. The processed wafers in wafer cassette 116 at wafer-handling station 108 can then be removed and replaced with yet another wafer cassette 116 containing unprocessed wafers. In this manner, wafer-processing tool 100 can be operated continuously without unintended interruption.

In another configuration, a wafer cassette 116 containing unprocessed wafer can be provided at wafer-handling station 108. An empty wafer cassette 116 can be provided at wafer-handling station 110. The unprocessed wafers from wafer cassette 116 at wafer-handling station 108 can be processed then returned to the empty wafer cassette 116 at wafer-handling station 110. This configuration also facilitates continuously operation of processing tool 100. This configuration, however, has the advantage that one of the two handling stations 108 and 110 can be designated for unprocessed wafers and the other for processed wafers. In this manner, an operator or a robot is less likely to mistake a wafer cassette 116 containing processed wafers for one with unprocessed wafers and vice versa With reference again to FIG. 2, wafer-processing tool 100 includes housing unit 118 for housing the various electrical and mechanical components of wafer-processing tool 100, such as power supplies, filters, wires, plumbing, chemical containers, pumps, valves, and the like. With reference again to FIG. 1, wafer-processing tool 100 can also include a computer 132 for controlling the operation of wafer-processing tool 100. More particularly, computer 132 can be configured with an appropriate software program to implement the processing steps set forth in FIG. 4 and described above in conjunction with FIG. 4.

It should be recognized that various modifications can be made to the configuration of wafer-processing tool 100 without deviating from the spirit and/or scope of the present invention. In this regard, in the following description and associated drawings, various alternative embodiments of the present invention will be described and depicted. It should be recognized, however, that these alternative embodiments are not intended to demonstrate all of the various modifications, which can be made to the present invention. Rather, these alternative embodiments are provided to demonstrate only some of the many possible modifications.

Figure 7:
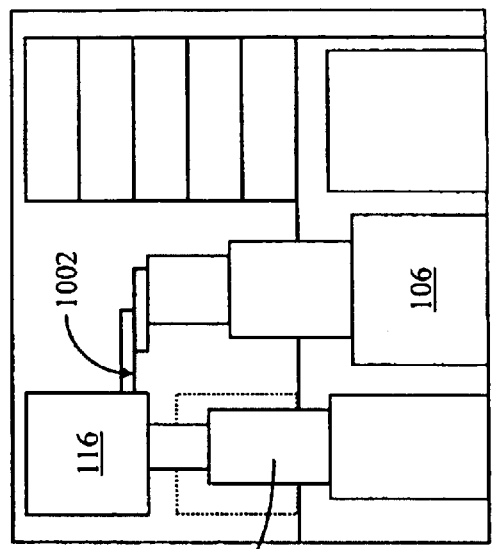
FIG. 7 is another cross sectional view of the wafer-processing tool shown in FIG. 5 taken through line 7—7.
Figure 5:
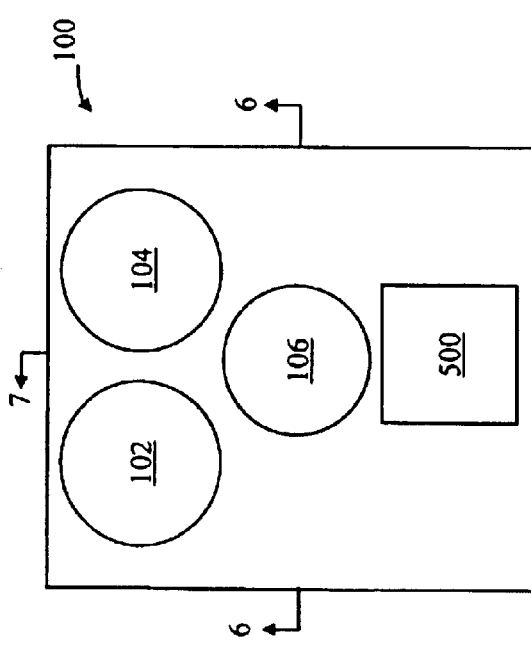
FIG. 5 is a top view of an alternative configuration of the wafer-processing tool shown in FIG. 1.
Figure 6:
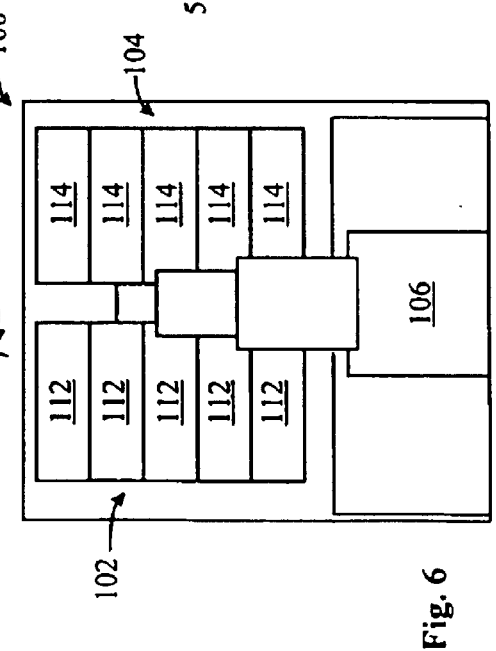
FIG. 6 is a cross sectional view of the wafer-processing tool shown in FIG. 5 taken through line 6—6.

With reference to FIGS. 5 through 7, in an alternative embodiment of the present invention, wafer-processing tool 100 includes a wafer-handling station 500. With reference to FIG. 7, wafer-handling station 500 includes a robot 502 configured to raise and lower wafer cassette 116. Accordingly, when transporting wafers in and out of wafer cassette 116, the movement of robot 106 in the vertical direction can be reduced. In this manner, the operating speed of robot 106 can be increased to facilitate overall processing speed of wafer-processing tool 100.

Figure 8:
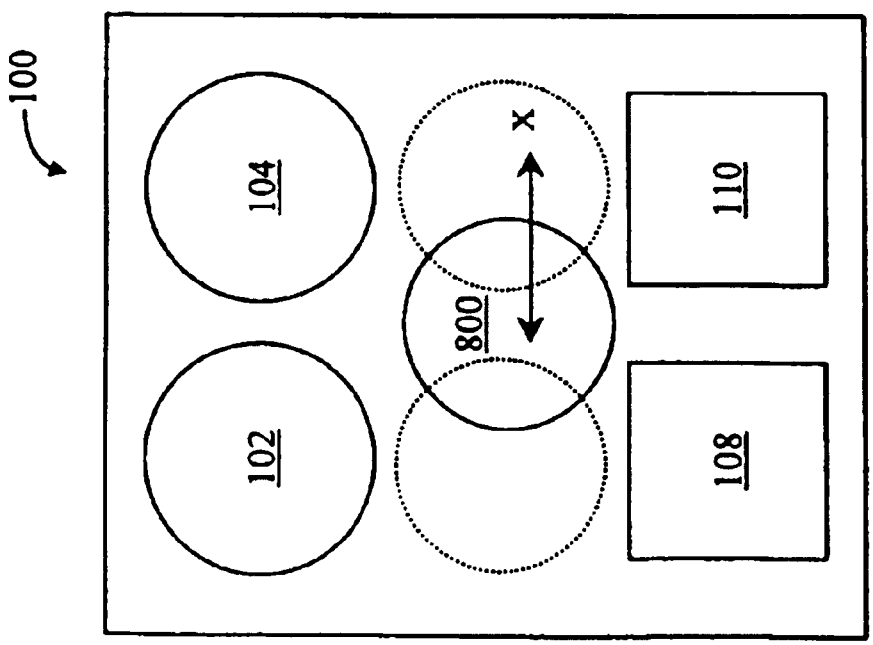
FIG. 8 is a top view of another alternative configuration of the wafer-processing tool shown in FIG. 1.

With reference to FIG. 8, in another alternative embodiment of the present invention, wafer-processing tool 100 includes a robot 800 configured to move laterally (indicated as the x-direction in FIG. 8). Accordingly, robot 800 need not rotate about its vertical axis.

Figure 9:
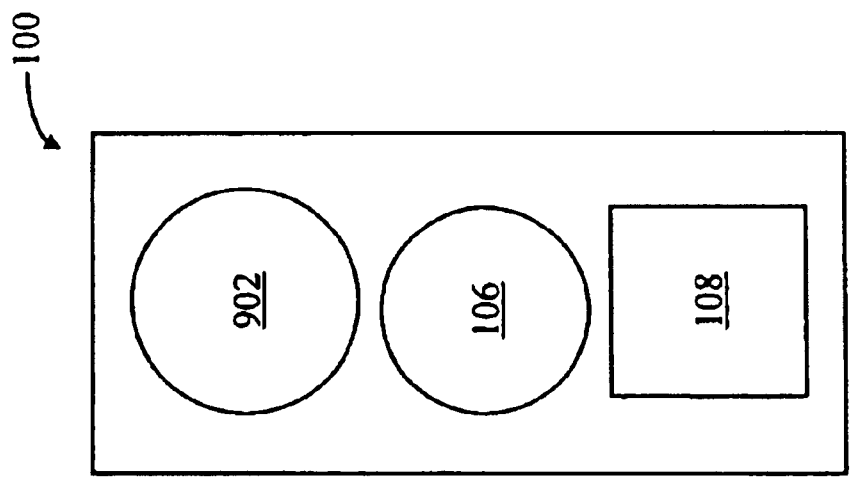
FIG. 9 is a top view of still another alternative configuration of the wafer-processing tool shown in FIG. 1.

With reference to FIG. 9, in still another alternative embodiment of the present invention, wafer-processing tool 100 includes a stack 902 of electroplating and/or electropolishing cells 112 (FIG. 2) and cleaning cells 114 (FIG. 2). Accordingly, the footprint of processing tool 100 can be further reduced.

With reference to FIGS. 10 through 12, in yet another alternative embodiment of the present invention, wafer-processing tool 100 includes three stacks 1002, 1004 and 1006 of electroplating and/or electropolishing cells 112 (FIG. 12) and cleaning cells 114 (FIG. 12). It should be recognized that stacks 1002, 1004 and 1006 can be configured having various combinations of electroplating and/or electropolishing cells 112 depending on the particular application. For example, column 1002 and 1006 can be configured to include only electroplating and/or electropolishing cells 112. Column 1004 can be configured to include only cleaning cells 114. Alternatively, each column 1002, 1004 and 1006 can be configured with combinations of electroplating and/or electropolishing cells 112 and cleaning cells 114. Wafer-processing tool 100 also includes robot 1008 configured to move laterally (indicated as the y-direction in FIG. 10). With reference to FIG. 12, wafer-processing tool 100 includes additional wafer cassette 1202 to accommodate the additional processing capacity of wafer-processing tool 100.

Thus far, wafer-processing tool 100 has been described with an electroplating and/or electropolishing station 102 (FIG. 1) and cleaning station 104 (FIG. 2). It should be recognized, however, that wafer-processing tool 100 can be configured to include only electroplating and/or electropolishing station 102 (FIG. 1). For example, with reference to FIG. 9, wafer-processing tool 100 can be configured with stack 902 having only electroplating and/or electropolishing cells 112 (FIG. 1). Accordingly, wafer-processing tool 100 electroplates and/or electropolishes wafers without cleaning the wafers. The processed wafers can be cleaned in a separate wafer-cleaning tool. Alternatively, the processed wafers can be cleaned in a cleaning station in another wafer-processing tool.

Figure 13:
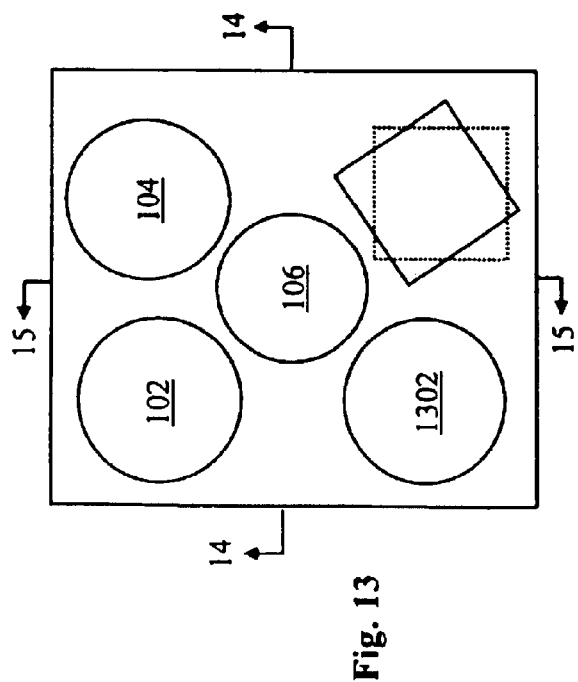
FIG. 13 is another alternative configuration of the wafer-processing tool shown in FIG. 1.
Figure 14:
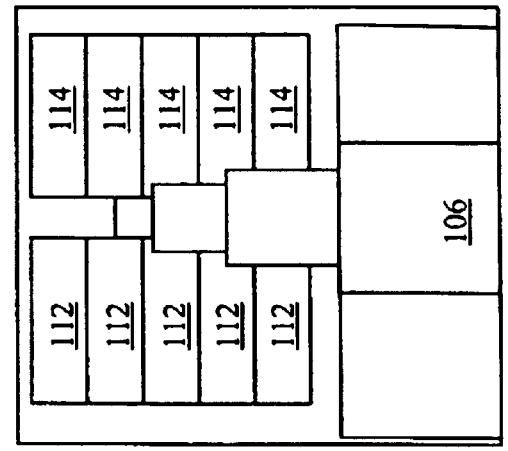
FIG. 14 is a cross sectional view of the wafer-processing tool shown in FIG. 13 taken through line 14—14.
Figure 15:
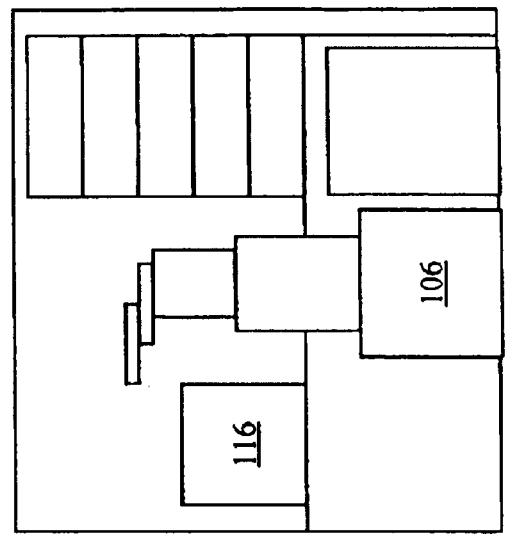
FIG. 15 is another cross sectional view of the wafer-processing tool shown in FIG. 13 taken through line 15—15.

Additionally, wafer-processing tool 100 can include other wafer processing stations. For example, with reference to FIGS. 13 through 15, in another embodiment of the present invention, wafer-processing tool 100 includes a Chemical Mechanical Planarization (CMP) station 1302. In this manner, wafers can be planarized and/or polished in addition to being electroplated and/or electropolished and cleaned. The particular order of performing these processes can vary depending on the particular application. For example, in one application, the wafer can be electroplated at electroplating and/or electropolishing station 102, cleaned at cleaning station 104, then planarized at CMP station 1302. In another application, the wafer can be initially electropolished at electroplated and/or electropolishing station 102, cleaned at cleaning station 104, then planarized at CMP station 1302.

Figure 16:
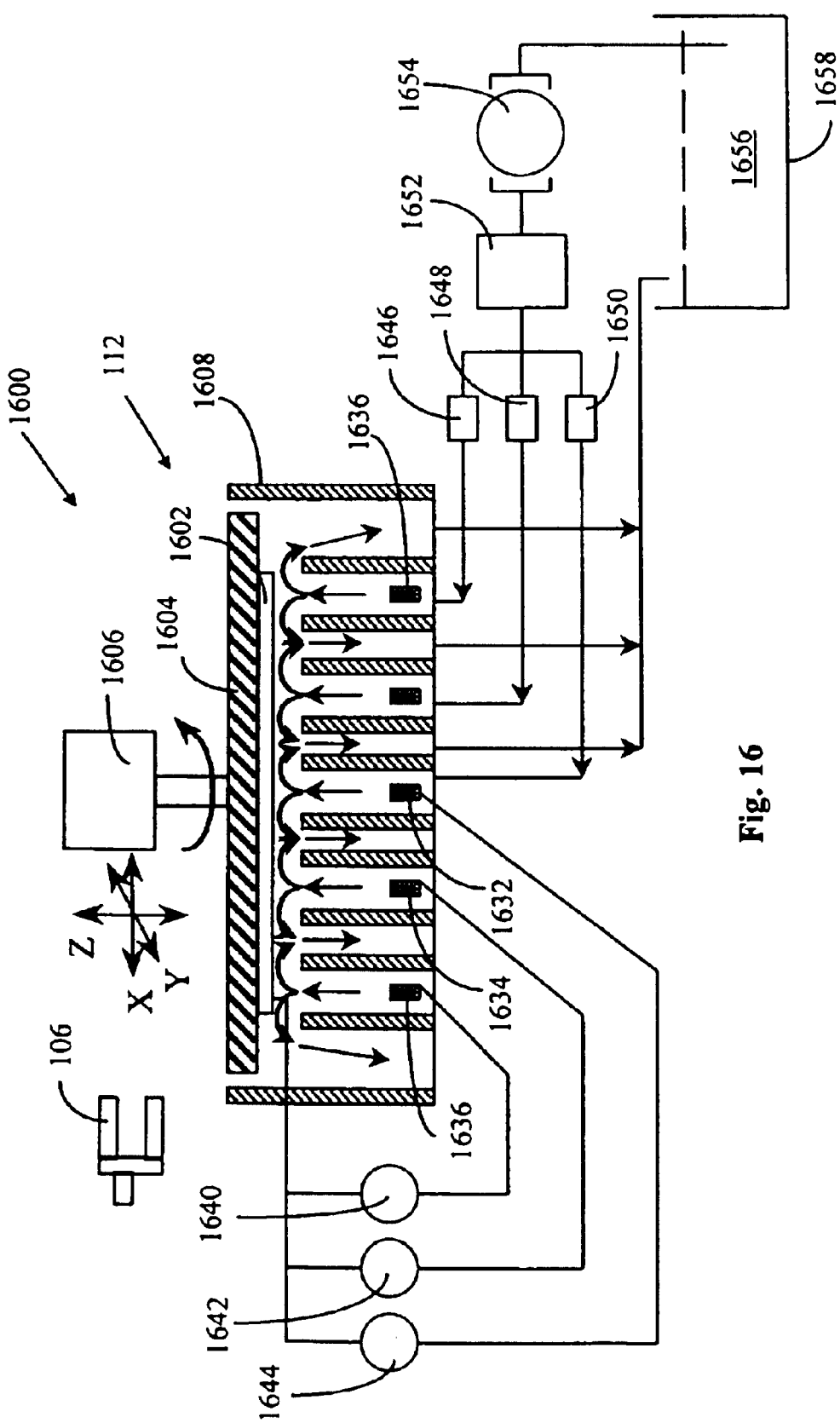
FIG. 16 is a cross sectional view of an exemplary embodiment of an electroplating and/or electropolishing cell.
Figure 17:
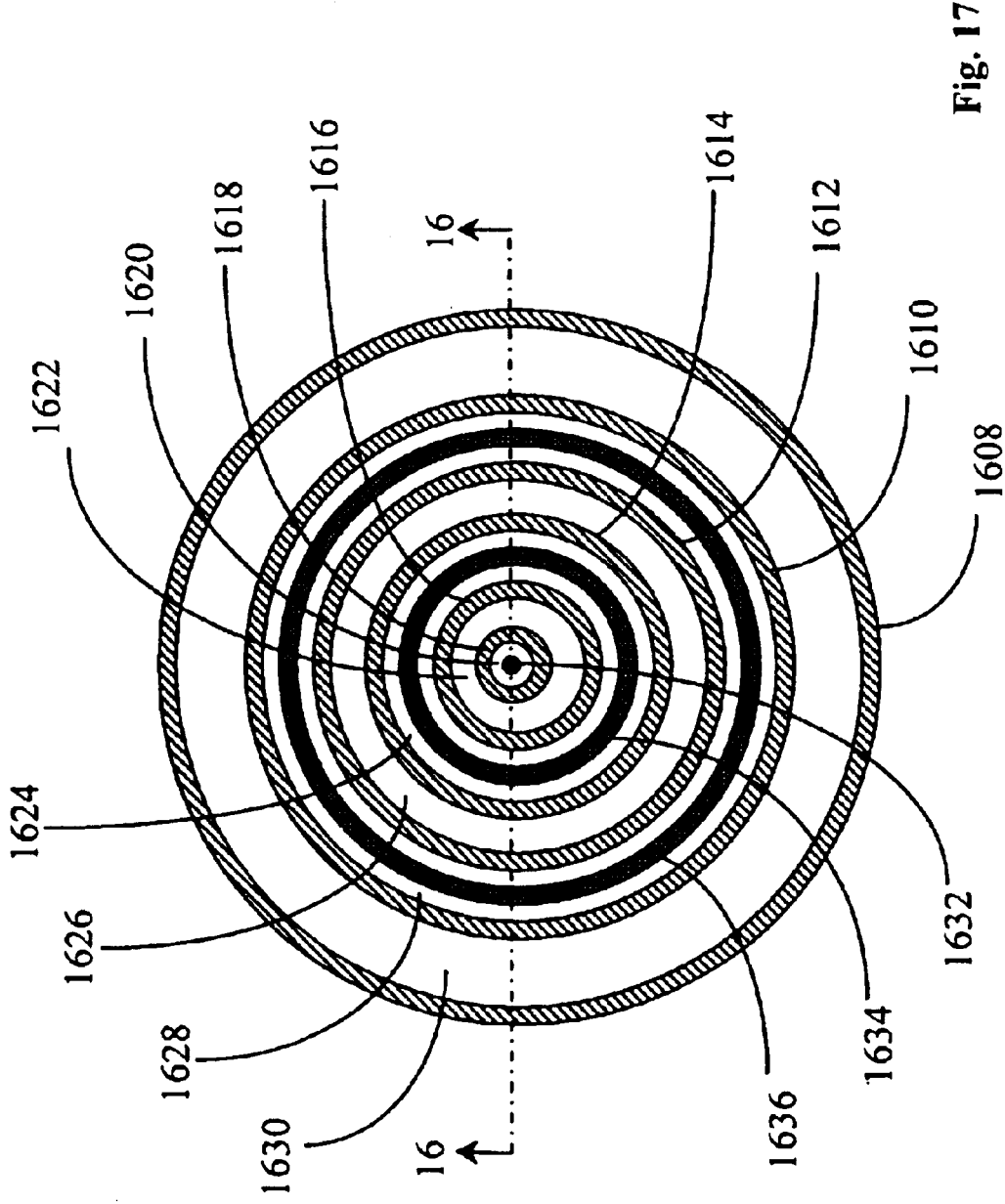
FIG. 17 is a top view of a portion of the electroplating and/or electropolishing cells shown in FIG. 16.

Having thus described various exemplary embodiments of a wafer-processing tool, an exemplary embodiment of electroplating and electropolishing cell 112 will be described below. With reference now to FIGS. 16 and 17, in one exemplary embodiment of the present invention, wafer electroplating and/or electropolishing cell 112 includes an electrolyte solution receptacle 1608, a wafer chuck 1604, and a wafer chuck assembly 1600.

With reference to FIG. 16, in the present exemplary embodiment, electrolyte solution receptacle 1608 holds the electrolyte solution for electroplating and/or electropolishing of a wafer 1602. During the electroplating and/or electropolishing process, wafer chuck 1604 holds wafer 1602. Wafer chuck assembly 1600 positions wafer chuck 1604 within electrolyte solution receptacle 1608. Wafer chuck assembly 1600 also rotates wafer chuck 1604 to enhance the uniformity of the electroplating and/or electropolishing process.

In the present exemplary embodiment, with reference to FIG. 17, electrolyte solution receptacle 1608 is preferably divided into sections 1620, 1622, 1624, 1626, 1628 and 1630 by section walls 1610, 1612, 1614, 1616 and 1618. It should be recognized, however, that electrolyte solution receptacle 1608 can be divided into any number of sections by any number of appropriate sections walls depending on the particular application.

With reference to FIG. 16, in the present exemplary embodiment, a pump 1654 pumps an electrolyte solution 1656 from a reservoir 1658 into electrolyte solution receptacle 1608. More particularly, electrolyte solution 1656 flows through a pass filter 1652 and Liquid Mass Flow Controllers (LMFCs) 1646, 1648 and 1650. Pass filter 1652 removes contaminants and unwanted particles from electrolyte solution 1656. LMFCs 1646, 1648 and 1650 control the flow of electrolyte solution 1656 into sections 1620, 1624 and 1628 (FIG. 17), respectively. It should be recognized, however, that electrolyte solution 1656 can be provided using any convenient method depending on the particular application.

As described above, during the electroplating and/or electropolishing process, wafer chuck 1604 holds wafer 1602. In the present exemplary embodiment, robot 106 inserts or provides wafer 1602 into wafer chuck 1604. As discussed above, robot 106 can obtain wafer 1602 from wafer cassette 116 (FIG. 3) or from a previous processing station or processing tool. Wafer 1602 can also be loaded into wafer chuck 1604 manually by an operator depending on the particular application.

As will be described in greater detail below, after receiving wafer 1602, wafer chuck 1604 closes to hold wafer 1602. Wafer chuck assembly 1600 then positions wafer chuck 1604 and wafer 1602 within electrolyte solution receptacle 1608. More particularly, in the present exemplary embodiment, wafer chuck assembly 1600 positions wafer chuck 1604 and wafer 1602 above section walls 1610, 1612, 1614, 1616 and 1618 (FIG. 17) to form a gap between the bottom surface of wafer 1602 and the tops of section walls 1610, 1612, 1614, 1616 and 1618 (FIG. 17).

In the present exemplary embodiment, electrolyte solution 1656 flows into sections 1620, 1624 and 1628 (FIG. 17), and contacts the bottom surface of wafer 1602. Electrolyte solution 1656 flows through the gap formed between the bottom surface of wafer 1602 and section walls 1610, 1612, 1614, 1616 and 1618 (FIG. 17). Electrolyte solution 1656 then returns to reservoir 1658 through sections 1622, 1626 and 1630 (FIG. 17).

As will be described in greater detail below, wafer 1602 is connected to one or more power supplies 1640, 1642 and 1644. Also, one or more electrodes 1632, 1634 and 1636 disposed within electrolyte solution receptacle 1608 are connected to power supplies 1640, 1642 and 1644. When electrolyte solution 1656 contacts wafer 1602, a circuit is formed to electroplate and/or to electropolish wafer 1602. When wafer 1602 is electrically charged to have negative electric potential relative to electrodes 1632, 1634 and 1636, wafer 1602 is electroplated. When wafer 1602 is electrically charged to have positive electric potential relative to electrodes 1632, 1634 and 1636, wafer 1602 is suitably electropolished. Additionally, when wafer 1602 is electroplated, electrolyte solution 1656 is preferably a sulfuric acid solution. When wafer 1602 is electropolished, electrolyte solution 1656 is preferably a phosphoric acid solution. It should be recognized, however, that electrolyte solution 1656 can include various chemistries depending on the particular application.

Additionally, as will be described in greater detail below, wafer chuck assembly 1600 can rotate and/or oscillate wafer 1602 to facilitate a more uniform electroplating and/or electropolishing of wafer 1602. After wafer 1602 is electroplated and/or electropolished, wafer 1602 is removed from electrolyte solution receptacle 1608. More particularly, wafer chuck assembly 1600 lifts wafer chuck 1604 from electrolyte solution receptacle 1608. Wafer chuck 1604 then opens. Robot 106 removes wafer 1602 from wafer chuck 1604, then provides another wafer 1602 for electroplating and/or electropolishing. For a more detailed description of electropolishing and electroplating processes, see U.S. patent application Ser. No. 09/232,864, entitled PLATING APPARATUS AND METHOD, filed on Jan. 15, 1999, the entire content of which is incorporated herein by reference, and PCT patent application No. PCT/US99/15506, entitled METHODS AND APPARATUS FOR ELECTROPOLISHING METAL INTERCONNECTIONS ON SEMICONDUCTOR DEVICES, filed on Aug., 7, 1999, the entire content of which is incorporated herein by reference.

As alluded to earlier, specific details related to electroplating and/or electropolishing cell 112 have been provided above to enable a more full and a more complete description of the present invention. As such, various aspects of electroplating and/or electropolishing cell 112 can be modified without deviating from the spirit and/or scope of the present invention. For example, although electroplating and/or electropolishing cell 112 has been depicted and described as having electrolyte solution receptacle 1608 with a plurality of sections, electroplating and/or electropolishing cell 112 can include a static bath.

Having thus described an exemplary electroplating and/or electropolishing cell and method, an exemplary embodiment of wafer chuck 1604 and wafer chuck assembly 1600 will be described below. As a preliminary matter, for the sake of clarity and convenience, wafer chuck 1604 and wafer chuck assembly 1600 will hereafter be described in connection with electroplating of a semiconductor wafer. However, it should be recognized that wafer chuck 1604 and wafer chuck assembly 1600 can be used in connection with any convenient wafer process, such as electropolishing, cleaning, etching, and the like. Additionally, it should be recognized that wafer chuck 1604 and wafer chuck assembly 1600 can be used in connection with processing of various workpieces other than semiconductor wafers.

Figure 18A:
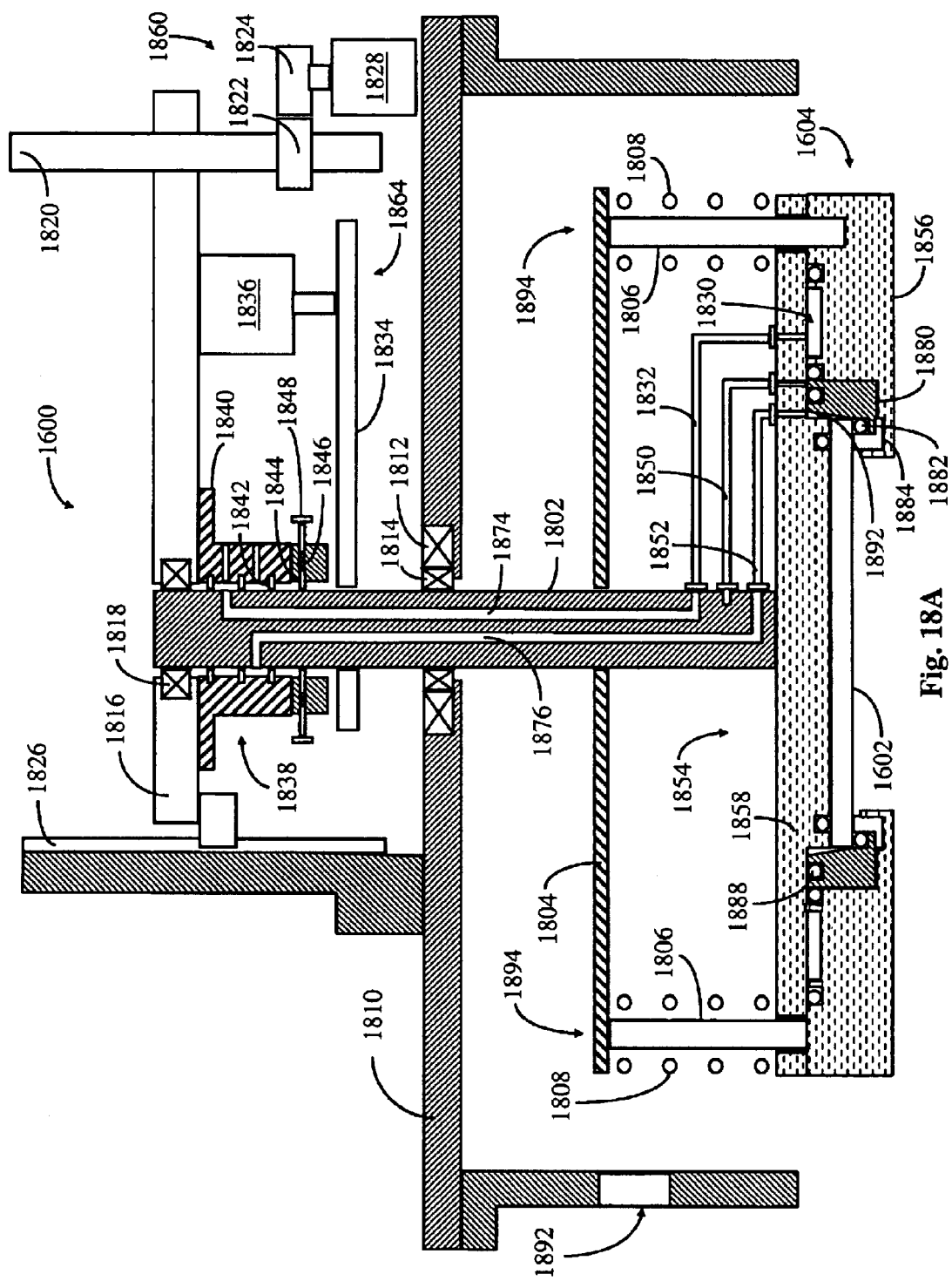
FIGS. 18A through 18C are cross sectional view of an exemplary embodiment of a wafer chuck assembly.
Figure 18B:
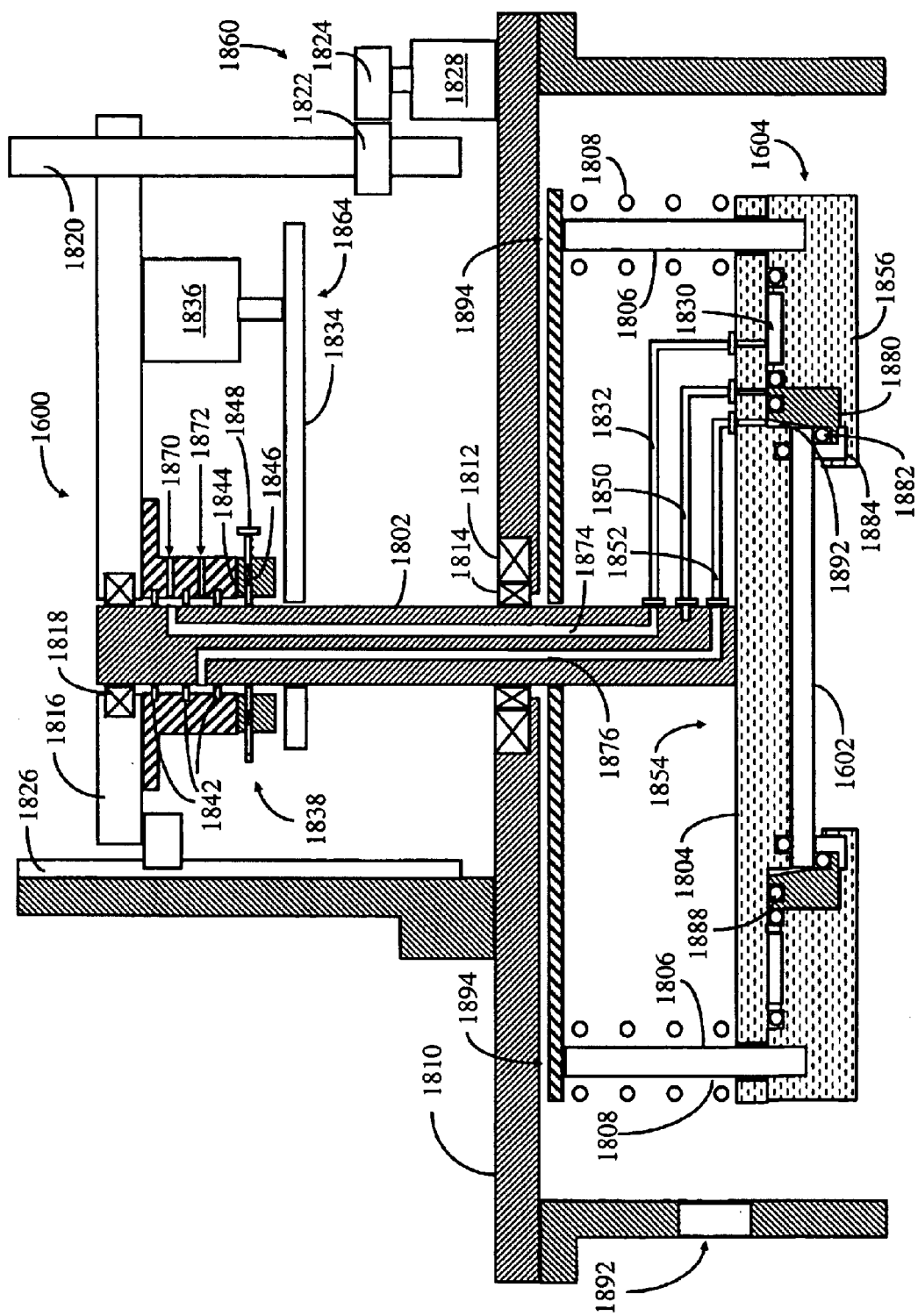
Figure 18C:
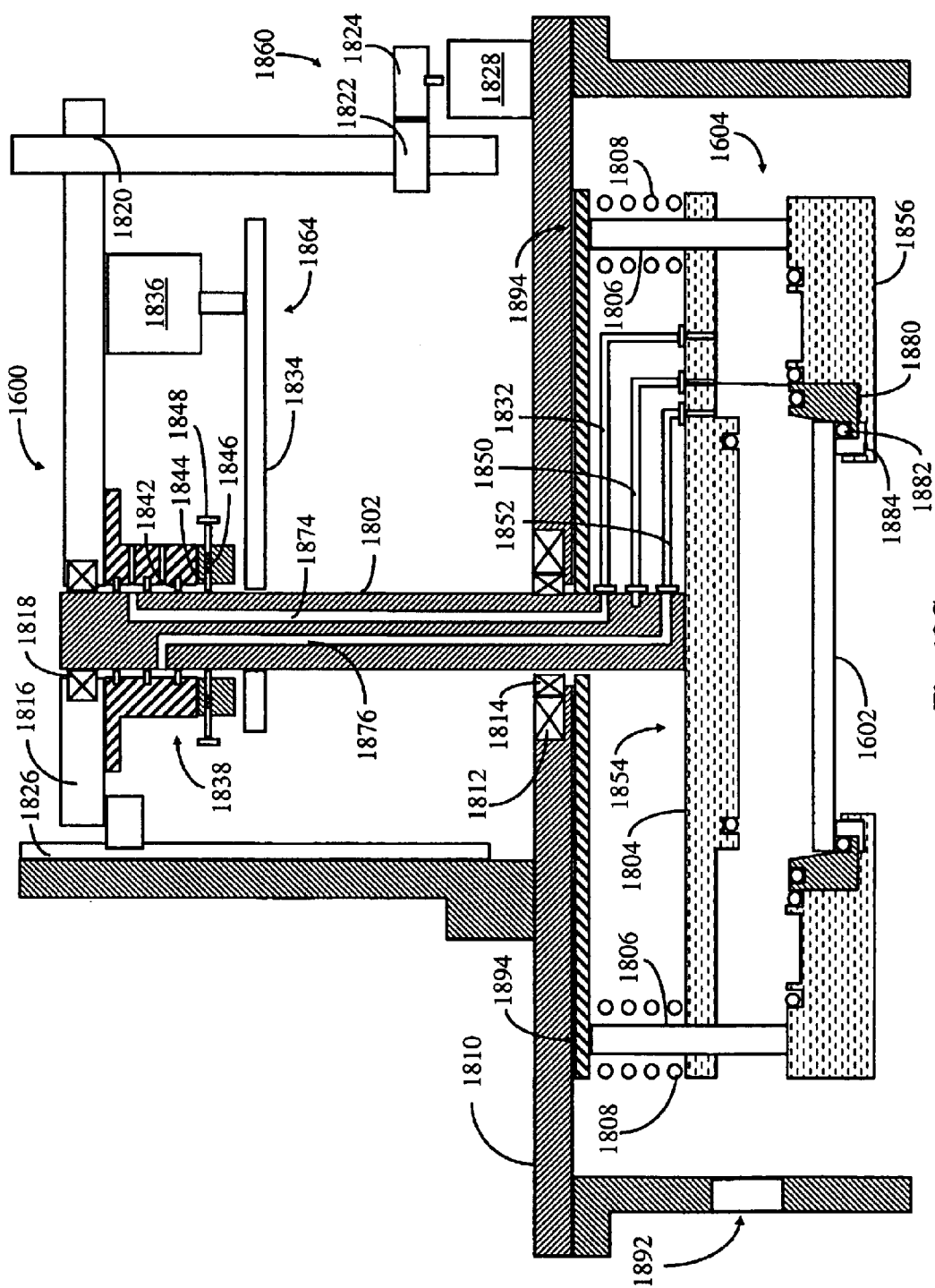

With reference to FIGS. 18A to 18C, as described above, during the electroplating and/or electropolishing process, wafer chuck assembly 1600 positions wafer chuck 1604 within electrolyte receptacle 1608 (FIG. 16). Additionally, wafer chuck assembly 1600 is configured to open and close wafer chuck 1604 for insertion and removal of wafer 1602.

More particularly, in the present exemplary embodiment, wafer chuck assembly 1600 includes an actuator assembly 1860 and a spring assembly 1894. Actuator assembly 1860 is configured to move wafer chuck 1604 between a first position and a second position. In the present embodiment, actuator assembly 1860 is configured to move wafer chuck 1604 between a raised position and a lowered position. In the first position, spring assembly 1894 is configured to open wafer chuck 1604 to permit removal and insertion of wafer 1602. In the second position, spring assembly 1894 is configured to close wafer chuck 1604.

In the present embodiment, actuator assembly 1860 includes a motor 1828, gears 1822 and 1824, and lead screw 1820. Motor 1828 is connected to shaft 1802 through bracket 1816, lead screw 1820 and gears 1822 and 1824. More particularly, motor 1828 turns lead screw 1820 through gears 1822 and 1824 to translate bracket 1816 along a guide rail 1826. Bracket 1816 is attached to shaft 1802, which is rigidly attached to top section 1858 of wafer chuck 1604. In this manner, motor 1828 can lower and raise wafer chuck 1604. It should be recognized, however, that wafer chuck 1604 can be raised and lowered using any convenient apparatus and method, such as pneumatic actuators, magnetic forces, and the like. Also, it should be recognized that motor 1828 can include a direct current servomotor, stepper motor, and the like.

Figure 19:
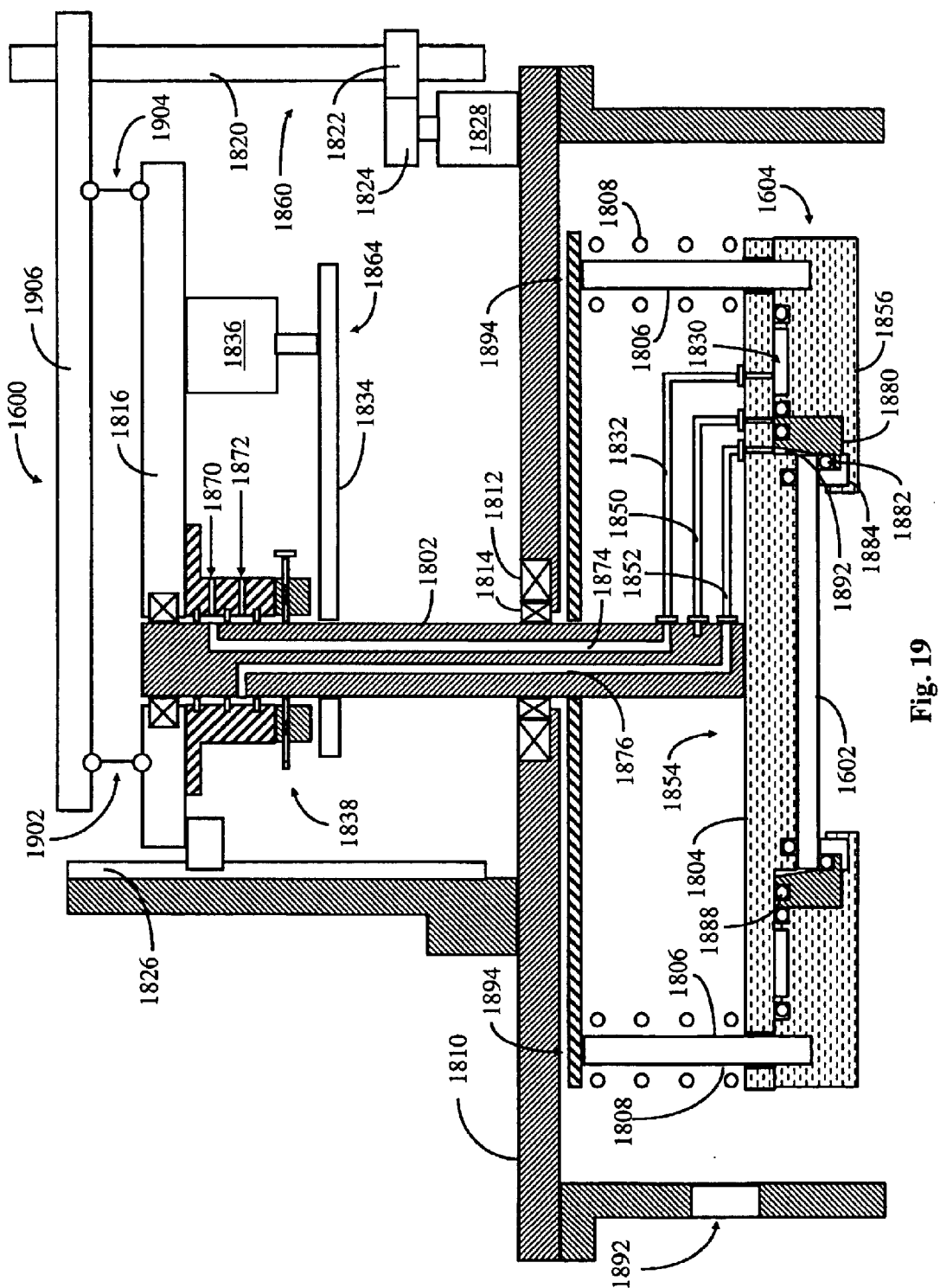
FIG. 19 is a cross sectional view of an alternative configuration of the wafer chuck assembly shown in FIGS. 18A through 18C.

Although a single guide rail 1826 is depicted in FIGS. 18A through 18C, it should be recognized any number of guide rails 1826 can be used depending on the particular application. Additionally, with reference to FIG. 19, in an alternatively embodiment of the present invention, joints 1902 and 1904 are disposed between bracket 1816 and an additional bracket 1906. Joints 1902 and 1904 permit movement between bracket 1906 and 1816 as lead screw 1820 raises and lowers wafer chuck 1604. As such, bracket 1816 is less likely to seize on guide rail 1826. In the present exemplary embodiment, joints 1902 and 1904 are universal joints. It should be recognized, however, that any convenient type of joint can be used to permit movement between bracket 1906 and 1816.

With continued reference to FIGS. 18A through 18C, spring assembly 1894 includes a collar 1804, a plurality of rods 1806, and a plurality of springs 1808. Rods 1806 are rigidly fixed to collar 1804 and to bottom section 1856 of wafer chuck 1604. Springs 1808 are disposed around rods 1806 and between collar 1804 and top section 1858 of wafer chuck 1604. Additionally, collar 1804 is not attached to shaft 1802. Accordingly, as depicted in FIG. 18B, as wafer chuck 1604 is raised, collar 1804 contacts a lid 1810. As depicted in FIG. 18C, rods 1806 prevent bottom section 1856 of wafer chuck 1604 from rising any further. However, springs 1808 compress to permit top section 1858 of wafer chuck 1604 to continue to rise. Thus, wafer chuck 1604 is opened for inserting and removing of wafer 1602.

In the manner described above and as depicted in FIGS. 18A through 18C, the single action of raising wafer chuck 1604 also opens wafer chuck 1604. The reverse action of lowering wafer chuck 1604 also closes wafer chuck 1604. More particularly, starting from FIG. 18C, when wafer 1602 has been positioned within wafer chuck 1604, motor 1828 begins to lower wafer chuck 1604. As depicted in FIG. 18B, as motor 1828 lowers wafer chuck 1604, spring 1808 extend to close wafer chuck 1604.

In addition to the force applied by spring 1808, additional force is applied to hold together wafer chuck 1604 by applying a vacuum and/or a reduced pressure gas to cavity 1830 formed between top section 1858 and bottom section 1856 of wafer chuck 1604. More particularly, with reference to FIG. 18B, wafer chuck assembly 1600 includes a slip-ring assembly 1838 configured with inlets 1870 and 1872. Slip-ring assembly 1838 also includes a plurality of seals 1842 configured to form cavities 1866 and 1868. In the present exemplary embodiment, vacuum and/or reduced pressure gas is applied through inlet 1870, channel 1874, and line 1832 to cavity 1830. In order to help seal cavity 1830, wafer chuck 1604 also includes seals 1878 disposed between top section 1858 and bottom section 1856.

Additionally, with reference to FIG. 18B, as described in brief above and as will be described in greater detail below, an electric charge is applied to wafer 1602 during the electroplating and/or electropolishing process. More particularly, in the present exemplary embodiment, slip-ring assembly 1838 includes a brush 1844, springs 1846, and screws 1848. Additionally, as will be described in greater detail below, wafer chuck 1604 includes a conducting member 1880, which electrically contacts line 1850, and a spring member 1882, which electrically contacts wafer 1602. Accordingly, the electric charge is applied to wafer 1602 through screw 1848, spring 1846, brush 1844, shaft 1802, line 1850, conducting member 1880, and spring member 1882. Thus, screw 1848, spring 1846, brush 1844, shaft 1802, line 1850, conducting member 1880, and spring member 1882 are formed from an electrically conducting material. Additionally, as shaft 1802 can rotate, brush 1844 is formed from an electrically conducting and low friction material, such as graphite.

As will be described in greater detail below, to help isolate spring member 1882 and conducting member 1880 from the electrolyte solution during the electroplating and/or electropolishing process, wafer chuck 1604 includes a seal member 1884. In the present exemplary embodiment of the present invention, a positive pressure gas is applied to a cavity 1892 to check the seal quality of seal member 1884. More particularly, pressure gas is applied through inlet 1872, channel 1876, and line 1852. Wafer chuck 1604 also includes seals 1886 and 1888 to help seal cavity 1892. Alternatively, a vacuum and/or a reduced pressure gas can be applied to cavity 1892 to check the seal quality of seal member 1884. After wafer chuck 1604 is removed from the electrolyte solution, positive pressure gas can be applied to cavity 1892 to purge electrolyte solution from wafer chuck 1604.

As alluded to earlier, wafer chuck assembly 1600 is configured to rotate wafer chuck 1604 to enhance the uniformity of the electroplating and/or electropolishing process. More particularly, during the electroplating and/or electropolishing process, wafer chuck assembly 1600 rotates wafer chuck 1604 at about 5 revolutions per minute to about 100 revolutions per minute. It should be recognized, however, that wafer chuck 1604 can be rotated at various speeds depending on the particular application.

Figure 20:
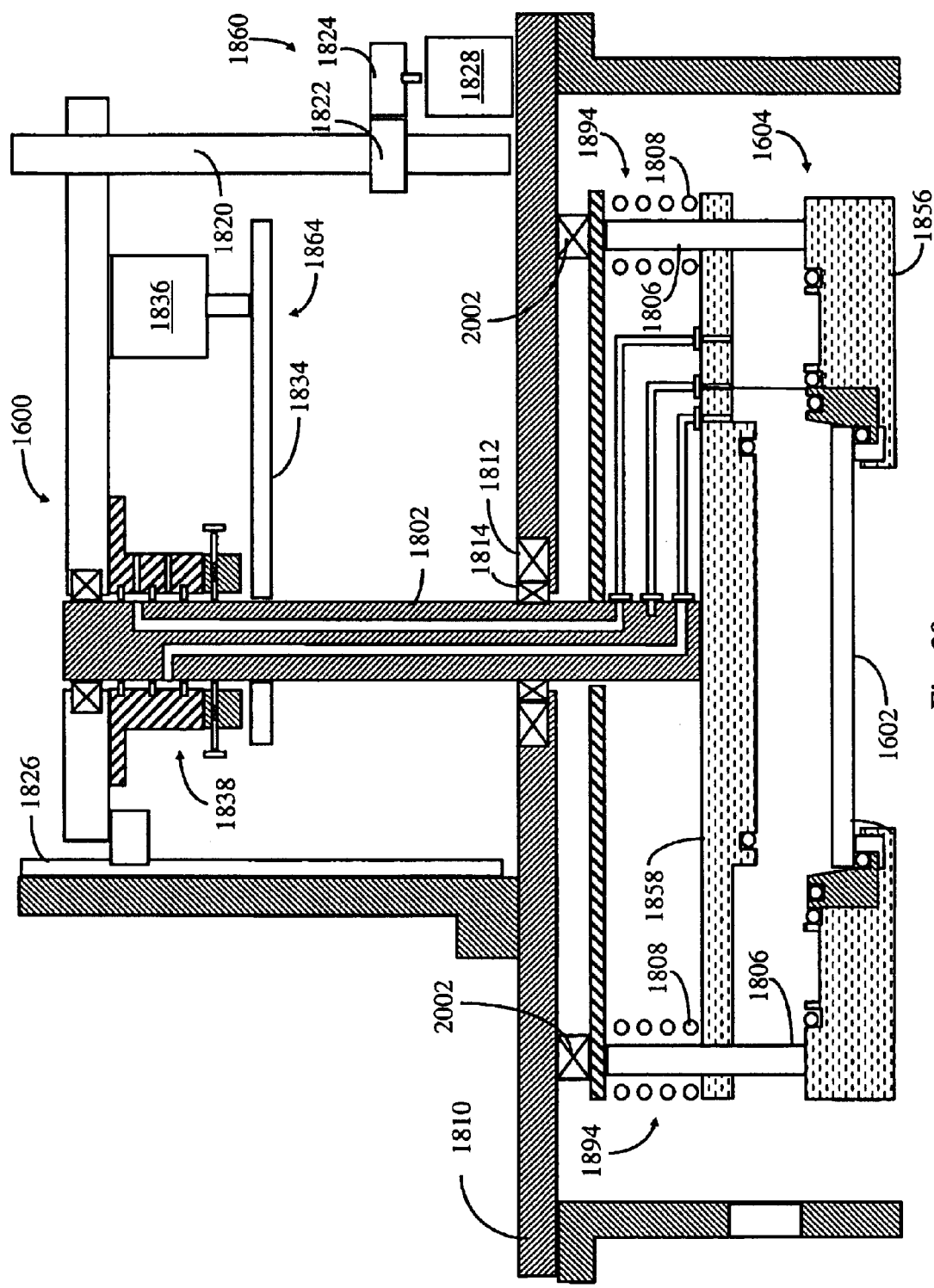
FIG. 20 is a cross sectional view of another alternative configuration of the wafer chuck assembly shown in FIGS. 18A through 18C.

Additionally, as will be described in greater detail below, wafer chuck assembly 1600 is configured to rotate wafer chuck 1604 to help remove electrolyte solution from wafer chuck 1604 after the electroplating and/or electropolishing process. During this process, wafer chuck assembly 1600 rotates wafer chuck 1604 at about 300 revolutions per minute to about 5000 revolutions per minute, and preferably about 500 revolutions per minute. It should be recognized, however, that wafer chuck assembly 1600 can rotate wafer chuck 1604 at various speeds depending on the particular application. As depicted in FIG. 20, during this process, wafer chuck 1604 can be rotated when wafer chuck 1604 is in an open position. Accordingly, in an alternative embodiment, wafer chuck assembly 1600 includes bearing 2002 (FIG. 20). In the present exemplary embodiment, bearing 2002 is depicted as being disposed between collar 1804 and lid 110. It should be recognized, however, that bearing 2002 can be disposed in various locations depending on the particular application. For example, if collar 1804 is removed or reduced in size, bearing 2002 can be provided between top section 1858 and lid 1810. Additionally, it should be recognized, however, that wafer chuck assembly 1600 can rotate wafer chuck 1604 at various speeds depending on the particular application.

Figure 21:
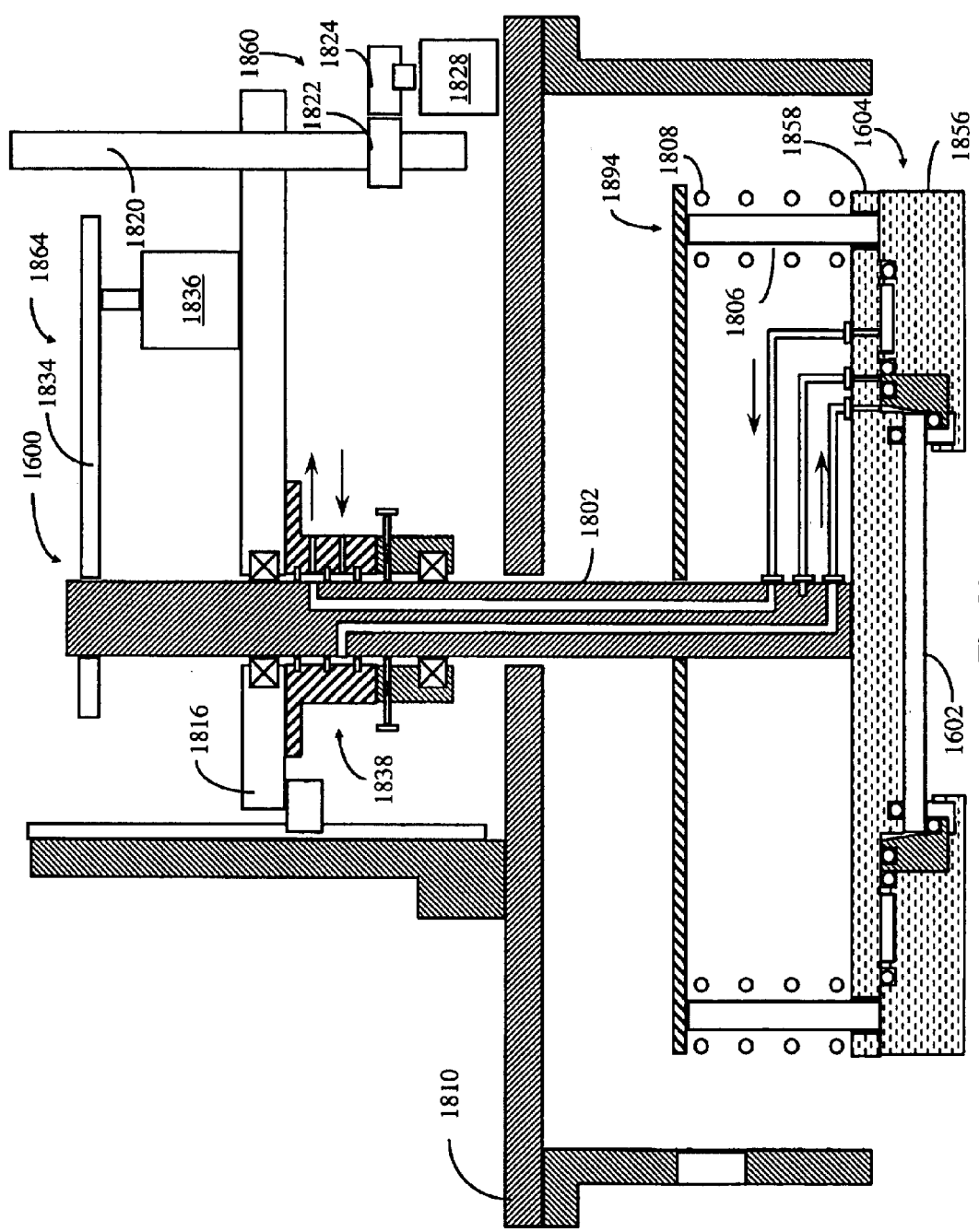
FIG. 21 is a cross sectional view of still another alternative configuration of the wafer chuck assembly shown in FIGS. 18A through 18C.

With reference to FIG. 18A, wafer chuck assembly 1600 includes rotational assembly 1864 to rotate wafer chuck 1604. In the present exemplary embodiment, rotational assembly 1864 includes a motor 1836 and a drive belt 1834 connected to shaft 1802. In the present exemplary embodiment, motor 1836 and drive belt 1834 are disposed below bracket 1816. It should be recognized, however, that motor 1836 and drive belt 1834 can be disposed in various locations to rotate shaft 1802. For example, with reference to FIG. 21, wafer chuck assembly 1600 is depicted with motor 1836 and drive belt 1834 disposed above bracket 1816. Alternatively, motor 1836 can be connected to shaft 1802 through gears rather than drive belt 1834. Motor 1836 can also be connected directly to shaft 1802. In the present embodiment, motor 1836 can include a direct current servomotor, a stepper motor, and the like. Additionally, it should be recognized that rotational assembly 1864 can include various other mechanisms for rotating wafer chuck 1604. For example, rotational assembly 1864 can be configured as an electromagnetic system to rotate wafer chuck 1604.

Figure 22A:
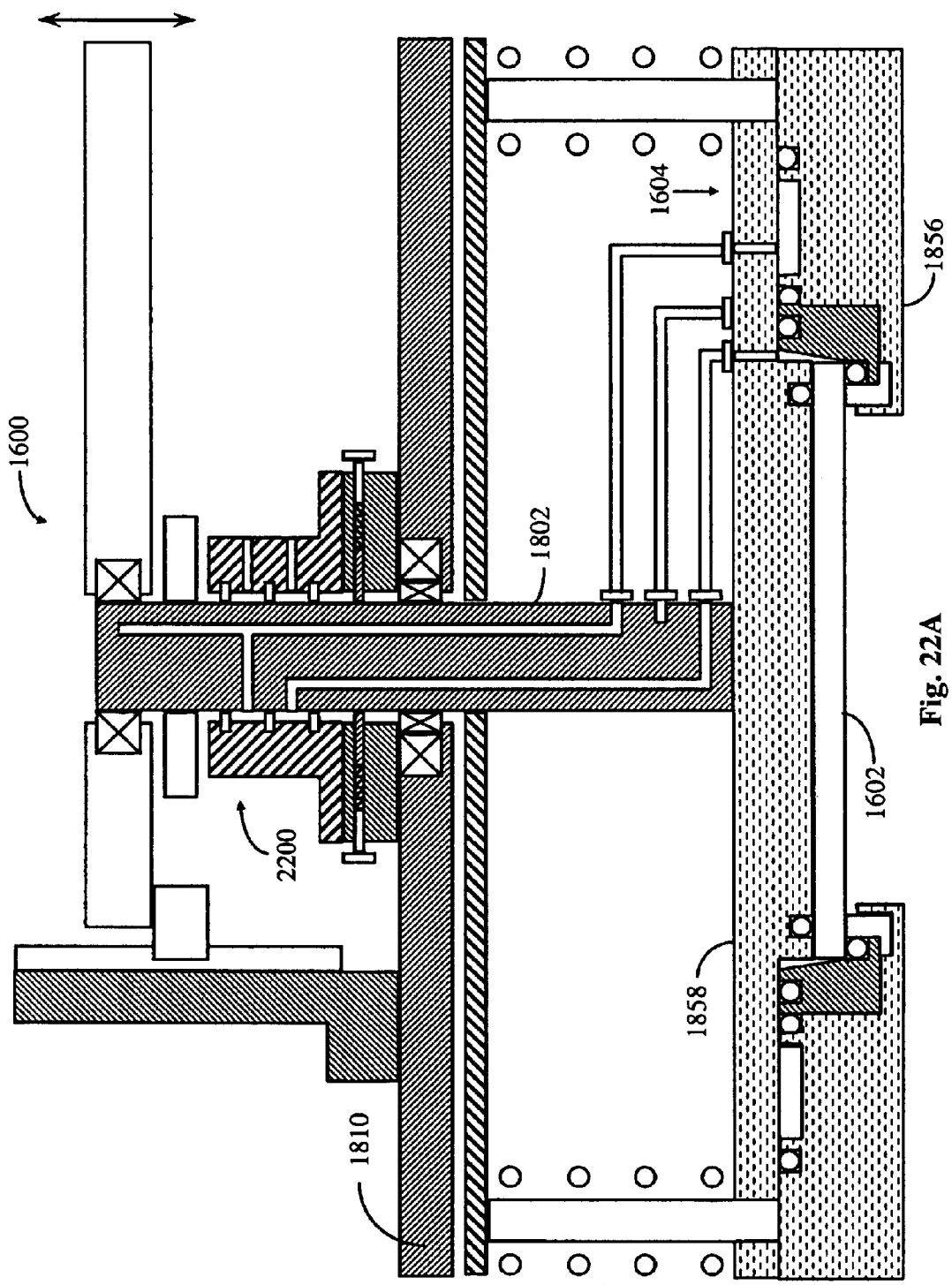
FIGS. 22A and 22B are cross sectional views of yet another alternative configuration of the wafer chuck assembly shown in FIGS. 18A through 18C.
Figure 22B:
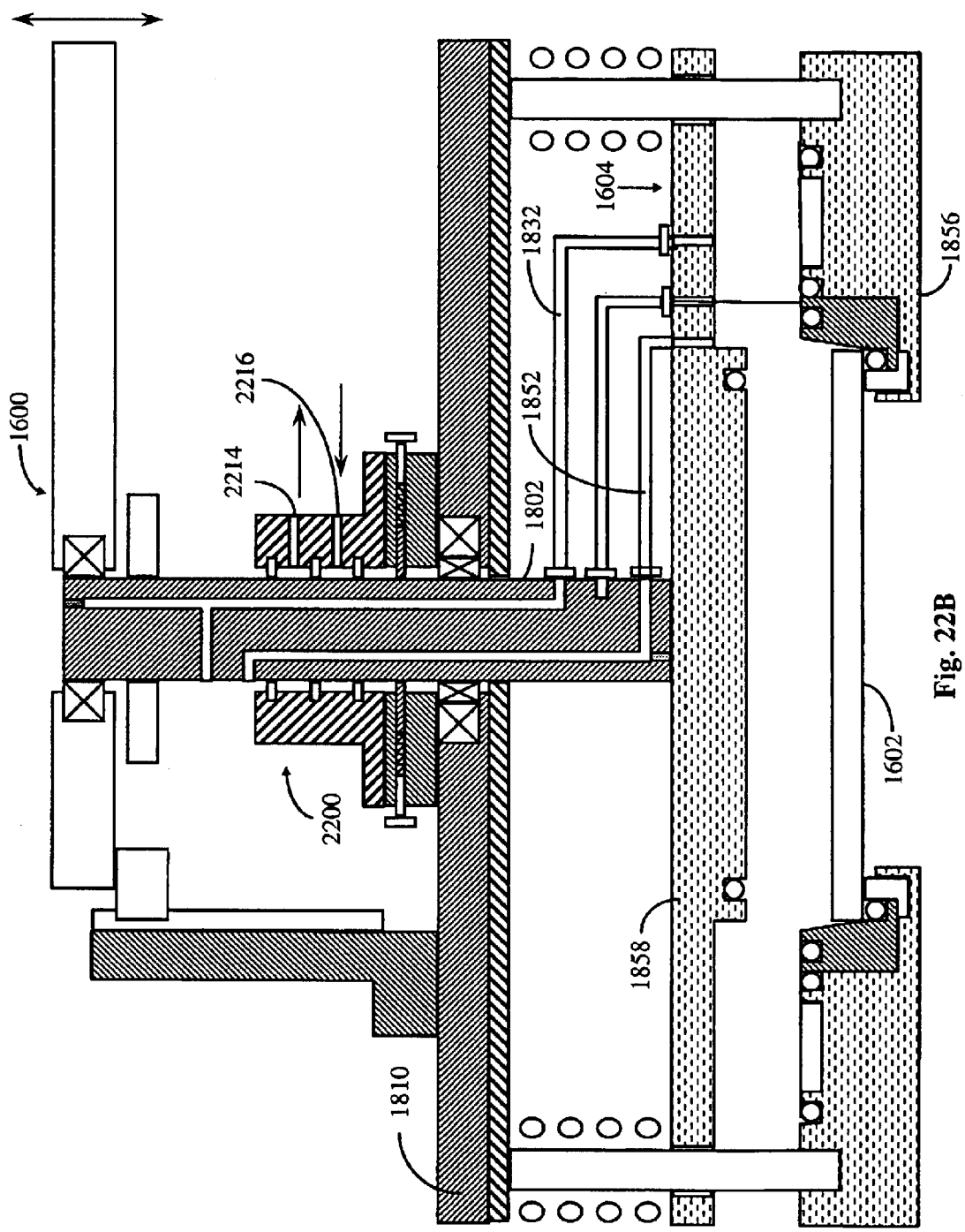

With reference to FIGS. 18A through 18C, in the present exemplary embodiment, shaft 1802 is formed from a metal or metal alloy resistant to corrosion, such as stainless steel. In order to reduce friction, the surface of shaft 1802 contacting seals 1842 and brush 1844 is machined to a surface roughness less than about 5 micron, and preferably less than about 2 micron. Additionally, in the present exemplary embodiment, wafer chuck assembly 1600 includes bearings 1812 and 1814 disposed between shaft 1802 and lid 1810. Wafer chuck assembly 1600 also includes bearings 1818 disposed between shaft 1802 and bracket 1816. Bearings 1812, 1814, 1818 can include ball-bearings, bushings, low-friction material, and the like As described above, slip-ring assembly 1838 is configured to supply vacuum and/or reduced pressure gas, reduced pressure gas, pressure gas, and electricity to shaft 1802. Thus far, as particularly depicted in FIGS. 18A through 18C, slip-ring assembly 1838 has been shown as fixed to bracket 1816. In contrast, with reference to FIGS. 22A and 22B, in an alternative embodiment of the present invention, wafer chuck assembly 1600 includes a slip-ring assembly 2200, which remains fixed when wafer chuck 1604 is raised and lowered. More particularly, shaft 1802 slides through slip-ring assembly 2200 as it is raised and lowered.

In the following descriptions and associated drawings, various alternative embodiments of the present invention are described and depicted. It should be recognized that these alternative embodiments are not meant to include all the possible modifications and potential alterations, which can be made to the present invention. Rather, these alternative embodiments are meant to demonstrate some of the potential modifications and alterations.

Figure 23:
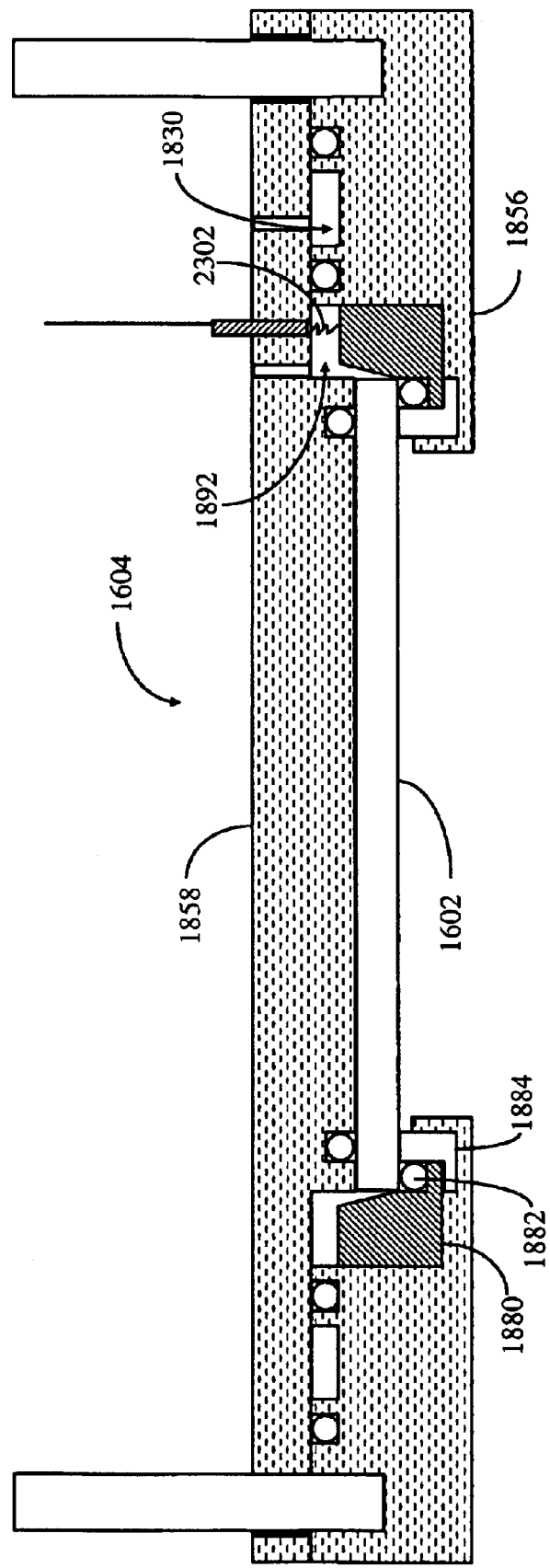
FIG. 23 is a cross sectional view of an exemplary embodiment of a wafer chuck.

With reference to FIG. 23, in an alternative embodiment, conducting member 1880 of wafer chuck 1604 is depicted without seal 1888 (FIG. 18A). Additionally, a spring 2302 applies the charge to conducting member 1880. In contrast to wire 1890 depicted in FIG. 18C, spring 2302 lifts clear of conducting member 1880 when wafer chuck 1604 opens.

Figure 24:
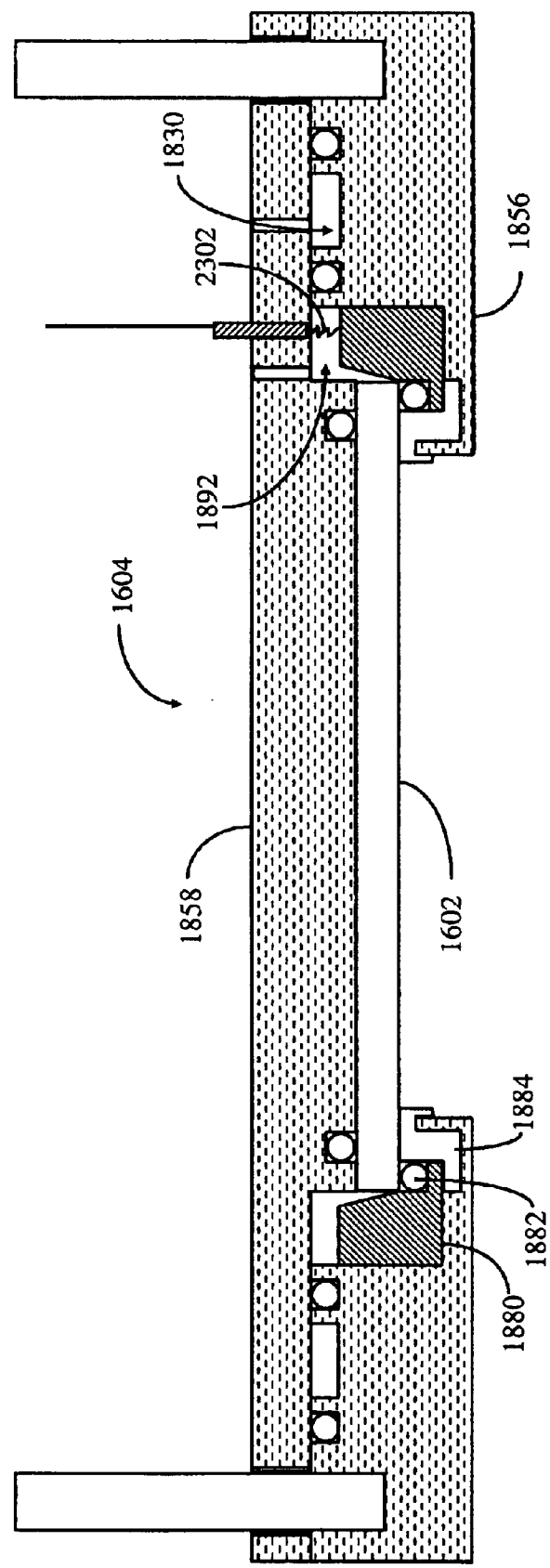
FIG. 24 is a cross sectional view of an alternative configuration of the wafer chuck shown in FIG. 23.

With reference now to FIG. 24, in another alternative embodiment, wafer chuck 1604 is depicted with seal member 1884 having a Z-shaped cross-sectional profile. In comparison to a seal member 1884 having an L-shaped cross-sectional profile (FIG. 18A), the Z-shaped cross-sectional profile can hold spring member 1882 more securely in place. It should be recognized, however, that seal member 1884 can be formed having various cross-sectional profiles. In this regard, a number of these possible profiles will be described and depicted below.

Figure 25:
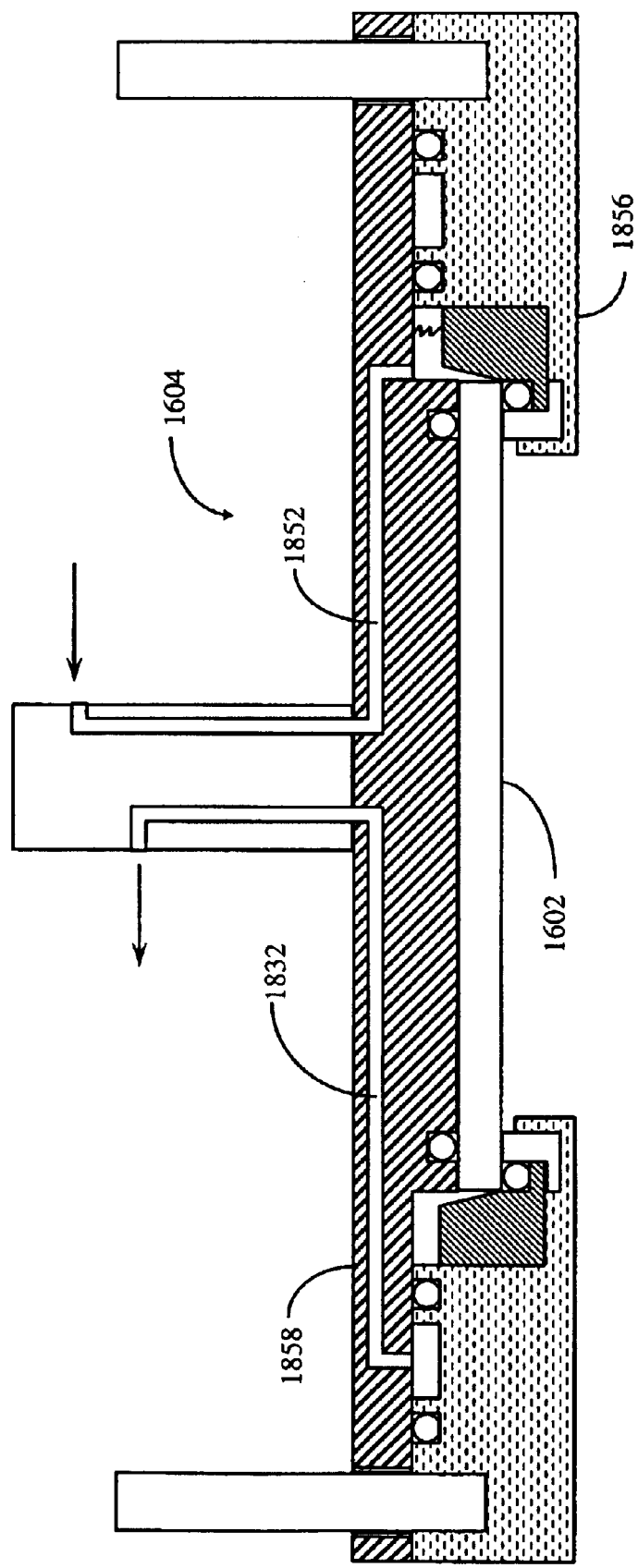
FIG. 25 is a cross sectional view of another alternative configuration of the wafer chuck shown in FIG. 23.

With reference now to FIG. 25, in still another alternative embodiment, wafer chuck 1604 is depicted with lines 1832 and 1852 formed into top section 1858. It should be recognized, however, that lines 1832 and 1852 can be formed in various manner. For example, grooves can be formed along the top surface of top section 1858. Lines 1832 and 1852 can be tubes inserted into the grooves. In this manner, lines 1832 and 1852 can be held more securely.

Figure 26:
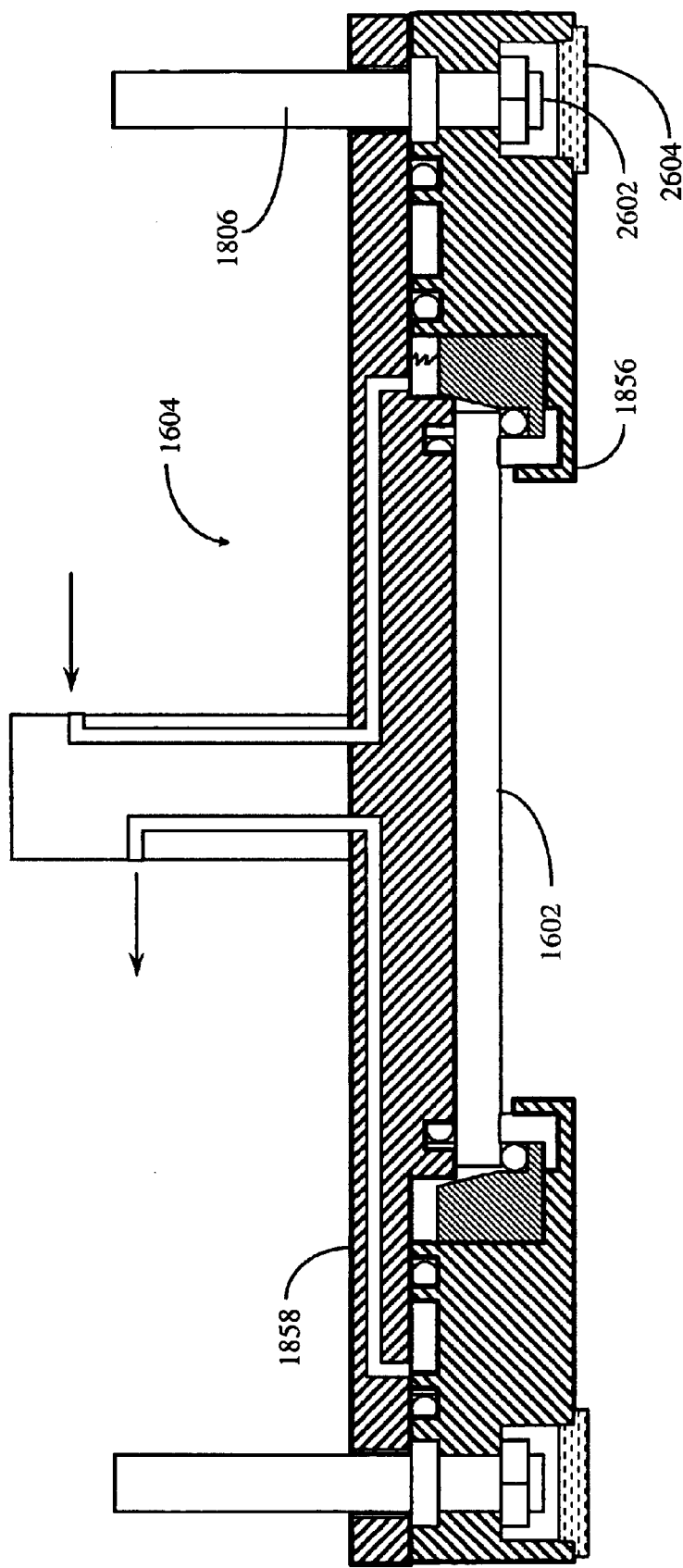
FIG. 26 is a cross sectional view of still another alternative configuration of the wafer chuck shown in FIG. 23.

With reference now to FIG. 26, in yet another alternative embodiment, wafer chuck 1604 is depicted with rods 1806 attached to bottom section 1856 using nuts 2602. The ends of rods 1806 and nuts 2602 are sealed with caps 2604 to protect them from the electrolyte solution during the electroplating and/or electropolishing process.

Figure 27:
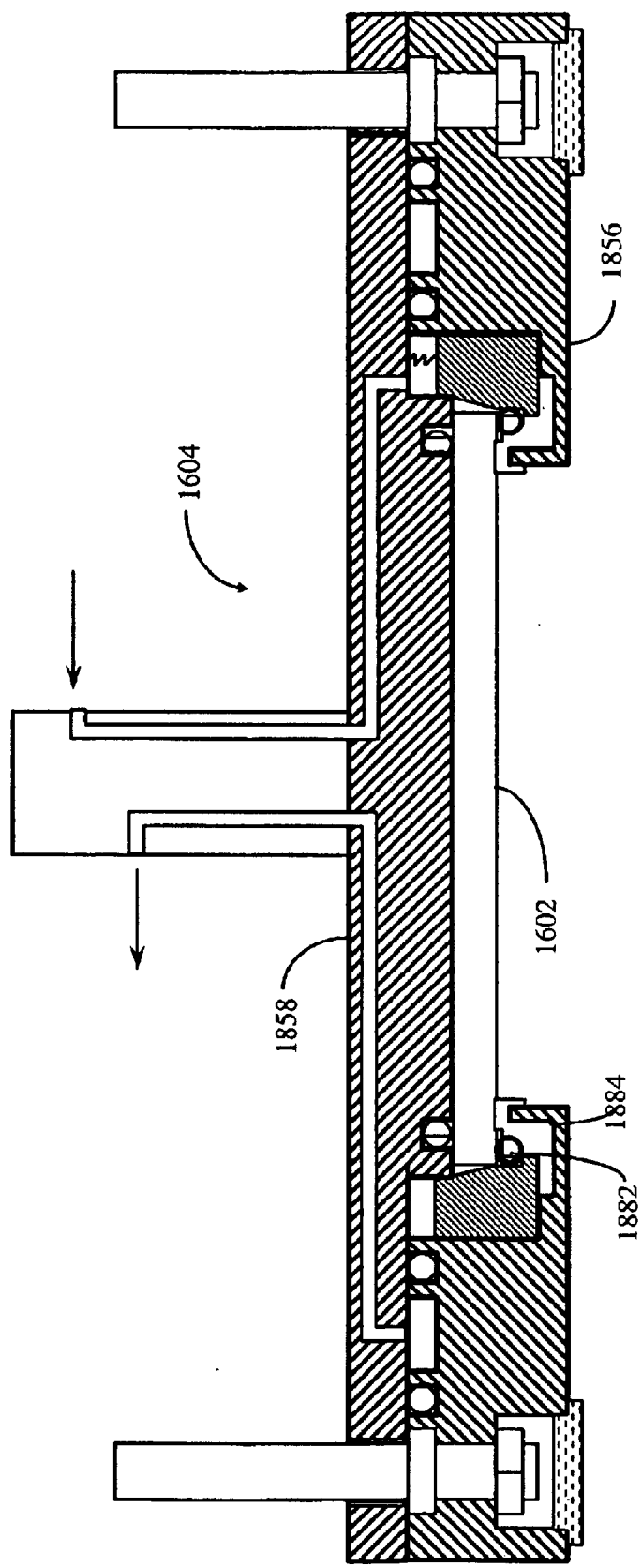
FIG. 27 is a cross sectional view of yet another alternative configuration of the wafer chuck shown in FIG. 23.

With reference now to FIG. 27, in an alternative embodiment, the embodiment shown in FIG. 26 is depicted with seal member 1884 having a Z-shaped cross-sectional profile. As described above, this cross-sectional profile can hold spring member 1882 more securely.

Figure 28:
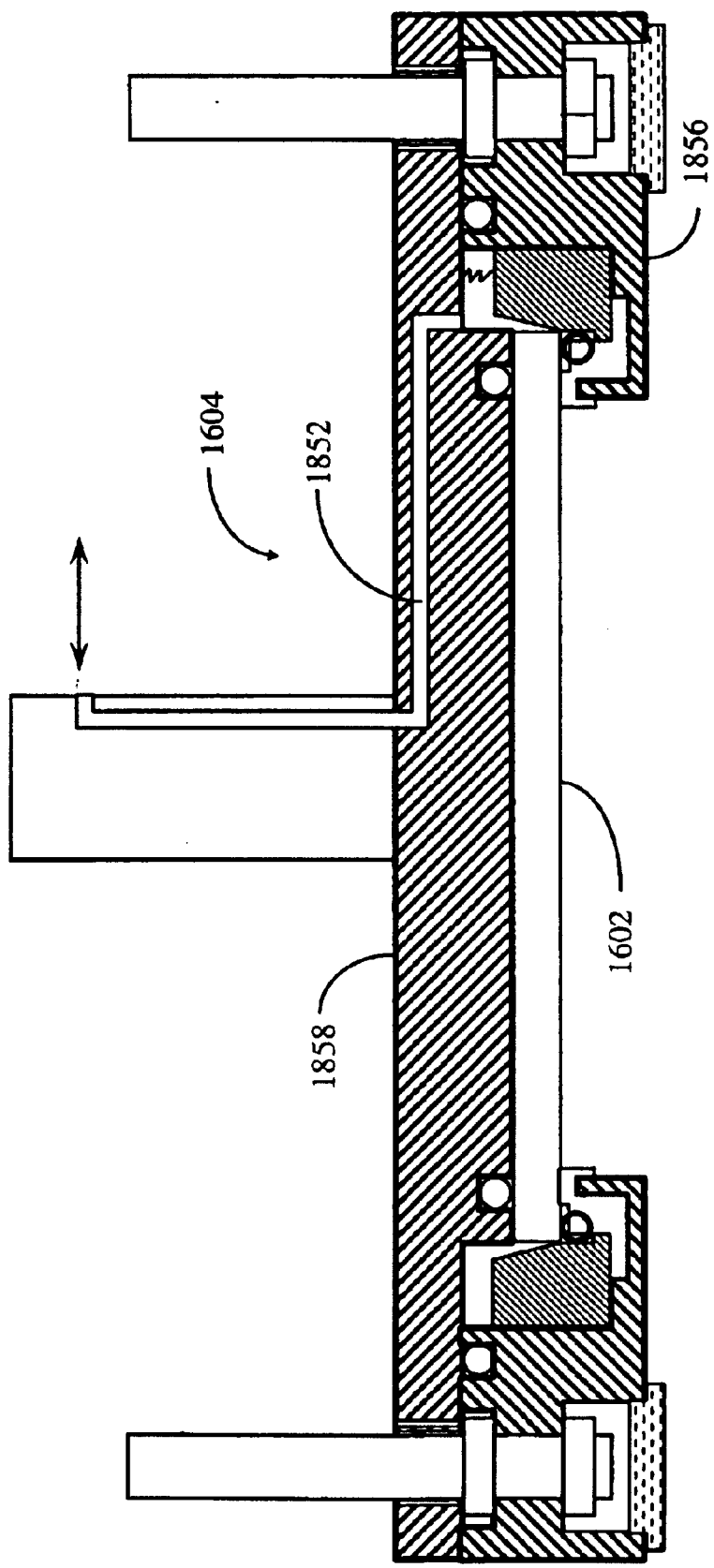
FIG. 28 is a cross sectional view of another alternative configuration of the wafer chuck shown in FIG. 23.

With reference now to FIG. 28, in another alternative embodiment, wafer chuck 1604 is depicted having line 1852. Accordingly, when wafer chuck 1604 is closed, a vacuum and/or a reduced pressure gas is first applied to line 1852 to increase the force holding together wafer chuck 1604. After the electroplating and/or electropolishing process, a pressure gas can be applied to line 1852 to help purge electrolyte from wafer chuck 1604.

Figure 29:
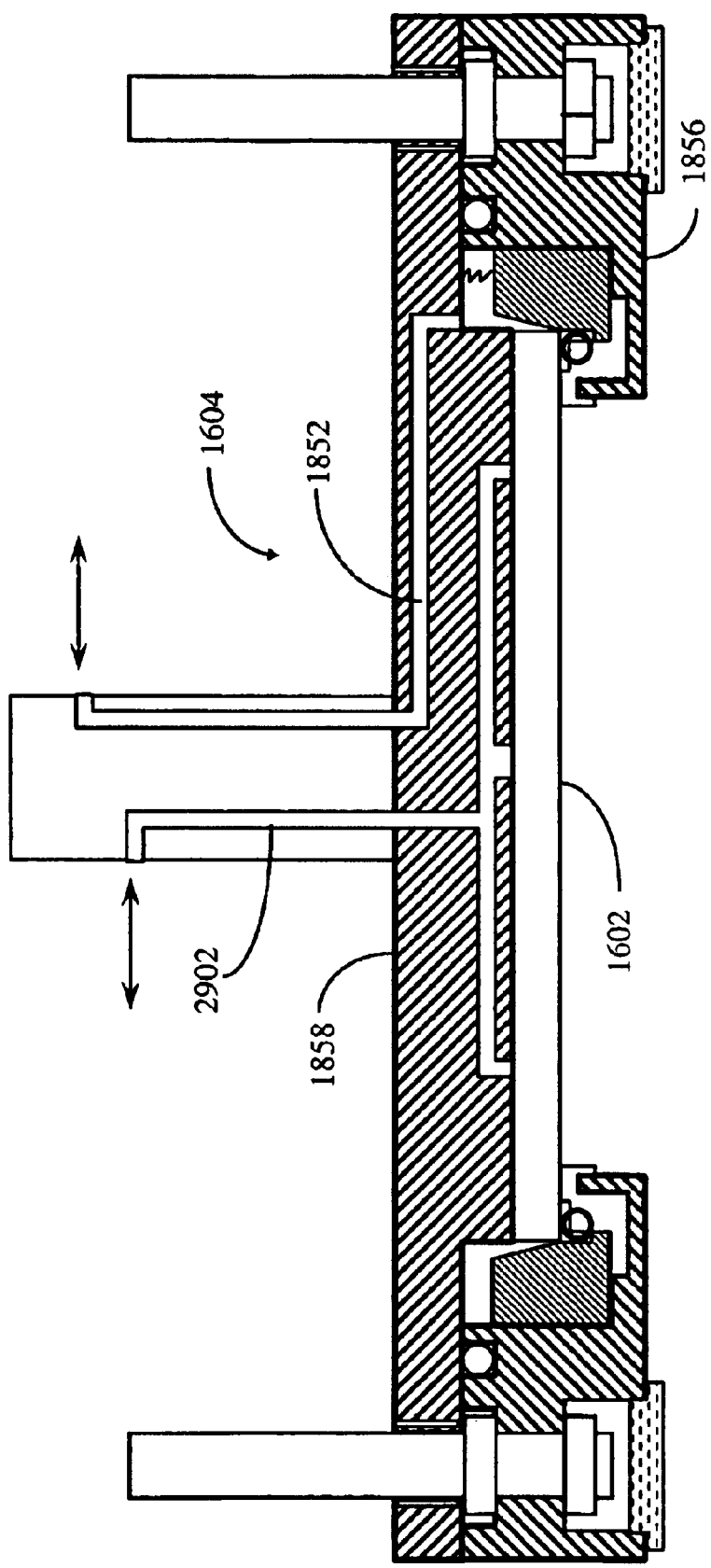
FIG. 29 is a cross sectional view of still another alternative configuration of the wafer chuck shown in FIG. 23.

With reference now to FIG. 29, in still another alternative embodiment, wafer chuck 1604 is depicted having a line 2902 to apply a vacuum and/or a reduced pressure gas and pressure gas to the surface of wafer 1602. Accordingly, after wafer chuck 1604 is closed, a vacuum and/or a reduced pressure gas is applied to line 1852 and line 2902 to increase the force holding together wafer chuck 1604. After the electroplating and/or electropolishing process, a pressure gas can be applied to line 1852 to help purge electrolyte from wafer chuck 1604. Then, wafer chuck 1604 is opened, preferably with a gap of about 1 millimeter to about 3 millimeter, preferably about 1.5 millimeter. After wafer chuck 1604 is opened, pressure gas can be applied to line 2902 to help dislodge wafer 1602.

Figure 30:
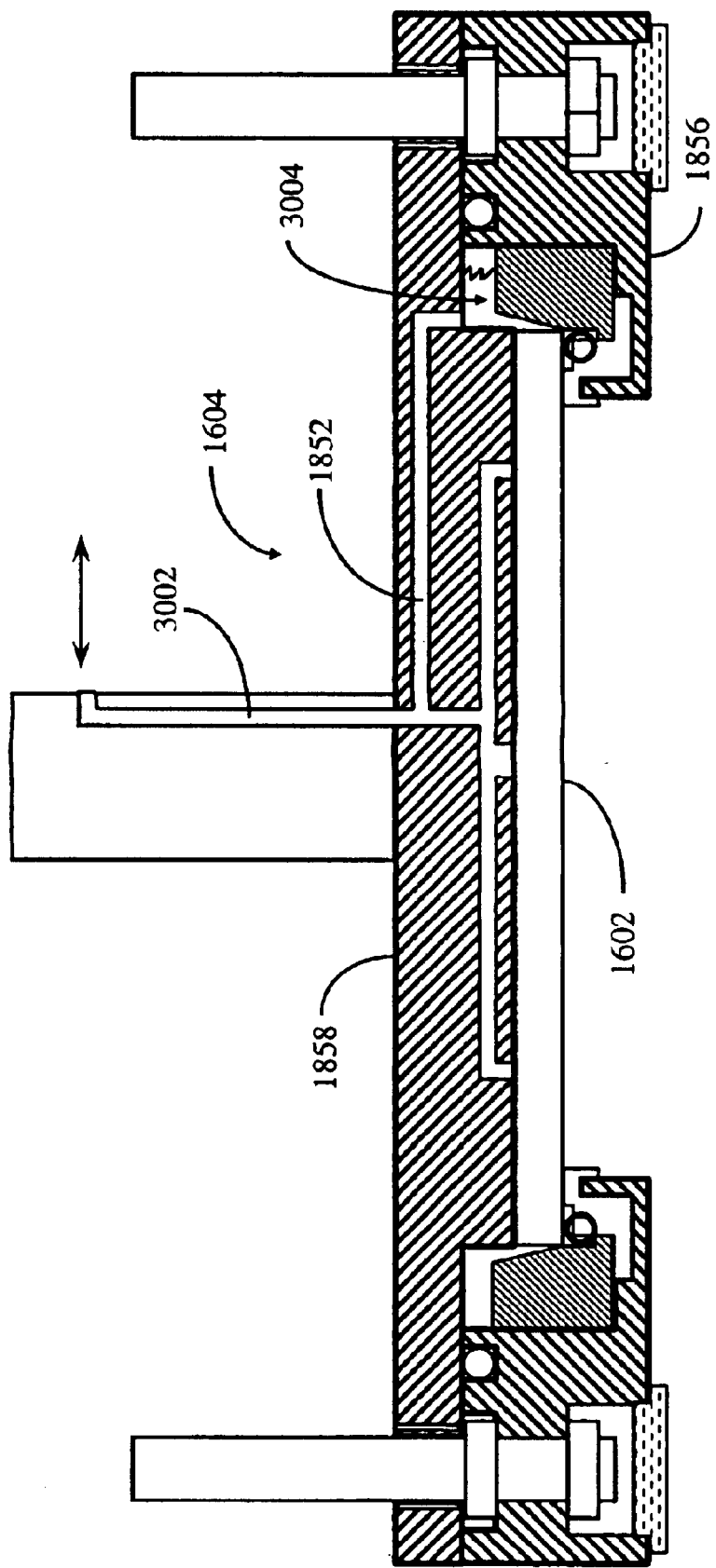
FIG. 30 is a cross sectional view of yet another alternative configuration of the wafer chuck shown in FIG. 29.

With reference now to FIG. 30, in yet another alternative embodiment, wafer chuck 1604 is depicted having a single line 3002. Accordingly, vacuum and/or a reduced pressure gas and pressure gases are applied at the same time to cavity 3004 and to the surface of wafer 1602.

With reference to FIGS. 31 through 33, a more detailed depiction of an exemplary embodiment of electroplating and/or electropolishing station 102 is shown. As described above, electroplating and/or electropolishing station 102 includes one or more electroplating and/or electropolishing cells 112. More particularly, in the present exemplary embodiment, electroplating and/or electropolishing station 102 includes three electroplating and/or electropolishing cells 112 mounted in a frame 3202. As alluded to earlier, however, any number of electroplating and/or electropolishing cells 112 can be mounted in frame 3202 depending on the particular application.

In the present exemplary embodiment, electroplating and/or electropolishing station 102 also includes guide rails 3204 and an air cylinder 3206 for moving wafer chuck assembly 1600. More particularly, air cylinder 3206 translates wafer chuck assembly 1600 along guide rails 3204 attached to frame 3202. In this manner, as depicted in FIGS. 32A and 32B, wafer chuck assembly 1600 and wafer chuck 1604 can be retracted from electrolyte receptacle 1608 for servicing of electroplating and/or electropolishing cell 112 including wafer chuck assembly 1600 and wafer chuck 1604. More particular, in FIG. 32B, electroplating and/or electropolishing cell 112 is depicted with wafer chuck assembly 1600 retracted in an open position. In FIG. 32A, electroplating and/or electropolishing cell 112 is depicted with wafer chuck assembly 1600 in a closed position over electrolyte receptacle 1608. It should be recognized, however, that various actuators can be used to retract wafer chuck assembly 1600.

With reference to FIGS. 31A, 32A and 33A, electroplating and/or electropolishing cell 112 includes electrolyte solution receptacle 1608 and wafer chuck assembly 1600. As depicted in FIG. 32A, wafer chuck assembly 1600 includes lid 1810 to cover electrolyte solution receptacle 1608. As such, lid 1810 includes an exhaust hole 3208 for removing vapors from within electrolyte solution receptacle 1608. In this manner, each electroplating and/or electropolishing cell 112 in electroplating and/or electropolishing station 102 can be individually vented, thus reducing the need for a large ventilation system for the entire electroplating and/or electropolishing station 102 (FIGS. 32A and 33A).

As depicted in FIGS. 31A and 32A, wafer 1602 can be inserted into and removed from electrolyte solution receptacle 1608 through slot 1892. More particularly, as describe above, robot 106 transports wafer 1602 into and out of electrolyte solution receptacle 1608. Although slot 1892 is depicted as being formed in electrolyte receptacle 1608, slot 1892 can also be formed in lid 1810.

As described earlier, wafer 1602 is held by wafer chuck 1604 (FIG. 18A). With reference to FIG. 31A, in the present exemplary embodiment, wafer chuck assembly 1600 lowers wafer 1602 into electrolyte receptacle 1608 to be electroplated and/or electropolished. After the electroplating and/or electropolishing process is complete, wafer chuck assembly 1600 raises wafer 1602 to be unloaded and a new wafer 1602 to be loaded.

Figure 37:
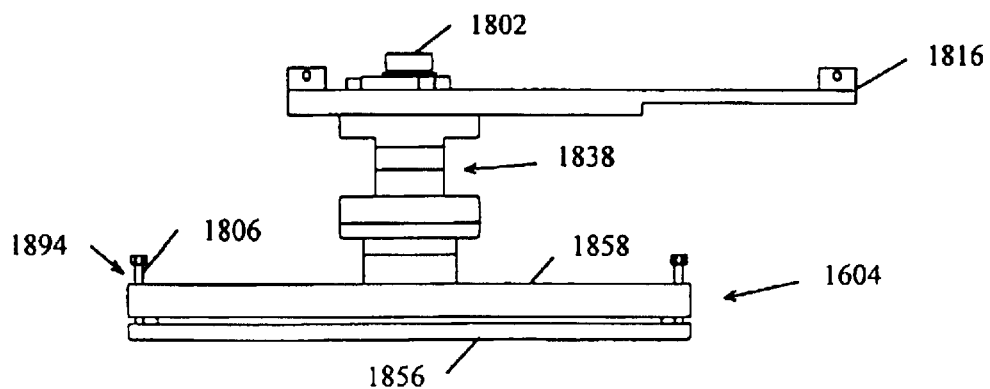
FIG. 37 is a side view of the portion shown in FIG. 36.

With reference now to FIG. 37, as described above, wafer chuck assembly 1600 (FIG. 31A) includes bracket 1816. In the present exemplary embodiment, bracket 1816 is connected to wafer chuck 1604 through shaft 1802 (FIG. 18A). More particularly, as will be described in greater detail below, shaft 1802 is fixed to top section 1858 of wafer chuck 1604. Additionally, slip-ring assembly 1838 is fixed to bracket 1816. Accordingly, shaft 1802 is disposed within slip-ring assembly 1838.

Figure 34:
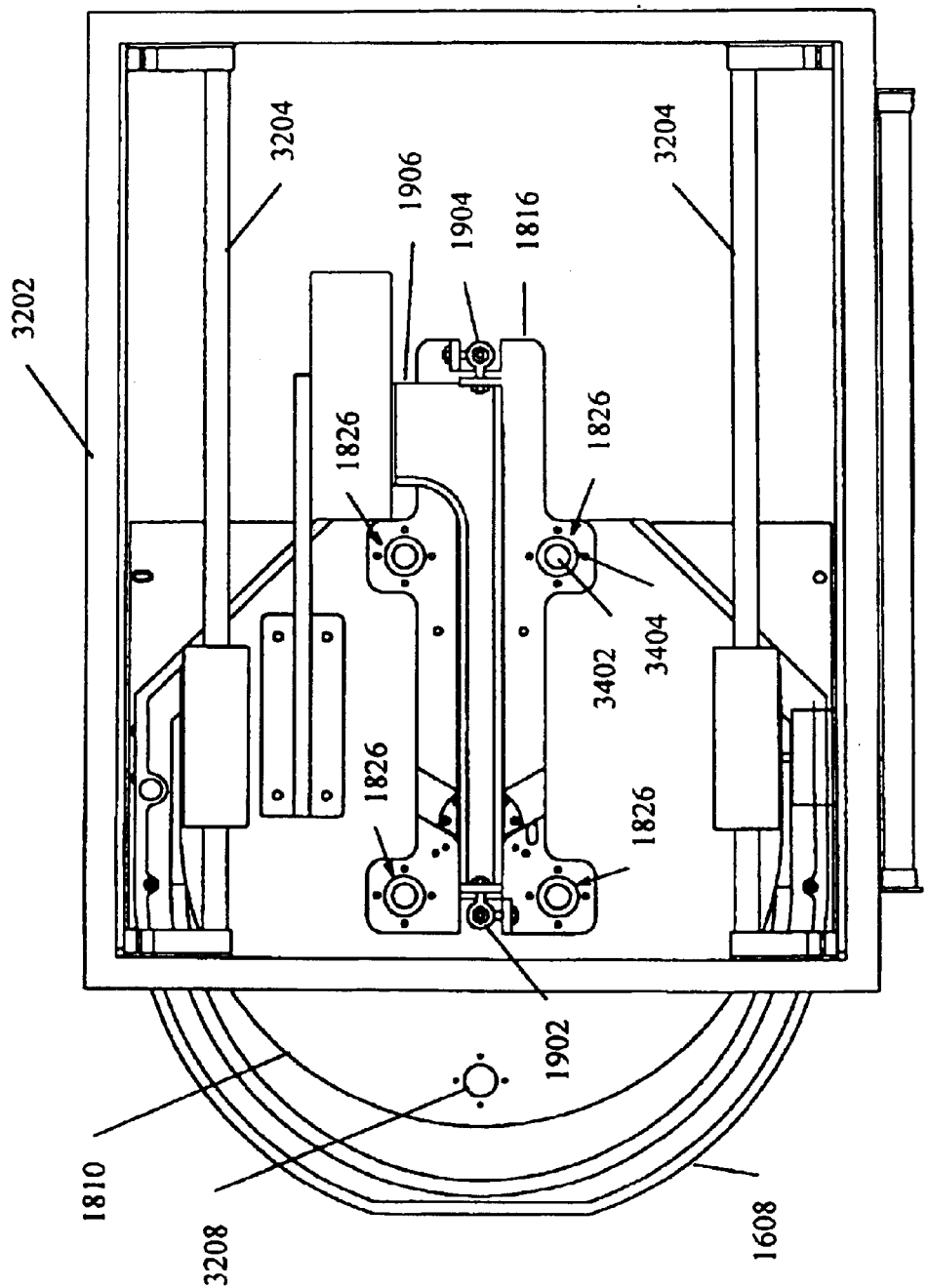
FIG. 34 is a top view of an exemplary embodiment of an electroplating and/or electropolishing cell shown in FIGS. 31 through 33.
Figure 35:
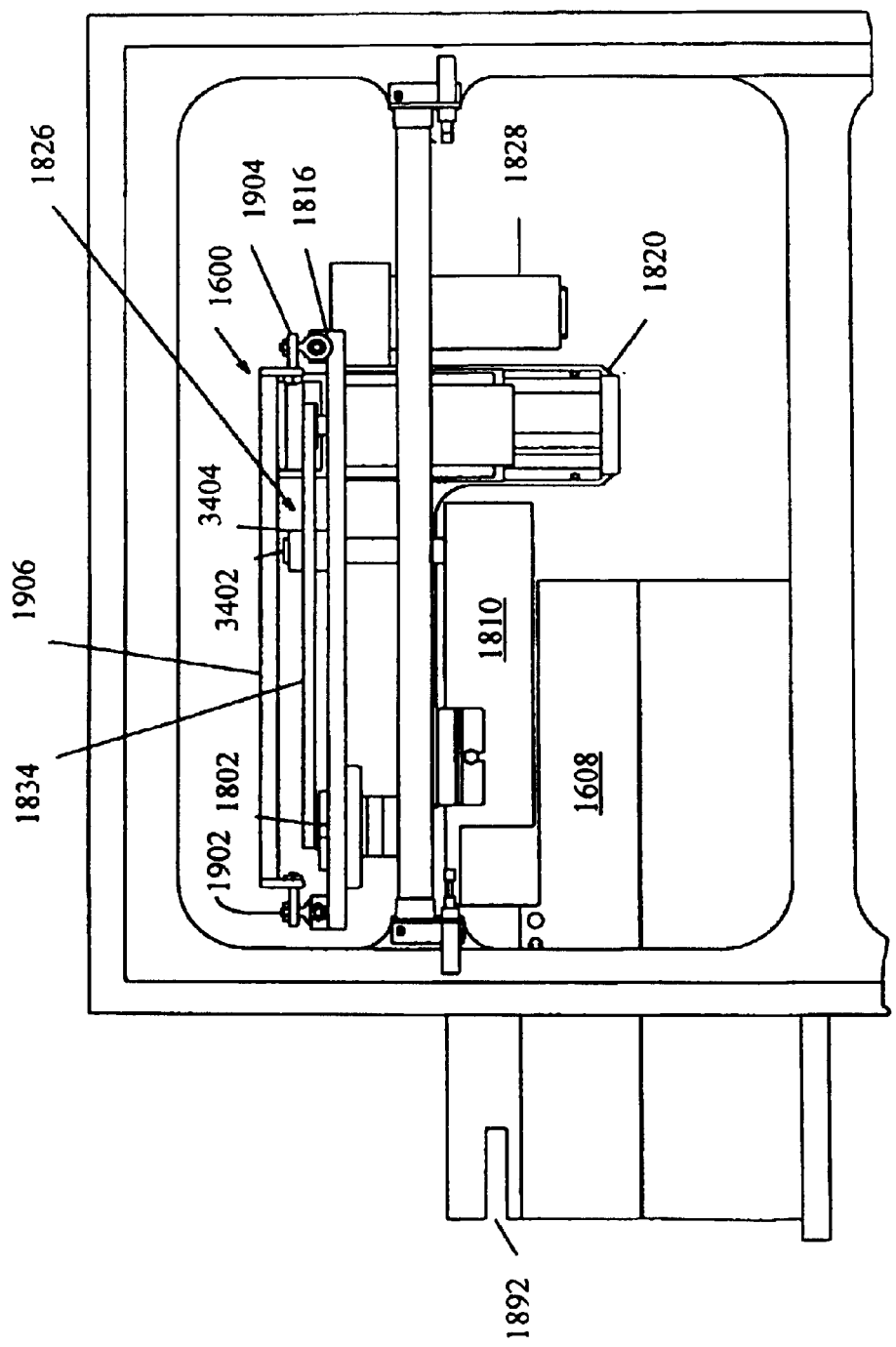
FIG. 35 is a side view of the exemplary embodiment of the electroplating and/or electropolishing cell shown in FIG. 34.
Figure 36:
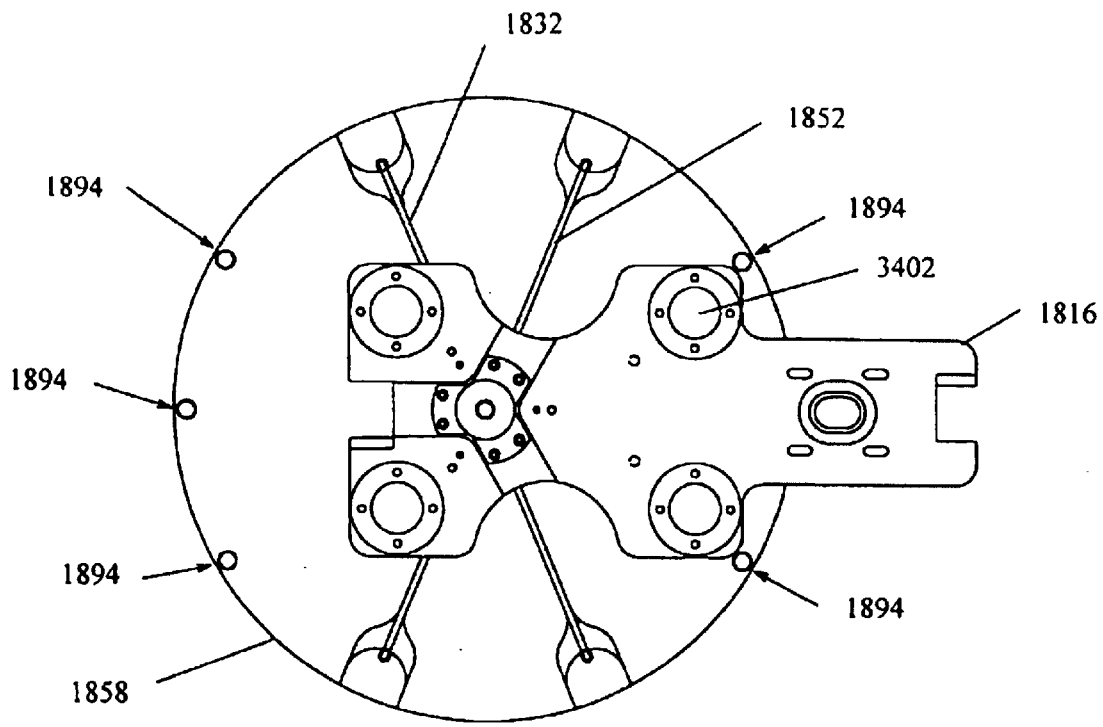
FIG. 36 is a top view of a portion of the electroplating and/or electropolishing cell shown in FIG. 34.

With reference now to FIG. 35, it should be recognized that a portion of wafer chuck assembly 1600 lies below lid 1810. With reference now to FIG. 34, in the present exemplary embodiment, bracket 1816 includes guide rails 1826. More particularly, in the present exemplary embodiment, each guide rail 1826 include a rod 3402 disposed within a bushing 3404. Rod 3402 is mounted to lid 1810 and bushing 3404 is connected to bracket 1816. Additionally, in the present exemplary embodiment, four guide rails 1826 are provided. It should be recognized, however, that any number of guide rails 1826 can be used depending on the particular application.

Thus, with reference now to FIG. 35, motor 1828 is configured to move bracket 1816 along guide rails 1826. More particularly motor 1828 engages with lead screw 1820 to move bracket 1816. Additionally, as described above, in the present exemplary embodiment, bracket 1816 is connected to bracket 1906. More particularly, brackets 1816 and 1906 are connected through joints 1902 and 1904 to permit movement between brackets 1816 and 1906. As described earlier, joints 1902 and 1904 reduces the likelihood of brackets 1816 and 1906 seizing on guide rails 1826.

With reference now to FIG. 37, as described above, wafer chuck 1604 is configured to be rotated. With reference now to FIG. 35, motor 1836 is configured to rotate wafer chuck 1604 (FIG. 37). More particularly, in the present exemplary embodiment, motor 1836 rotates shaft 1802 through drive belt 1834. With reference again to FIG. 37, shaft 1802 is fixed to top section 1858 of wafer chuck 1604. Additionally, shaft 1802 rotates within slip-ring assembly 1838.

With continued reference to FIG. 37, as described above, wafer chuck 1604 includes a plurality of spring assemblies 1894 configured to open and close wafer chuck 1604. More particularly, in the present exemplary embodiment, wafer chuck 1604 includes six spring assemblies 1894. It should be recognized, however, that any number of spring assemblies 1894 can be used depending on the particular application.

Figure 40A:
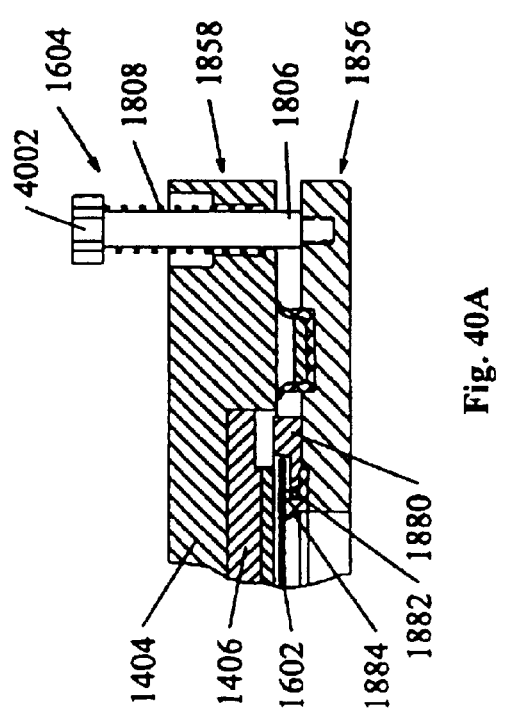
FIGS. 40A and 40B are a cross sectional views of the portion shown in FIG. 38 taken through line 40.
Figure 40B:
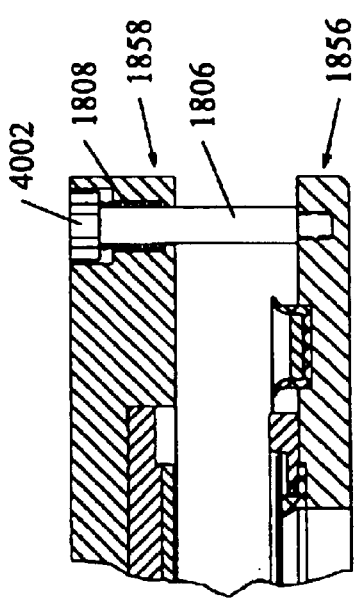

With continued reference to FIG. 37, in the present exemplary embodiment, each spring assembly 1894 includes rod 1806 with one end formed with a head portion rather than collar 1804 (FIG. 18A). More particularly, with reference to FIGS. 40A and 40B, one end of rod 1806 is fixed to bottom section 1856 of wafer chuck 1604. The other end of rod 1806 includes a head portion 4002. Additionally, spring 1808 is disposed around rod 1806 and between top section 1858 and head portion 4002. Accordingly, when wafer chuck 1604 is in a lowered position, spring 1808 is extended to apply a force to hold top section 1858 and bottom section 1856 closed. As wafer chuck 1604 is raised, head portion 4002 eventually contacts the underside of lid 1810 (FIG. 34). Accordingly, spring 1808 becomes compressed, and rod 1806 separates top section 1858 from bottom section 1856 to open wafer chuck 1604.

Figure 41:
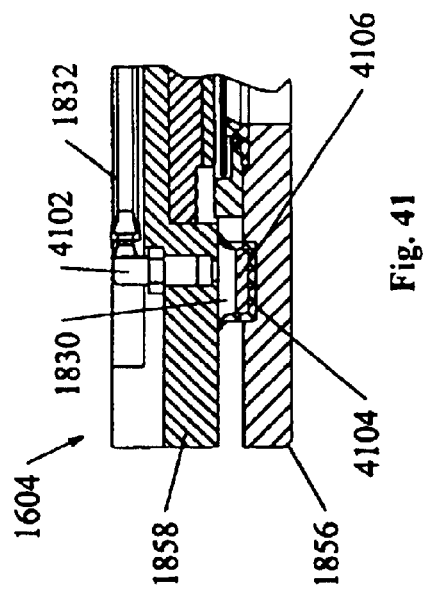
FIG. 41 is a cross sectional view of the portion shown in FIG. 38 taken through line 41.

As described above, with reference to FIG. 37, in addition to the force applied by spring assemblies 1894, a vacuum and/or reduced pressure is applied to hold together wafer chuck 1604. With reference to FIG. 41, in the present exemplary embodiment, vacuum and/or reduced pressure is applied to cavity 1830 formed by a seal 4104. In earlier descriptions and as depicted in FIGS. 18A through 18C, cavity 1830 was formed in bottom section 1856 and sealed by seals 1878. In comparison, with reference again to FIG. 41, seal 4104 can be more easily installed into bottom section 1856 using any convenient fastening device and/or method, such as screws, bolts, adhesives, and the like. More particularly, in the present exemplary embodiment, seal 4104 is attached using a ring 1406, which can be fastened to bottom section 1856 using any convenient fastening device, such as screws, bolts, and the like. Ring 1406 helps to distribute the force applied by the fastening devices around seal 4104. Additionally, the use of seal 4104 can be more cost efficient and more reliable than forming cavity 1830 in bottom section 1856. Seal 4104 can include any flexible compliant material such as Viton, (fluorocarbon) rubber, silicon rubber, and the like.

Figure 42:
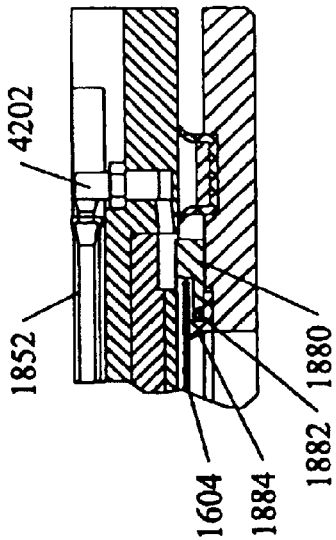
FIG. 42 is another cross sectional view of the portion shown in FIG. 38 taken through line 42.

With reference to FIG. 42, as described above, vacuum and/or reduced pressure can be supplied to cavity 1892 to check and/or enhance the seal formed by seal member 1884. Additionally, as also described above, pressure gas can be supplied to cavity 1892 to check the seal formed by seal member 1884, to enhance the seal formed by seal member 1884, to purge residual electrolyte solution, and various other purposes.

Figure 48:
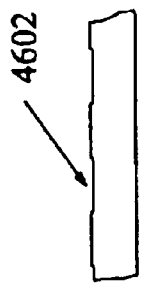
FIG. 48 is an enlarged view of a portion of the side view shown in FIG. 47.
Figure 46:
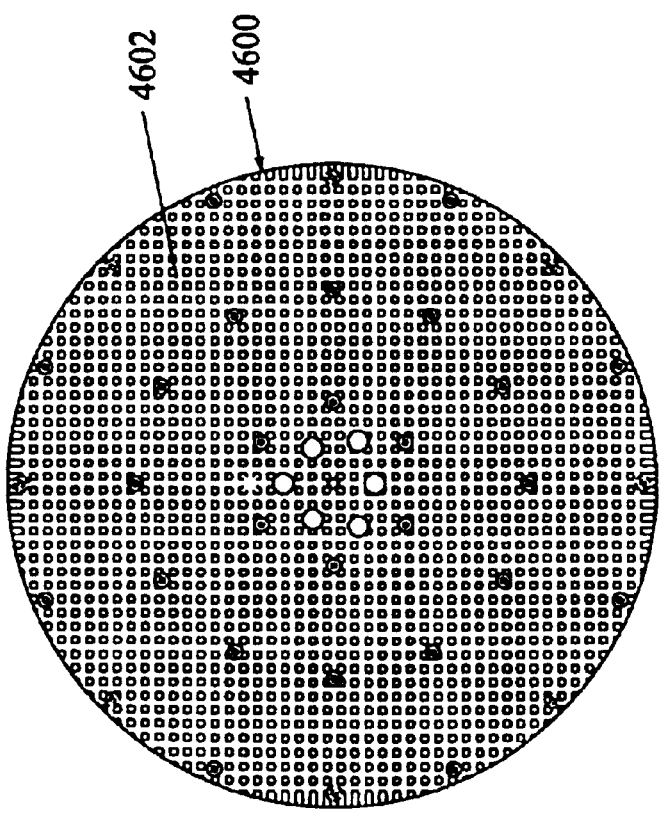
FIG. 46 is a bottom view of yet another portion of the electroplating and/or electropolishing cell shown in FIG. 34.
Figure 47:
FIG. 47 is a side view of the portion shown in FIG. 46.

However, when vacuum and/or reduced pressure gas is applied to cavity 1892, some of the vacuum and/or reduced pressure gas can seep into the interface between wafer 1602 and top section 1852. As such, even when the vacuum and/or reduced pressure gas is stopped, wafer 1602 can remain adhered to top section 1852 when wafer chuck 1604 (FIG. 37) is in an open position, thus making removal of wafer 1602 more difficult. With reference to FIGS. 46 through 48, to prevent wafer 1602 (FIG. 42) from adhering to top section 1852 (FIG. 42), a textured pad 4600 can be provided between wafer 1602 (FIG. 42) and top section 1852 (FIG. 42). In the present embodiment, textured pad 4600 includes a multitude of grooves 4602 formed throughout the surface to be in contact with wafer 1602 (FIG. 42). As such, any vacuum and/or reduced pressure gas, which seeps behind wafer 1602 (FIG. 42), can more easily escape. Consequently, wafer 1602 (FIG. 42) is less likely to adhere to top section 1852 (FIG. 42).

Figure 38:
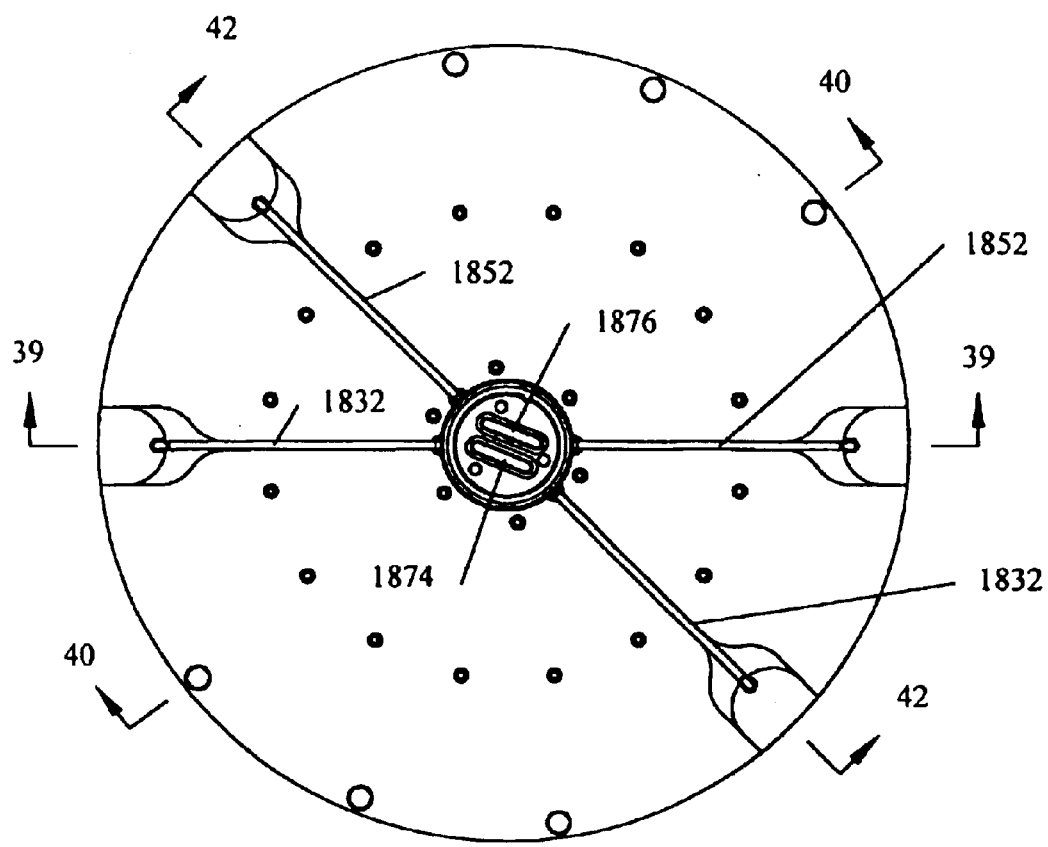
FIG. 38 is a top view of another portion of the electroplating and/or electropolishing cell shown in FIG. 34.
Figure 39:
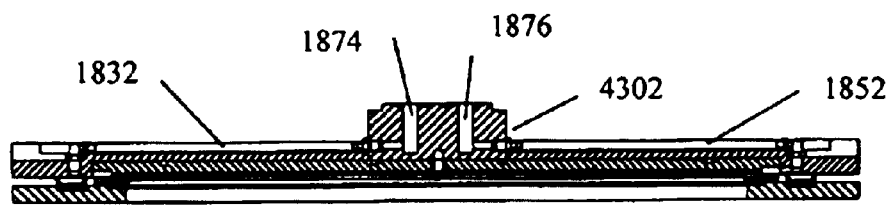
FIG. 39 is a side view of the portion shown in FIG. 38.

With reference again to FIGS. 41 and 42, in the present exemplary embodiment, vacuum, reduced pressure, and/or pressure gases are supplied to cavities 1830 and 1892 through fittings 4102 (FIG. 41) and 4202 (FIG. 42), respectively. With reference now to FIG. 38, vacuum, reduced pressure, and/or pressure gases are supplied to fitting 4102 (FIG. 41) and fitting 4202 (FIG. 42) through line 1832 from channel 1874 and line 1852 from channel 1876, respectively.

Figure 43:
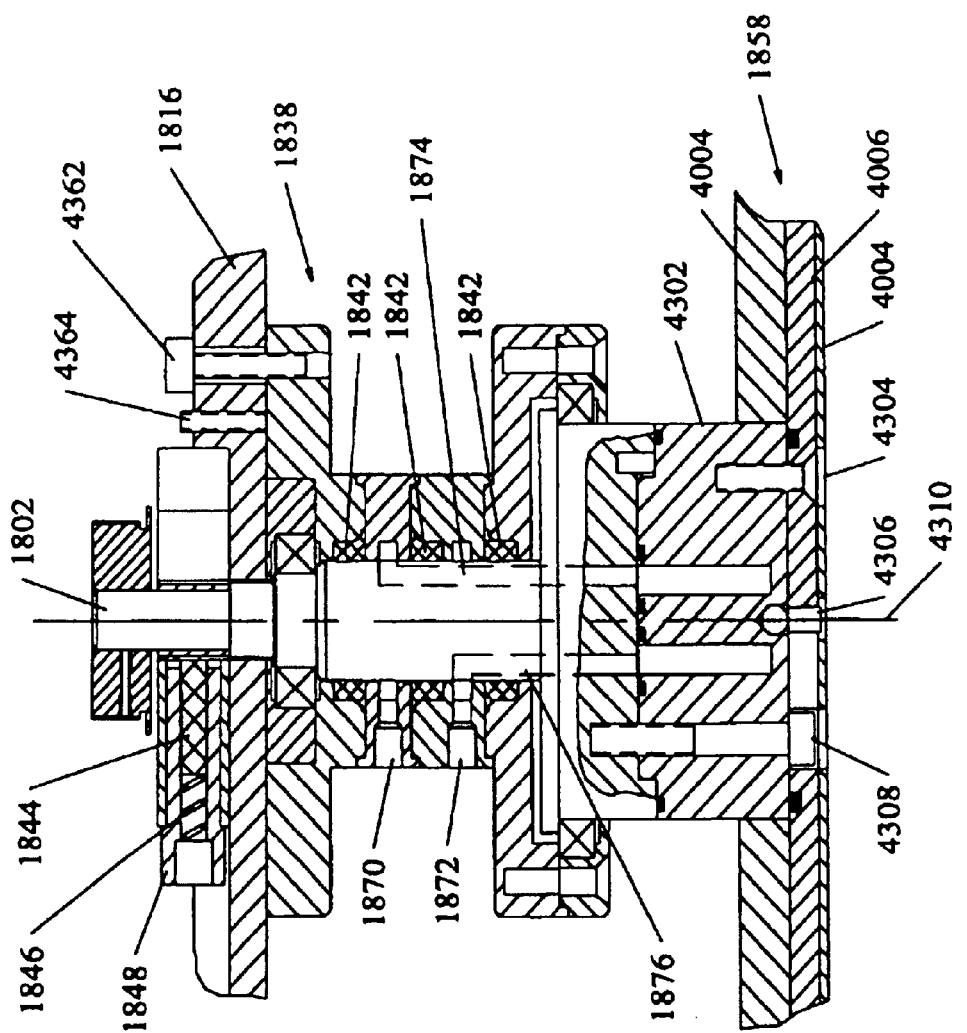
FIG. 43 is a cross sectional view of a portion of the electroplating and/or electropolishing cell shown in FIG. 34.

With reference to FIG. 43, vacuum, reduced pressure, and/or pressure gases are supplied to channels 1874 and 1876 formed in shaft 1802 through slip-ring assembly 1838. As described above, slip-ring assembly 1838 is configured to supply vacuum and/or reduced pressure into shaft 1802 even as shaft 1802 is rotating. More particularly, as described above, seals 1842 form cavities 1866 and 1868 (FIG. 18B) in between shaft 1802 and slip-ring assembly 1838, into which vacuum and/or reduced pressure can be introduced through inlets 1870 and 1872.

With reference to FIG. 16, as described above, maintaining wafer 1602 in parallel alignment with the surface level of electrolyte solution 1656 in electrolyte receptacle 1608 helps to enhance the uniformity of the electroplating and/or electropolishing process. In this regard, with reference to FIG. 43, the alignment of bracket 1816 can be configured to be parallel with wafer chuck 1858.

Figure 44:
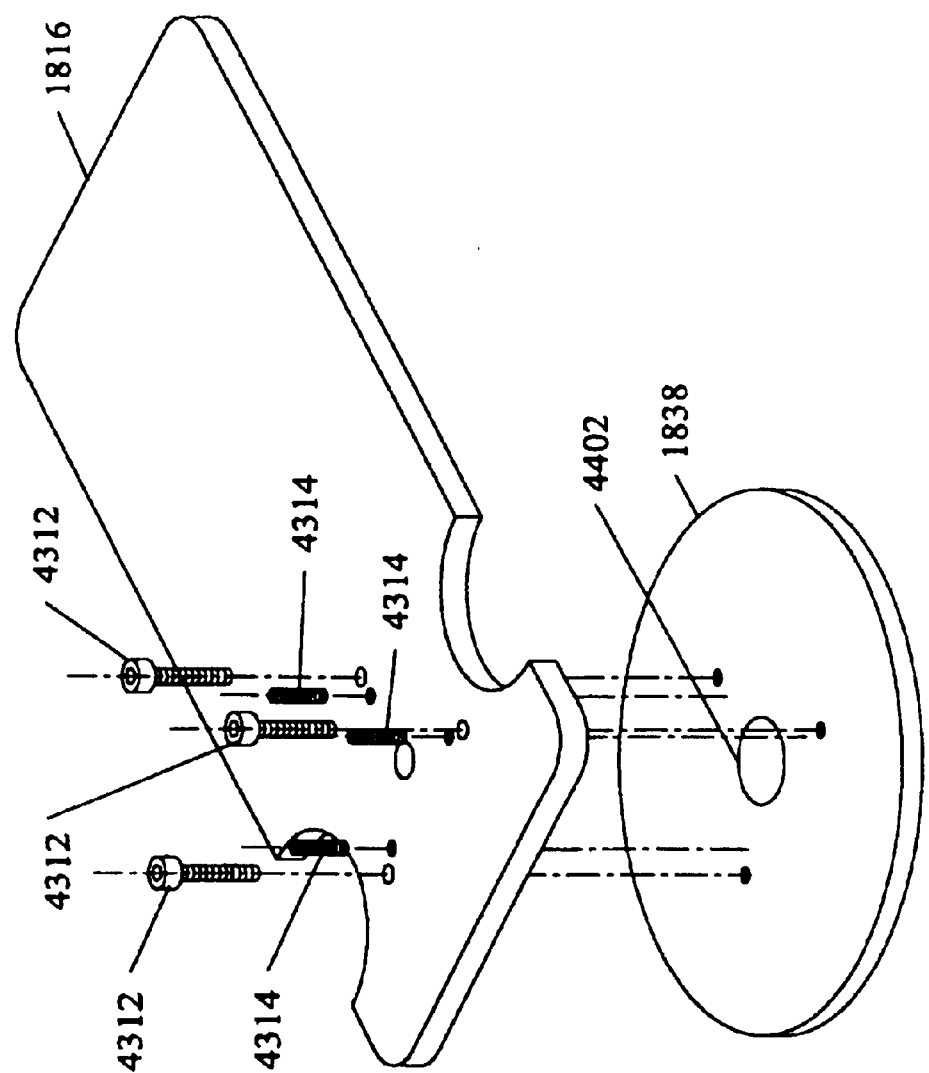
FIG. 44 is a perspective view of another portion of the electroplating and/or electropolishing cell shown in FIG. 34.

With reference to FIG. 44, the alignment of bracket 1816 with respect to slip-ring assembly 1838 can be adjusted by variously adjusting a plurality of screws 4312 and a plurality of set screws 4314. More particularly, the gap between bracket 1816 and slip-ring assembly 1838 can be increased and decreased by adjusting screws 4312 and set-screws 4314, respectively. In the present embodiment, the use of at least three screws 4312 and three set-screws 4314 permits slip-ring assembly 1838 to be essentially gimbaled relative to bracket 1816. It should be recognized, however, that various devices and methods can be employed to permit the alignment of bracket 1816 and slip-ring assembly 1838 to be adjusted.

Figure 45:
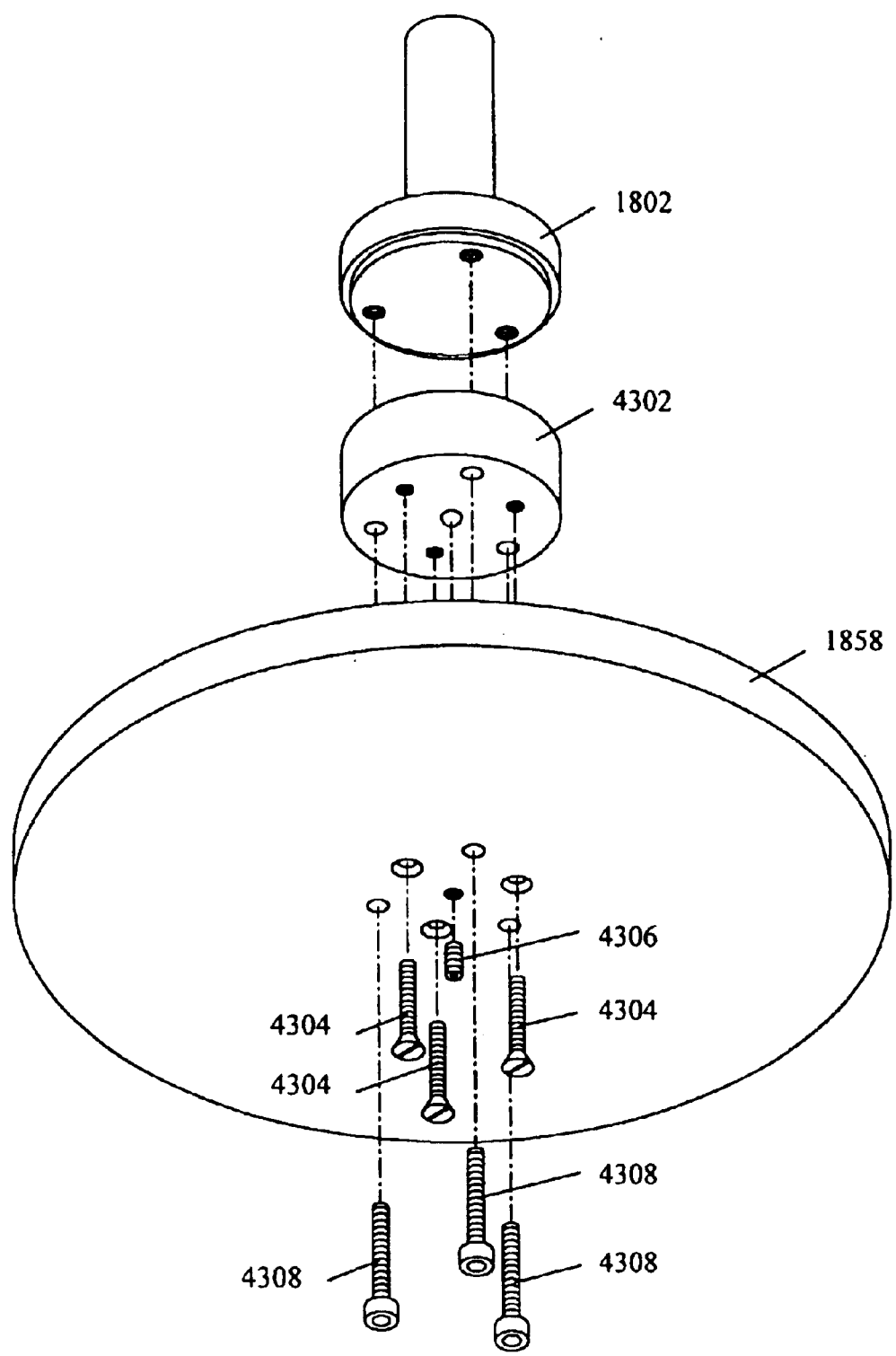
FIG. 45 is a perspective view of still another portion of the electroplating and/or electropolishing cell shown in FIG. 34.

With reference to FIG. 45, the alignment of top section 1858 with respect to shaft 1802 can be adjusted by variously adjusting a plurality of screws 4304 and a set screw 4306. In the present embodiment, the adjustment of screws 4304 and set screw 4306 adjusts the alignment of top section 1858 with respect to a stem piece 4302. More particularly, the gap between top section 1858 and stem piece 4302 can be adjusted using screws 4304 and set screw 4306. In the present embodiment, the use of three screws 4304 and the location of set screw 4306 at the center of top section 1858 and stem piece 4302 permits top section 1858 to be essentially gimbaled relative to stem piece 4302.

Additionally, in the present embodiment, stem piece 4302 is attached to shaft 1802 with a plurality of bolts 4308. In this manner, top section 1858 can be removed from shaft 1802 without having to necessarily reset its alignment. As alluded to earlier, wafer chuck 1604 (FIG. 37) can be removed for various purposes, such as inspection, repair, maintenance, and the like. To facilitate ease of re-alignment afterwards, with reference to FIG. 43, in the present embodiment, stem piece 4302 and shaft 1802 are joined using a tenon and mortise shaped joint. Additionally, bolts 4308 only contact stem piece 4302 and shaft 1802. In this manner, adjustment of bolts 4308 does not affect the alignment of top portion 1858 to stem piece 4302.

Figure 49:
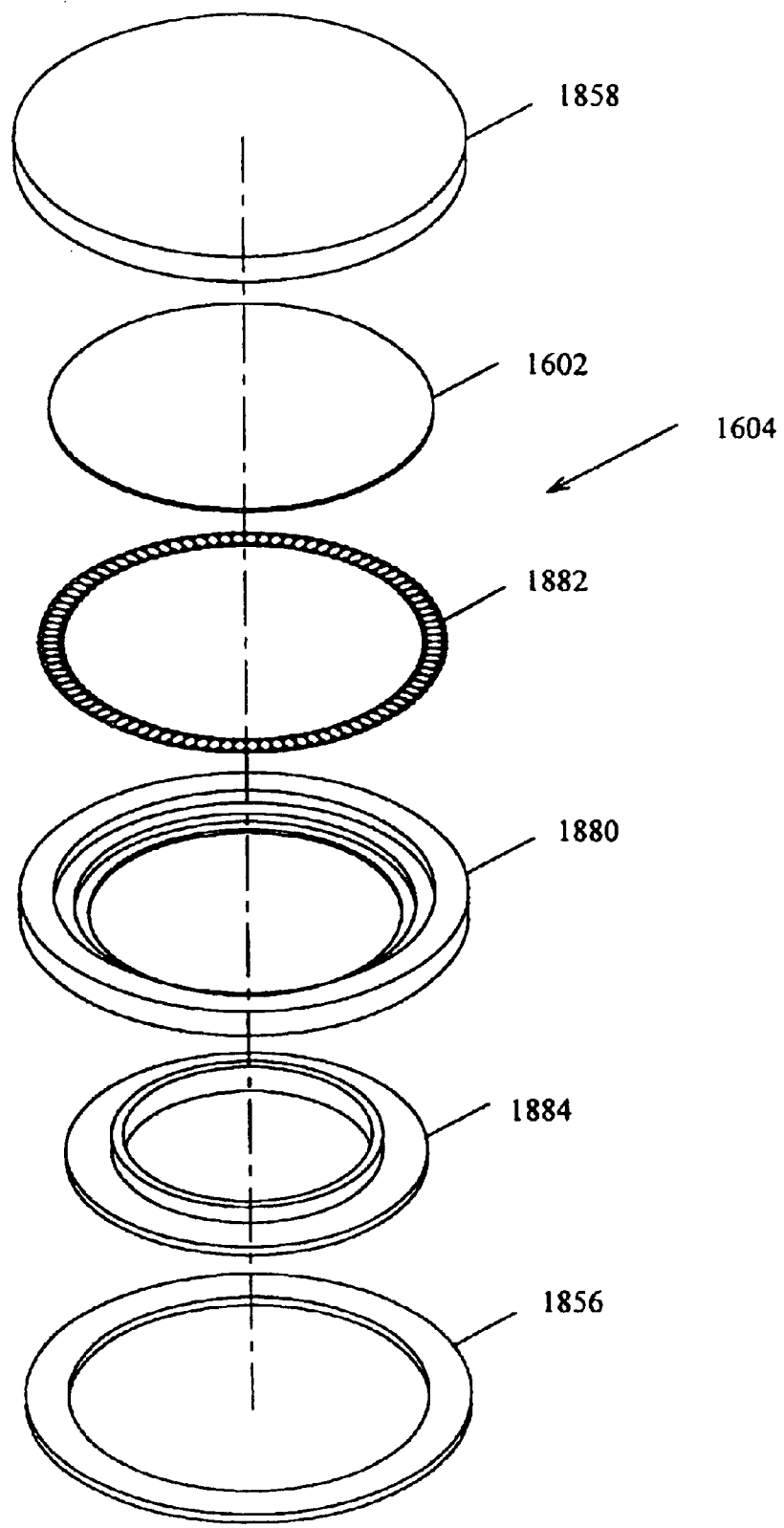
FIG. 49 is an exploded perspective view of an exemplary embodiment of a wafer chuck.

Having thus described various exemplary embodiments of a wafer chuck assembly, various exemplary embodiments of wafer chuck 1604 will be described below. With reference now to FIGS. 49, wafer chuck 1604 includes bottom section 1856 and top section 1858. Bottom section 1856 is formed having an opening to expose the bottom surface of wafer 1602 during the electroplating and/or electropolishing process.

In one exemplary embodiment, bottom section 1856 and top section 1858 are formed from any convenient material electrically insulated and resistant to acid and corrosion, such as ceramic, polytetrafluoroethylene (commercially known as TEFLON), PolyVinyl Choride (PVC), PolyVinylindene Fluoride (PVDF), Polypropylene, and the like. Alternatively, bottom section 1856 and top section 1858 can be formed from any electrically conducting material (such as metal, metal alloy, and the like), coated with material, which is electrically insulating and resistant to acid and corrosion. In the present exemplary embodiment, bottom section 1856 and top section 1858 are formed from a sandwich of a layer of metal with a layer of plastic. The metal layer provides structural integrity and strength. The plastic layer provides protection against the electrolyte solution.

Figure 67:
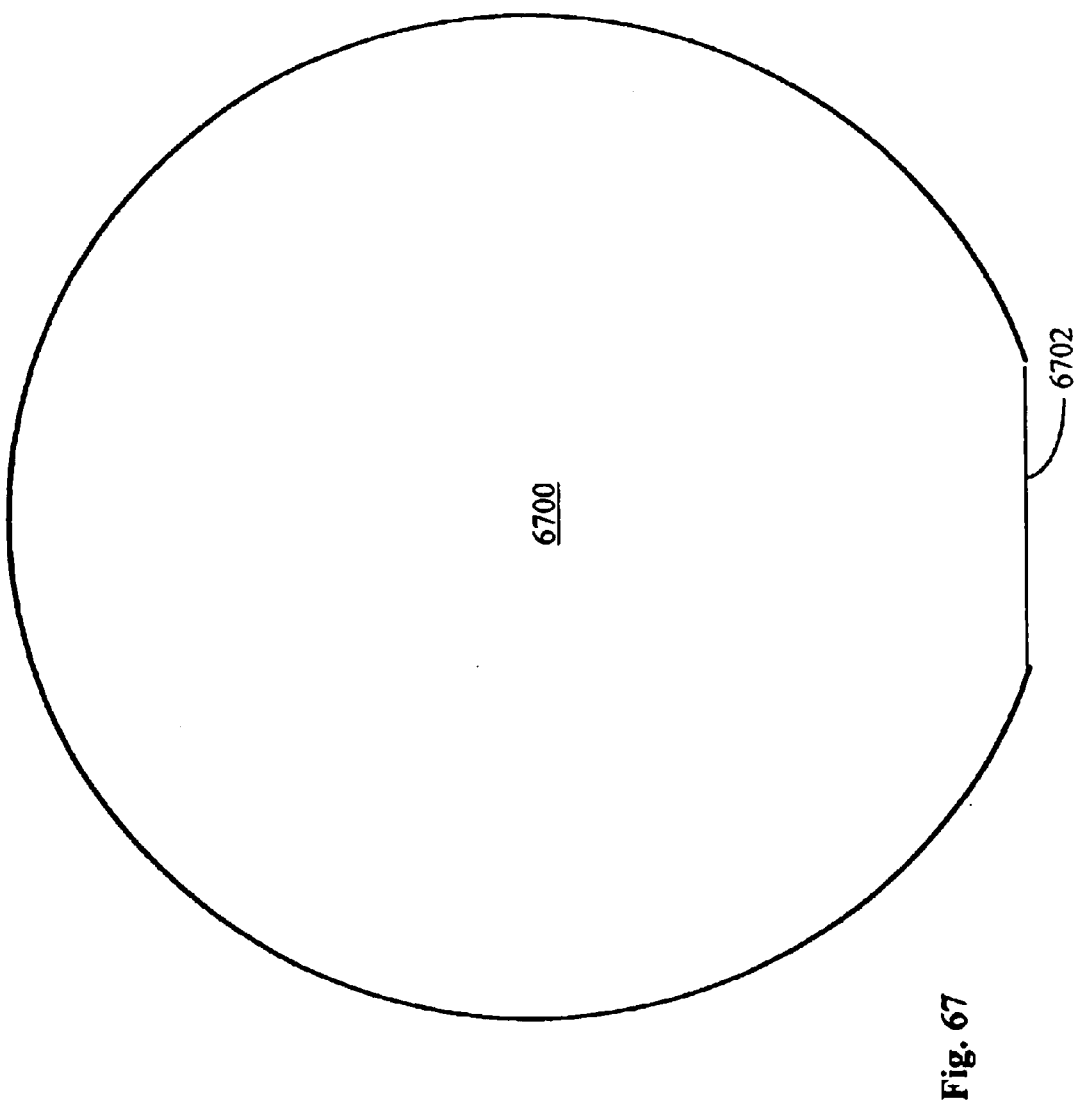
FIG. 67 is a top view of a wafer.

Wafer chuck 1604 according to various aspects of the present invention further includes a spring member 1882, a conducting member 1880, and a seal member 1884. As alluded to earlier, the present invention is particular well suited for use in connection with holding semiconductor wafers. In general, semiconductor wafers are substantially circular in shape. Accordingly, the various components of wafer chuck 1604 (i.e, bottom section 1856, seal member 1884, conducting member 1880, spring member 1882, and top section 1858) are depicted as having substantially circular shape. It should be recognized, however, that the various components of wafer chuck 1604 can include various shapes depending on the particular application. For example, with reference to FIG. 67, wafer 6700 can be formed with a flat edge 6702. Thus, the various components of wafer chuck 1604 can be formed to conform with flat edge 6702.

Figure 51:
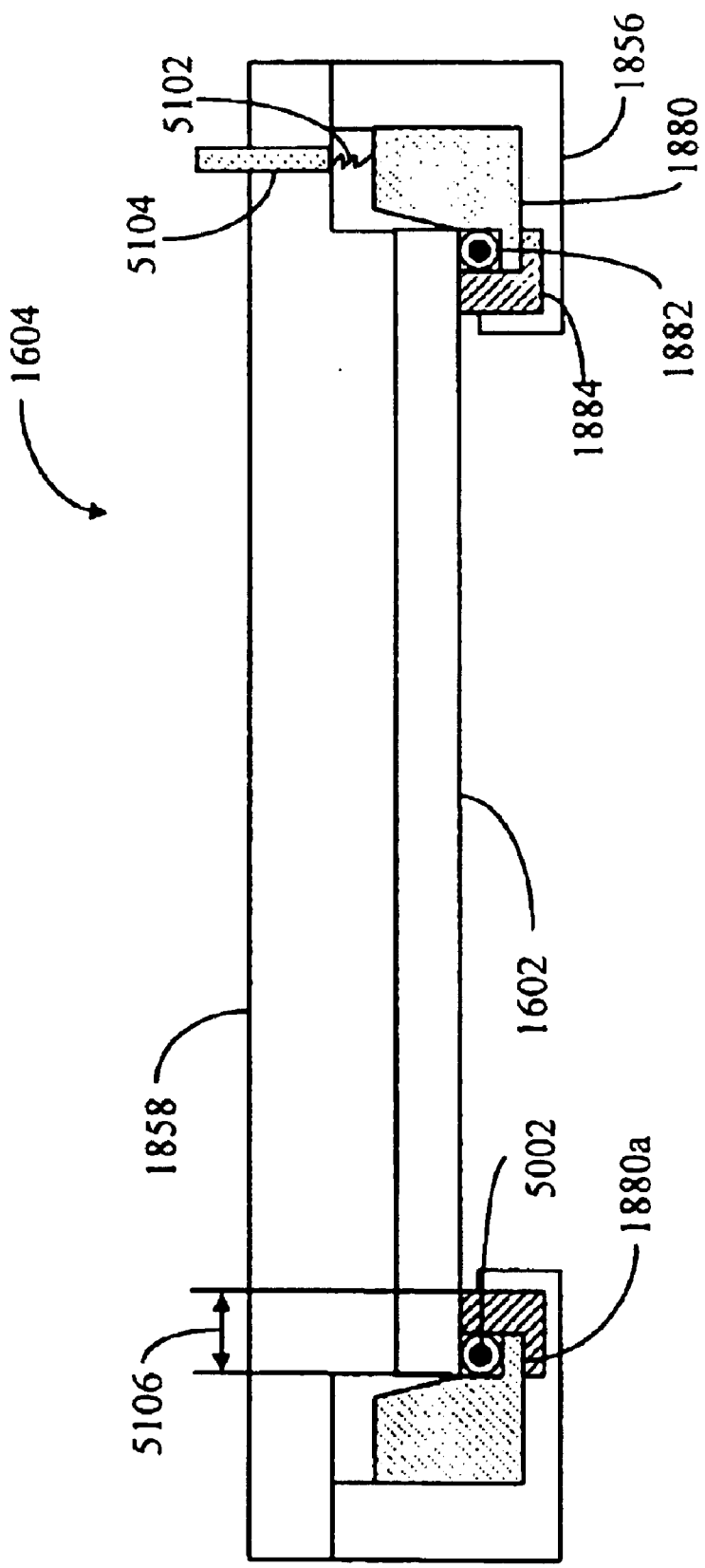
FIG. 51 is a cross section view of the wafer chuck shown in FIG. 49.

With reference now to FIG. 51, when wafer 1602 is disposed between bottom section 1856 and top section 1858, in accordance with one aspect of the present invention, spring member 1882 preferably contacts wafer 1602 around the outer perimeter of wafer 1602. Spring member 1882 also preferably contacts conducting member 1880. Thus, when an electric charge is applied to conducting member 1880, the electric charge is transmitted to wafer 1602 through spring member 1882.

As depicted in FIG. 51, in the present exemplary embodiment, spring member 1882 is disposed between wafer 1602 and lip portion 1880a of conducting member 1880. Accordingly, when pressure is applied to hold bottom section 1856 and top section 1858 together, spring member 1882 conforms to maintain electrical contact between wafer 1602 and conducting member 1880. More particularly, the tops and bottoms of the coils in spring member 1882 contact wafer 1602 and lip portion 1880a, respectively. Additionally, spring member 1882 can be joined to lip portion 1880a to form a better electrical contact using any convenient method, such as soldering, welding, and the like.

The number of contact points formed between wafer 1602 and conducting member 1880 can be varied by varying the number of coils in spring member 1882. In this manner, the electric charge applied to wafer 1602 can be more evenly distributed around the outer perimeter of wafer 1602. For example, for a 200 millimeter (mm) wafer, an electric charge having about 1 to about 10 amperes is typically applied. If spring member 1882 forms about 1000 contact points with wafer 1602, then for the 200 mm wafer, the applied electric charge is reduced to about 1 to about 10 milli-amperes per contact point.

In the present exemplary embodiment, conducting member 1880 has been thus far depicted and described as having a lip section 1880a It should be recognized, however, that conducting member 1880 can include various configurations to electrically contact spring member 1882. For example, conducting member 1880 can be formed without lip section 1880a. In this configuration, electrical contact can be formed between the side of conducting member 1880 and spring member 1882. Moreover, conducting member 1880 can be removed altogether. An electric charge can be applied directly to spring member 1882. However, in this configuration, hot spots can form in the portions of spring member 1882 where the electric charge is applied.

Spring member 1882 can be formed from any convenient electrically conducting, and corrosion-resistant material. In the present exemplary embodiment, spring member 1882 is formed from a metal or metal alloy (such as stainless steel, spring steel, titanium, and the like). Spring member 1882 can also be coated with a corrosion-resistant material (such as platinum, gold, and the like). In accordance with one aspect of the present invention, spring member 1882 is formed as a coil spring formed in a ring. However, conventional coil springs typically have cross sectional profiles, that can vary throughout the length of the coil. More specifically, in general, conventional coil springs have elliptical cross-sectional profiles, with a long diameter and a short diameter. In one part of the coil spring, the long and short diameters of the elliptical cross-sectional profile can be oriented vertically and horizontally, respectively. However, this elliptical cross-sectional profile typically twists or rotates along the length of the coil spring. Thus, in another part of the coil spring the long and short diameters of the elliptical cross-sectional profile can be oriented horizontally and vertically, respectively. This nonuniformity in the cross-sectional profile of the coil spring can result in nonuniform electrical contact with wafer 1602 and thus nonuniform electroplating.

A coil spring having a uniform cross-sectional profile throughout its length can be difficult to produce and cost prohibitive. As such, in accordance with one aspect of the present invention, spring member 1882 is formed from a plurality of coil springs to maintain a substantially uniform cross sectional profile. In one configuration of the present embodiment, when spring member 1882 is disposed on top of lip portion 1880a, the applied electric charge is transmitted from lip portion 1880a throughout the length of spring member 1882. Accordingly, in this configuration, the plurality of coil springs need not be electrically joined. However, as alluded to earlier, in another configuration of the present invention, the electric charge can be applied directly to spring member 1882. In this configuration, the plurality of coil springs is electrically joined using any convenient method, such as soldering, welding, and the like. In the present embodiment, spring member 1882 includes a plurality of coil springs, each coil spring having a length of about 1 to about 2 inches. It should be recognized, however, that spring member 1882 can include any number of coil springs having any length depending on the particular application. Moreover, as alluded to earlier, spring member 1882 can include any convenient conforming and electrically conducting material.

Figure 50:
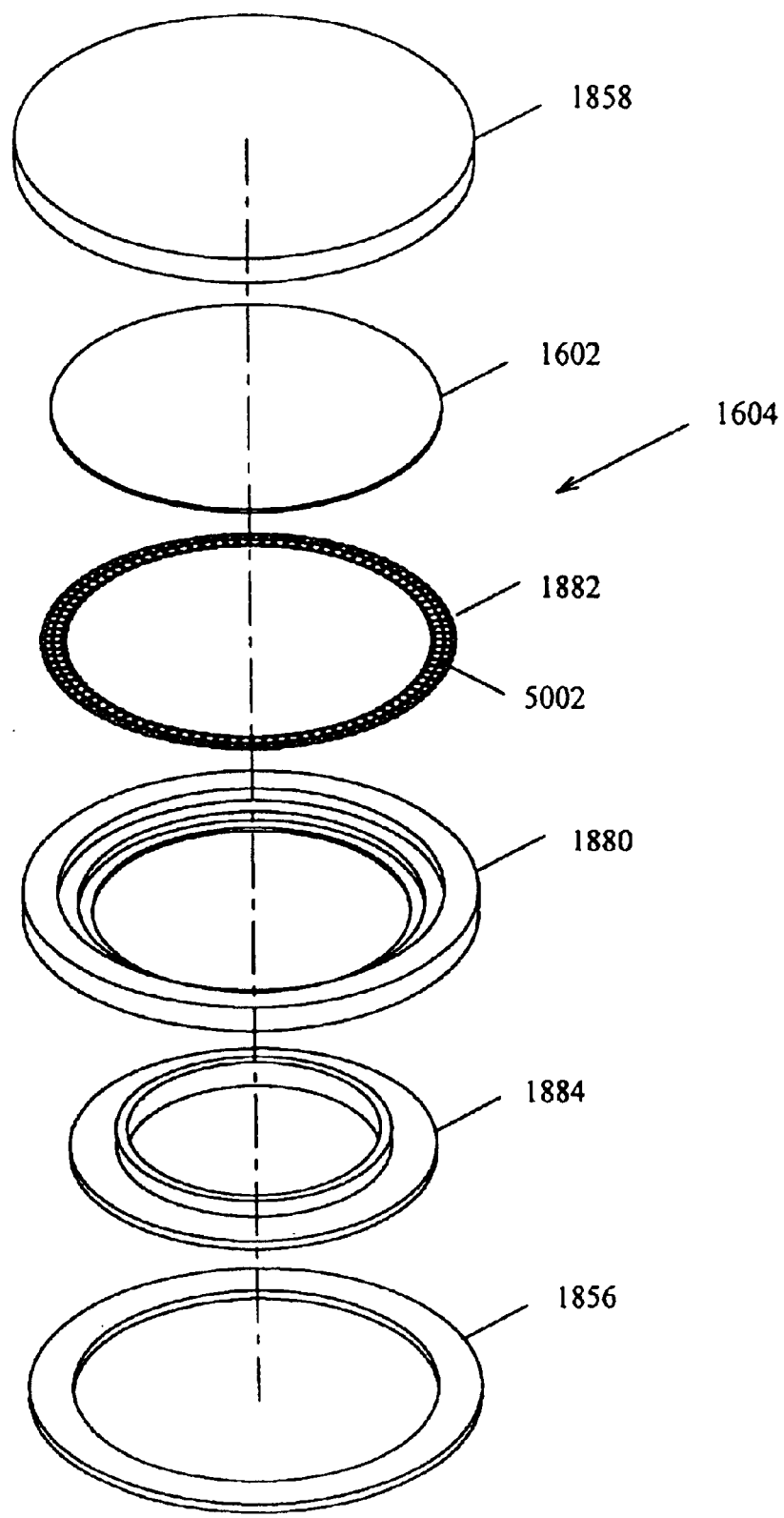
FIG. 50 is an exploded perspective view of an alternative configuration of the wafer chuck shown in FIG. 49.

With reference to FIGS. 50 and 51, spring member 1882 can include a spring holder 5002. In the present exemplary embodiment, when spring member 1882 is a coil spring, spring holder 5002 is configured as a rod that passes through the center of the loops of the coil spring. Spring holder 5002 facilitates the handling of spring member 1882, particularly when spring member 1882 includes a plurality of coil springs. Additionally, spring holder 5002 provides structural support to reduce undesired deformation of spring member 1882. In the present exemplary embodiment, spring holder 5002 is preferably formed from a rigid material (such as metal, metal alloy, plastic, and the like). Additionally, spring holder 5002 is preferably formed from a corrosion resistant material (such as platinum, titanium, stainless steel, and the like). Furthermore, spring holder 5002 can be electrically conducting or non-conducting.

Conducting member 1880 can be formed from any convenient electrically conducting and corrosion-resistant material. In the present exemplary embodiment, conducting member 1880 is formed from a metal or metal alloy (such as titanium, stainless steel, and the like) and coated with corrosion-resistant material (such as platinum, gold, and the like).

An electric charge can be applied to conducting member 1880 through transmission line 5104 and electrode 5102. It should be recognized that transmission line 5104 can include any convenient electrically conducting medium. For example, transmission line 5104 can include electric wire formed from copper, aluminum, gold, and the like. Additionally, transmission line 5104 can be connected to power supplies 1640, 1642 and 1644 (FIG. 16) using any convenient method. For example, as depicted in FIG. 18A, transmission line 5104 can be run through top section 1858 and along the top surface of top section 1858.

Electrode 5102 is preferably configured to be compliant. Accordingly, when pressure is applied to hold bottom section 1856 and top section 1858 together, electrode 5102 conforms to maintain electric contact with conducting member 1880. In this regard, electrode 5102 can include a leaf spring assembly, a coil spring assembly, and the like. Electrode 5102 can be formed from any convenient electrically conducting material (such as any metal, metal alloy, and the like). In the present exemplary embodiment, electrode 5102 is formed from anti-corrosive material (such as titanium, stainless steel, and the like). Additionally, any number of electrodes 5102 can be disposed around top section 1858 to apply an electric charge to conducting member 1880. In the present exemplary embodiment, four electrodes 5102 are disposed approximately equally spaced at an interval of about 90 degrees around top section 1858.

As described above, to electroplate a metal layer, wafer 1602 is immersed in an electrolyte solution and an electric charge is applied to wafer 1602. When wafer 1602 is electrically charged with a potential greater than electrodes 1632, 1634 and 1636 (FIG. 16), metal ions within the electrolyte solution migrate to the surface of wafer 1602 to form a metal layer. However, when the electric charge is applied, shorting can result if spring member 1882 and/or conducting member 1880 are exposed to the electrolyte solution. Additionally, during an electroplating process when wafer 1602 includes a seed layer of metal the metal seed layer can act as an anode and spring member 1882 can act as a cathode. As such, a metal layer can form on spring member 1882 and the seed layer on wafer 1602 can be electropolished (i.e., removed). The shorting of spring member 1882 and the removal of the seed layer on wafer 1602 can reduce the uniformity of the metal layer formed on wafer 1602.

Thus, in accordance with various aspects of the present invention, seal member 1884 isolates spring member 1882 and conducting member 1880 from the electrolyte solution. Seal member 1884 is preferably formed from anti-corrosive material, such as Viton (fluorocarbon) rubber, silicone rubber, and the like. Also, although in the present exemplary embodiment depicted in FIG. 51, seal member 1884 includes an L-shaped profile, it should be recognized that seal member 1884 can include various shapes and configurations depending on the particular application. Some examples of the various configurations of seal member 1884 are depicted in FIGS. 53A to 53G. However, it should be recognized that the various configurations depicted in FIGS. 53A to 53G are only exemplary and not intended to show each and every possible alternative configuration of seal member 1884.

As describe above and as depicted in FIG. 51, spring member 1882 and seal member 1884 contact wafer 1602 around the outer perimeter of wafer 1602. More particularly, spring member 1882 and seal member 1884 contact a width 5106 of the outer perimeter of wafer 1602. In general, this area of wafer 1602 cannot be used to later form microelectronic structure and the like. As such, in accordance with one aspect of the present invention, width 5106 is maintained at a small ratio of the overall surface area of wafer 1602. For example, for about a 300 millimeter (mm) wafer, width 5106 is kept between about 2 mm to about 6 mm It should be recognized, however, that width 5106 can be any ratio of the overall surface area of wafer 1602 depending on the particular application. For example, in one application, the amount of metal layer deposited on wafer 1602 can be more important than the usable area of wafer 1602. As such, a large portion of the surface area of wafer 1602 can be dedicated to contacting spring member 1882 and sealing member 1884 to receive a large applied charge.

Figure 54:
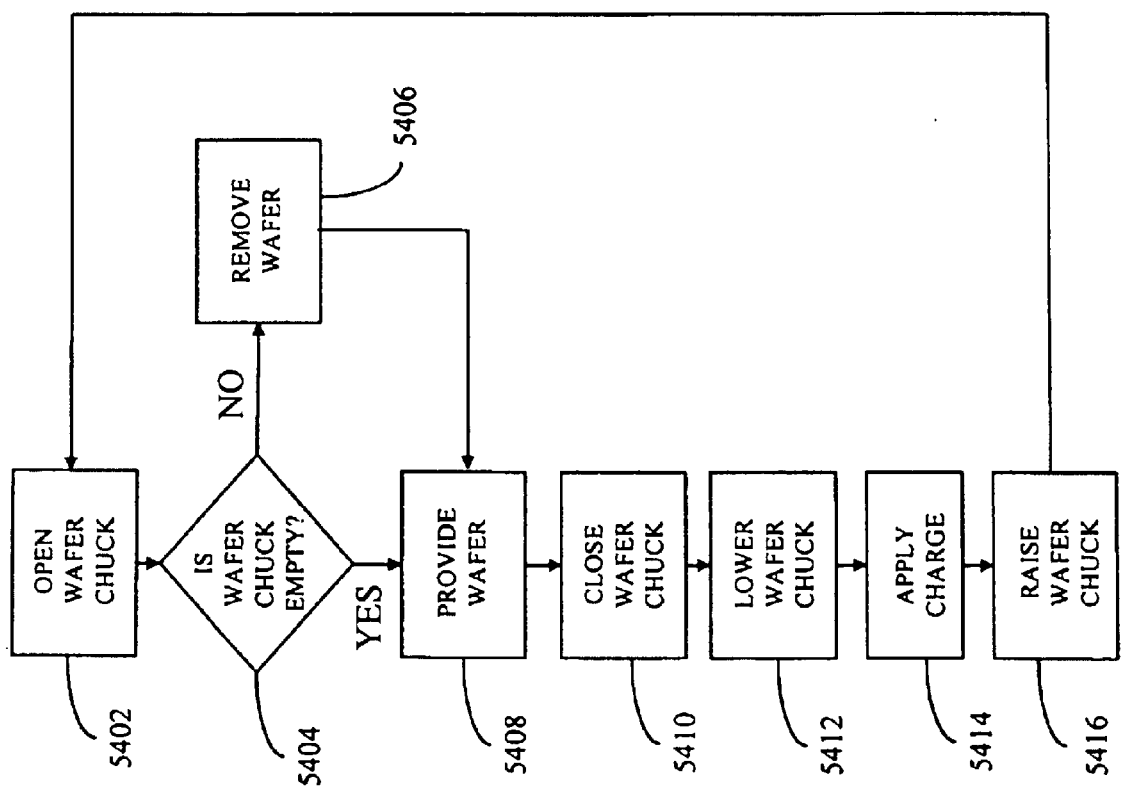
FIG. 54 is a flow chart for handling wafers using the wafer chuck shown in FIG. 51.

With reference now to FIG. 54, the processing steps performed by wafer chuck 1604 (FIG. 51) are set forth in a flow chart format. With reference to FIG. 51, wafer chuck 1604 is opened (FIG. 54, block 5402) to receive a wafer 1602 to be processed. More particularly, bottom section 1856 can be lowered relative to top section 1858. Alternatively, top section 1858 can be raised relative to bottom section 1856. As alluded to earlier, various methods can be used to open wafer chuck 1604, such as pneumatics, springs, vacuum, magnetics, and the like.

If wafer chuck 1604 is empty (FIG. 54, YES branch on Decision Block 5404 to Block 5408), then a new wafer 1602, which is to be processed, is provided or inserted (FIG. 54, block 5408). However, if wafer chuck 1604 contains a wafer, which has been previously processed, then the previously processed wafer is removed from wafer chuck 1604 (FIG. 54, NO branch on Decision Block 5404 to Block 5406), then the new wafer 1602 is provided (FIG. 54, block 5408. As described above, the handling of wafer 1602 can be performed by a robot 106 (FIG. 16). Also, wafer 1602 can be obtained from a wafer cassette 116 (FIG. 3) and returned to wafer cassette 116 (FIG. 3).

After wafer 1602 is provided within wafer chuck 1604, wafer chuck 1604 can be closed (FIG. 54, block 5410). As alluded to above, bottom section 1856 can be raised relative to top section 1858. Alternatively, top section 1858 can be lowered relative to bottom section 1856. As described above, when wafer chuck 1604 is closed, spring member 1882 forms an electrical contact with wafer 1602 and conducting member 1880. Additionally, conducting member 1880 forms an electrical contact with electrode 502.

After wafer chuck 1604 is closed, wafer chuck 1604 is lowered (FIG. 54, block 5412) within electrolyte solution receptacle 1608 (FIG. 16). As described above, wafer 1602 is then immersed in an electrolyte solution. Also, as described above, seal member 1884 prevents the electrolyte solution from coming into contact with spring member 1882 and conducting member 1880.

When wafer 1602 is immersed in the electrolyte solution, an electric charge is applied to wafer 1602 (FIG. 54, block 5414). More particularly, in the present exemplary embodiment, an electric charge is applied to wafer 1602 through transmission line 504, conductor 502, conducting member 1880, and spring member 1882. As described above, spring member 1882 forms a plurality of contact points around the outer perimeter of wafer 1602 to facilitate a more even distribution of the electric charge applied to wafer 1602. Additionally, as described above, spring member 1882 forms a plurality of contact points with conducting member 1880 to facilitate a more even distribution of the electric charge applied to spring member 1882. It should be recognized that the electric charge can be applied either before or after wafer chuck 1602 is lowered into electrolyte solution receptacle 1608 (FIG. 16).

As alluded to earlier, wafer chuck 1604 can be rotated to facilitate a more even electroplating of the metal layer on wafer 1602 (FIG. 16). As depicted in FIG. 16, in the present exemplary embodiment, wafer chuck 1604 can be rotated about the z-axis. Additionally, wafer chuck 1604 can be oscillated in the x-y plane.

Figure 52A:
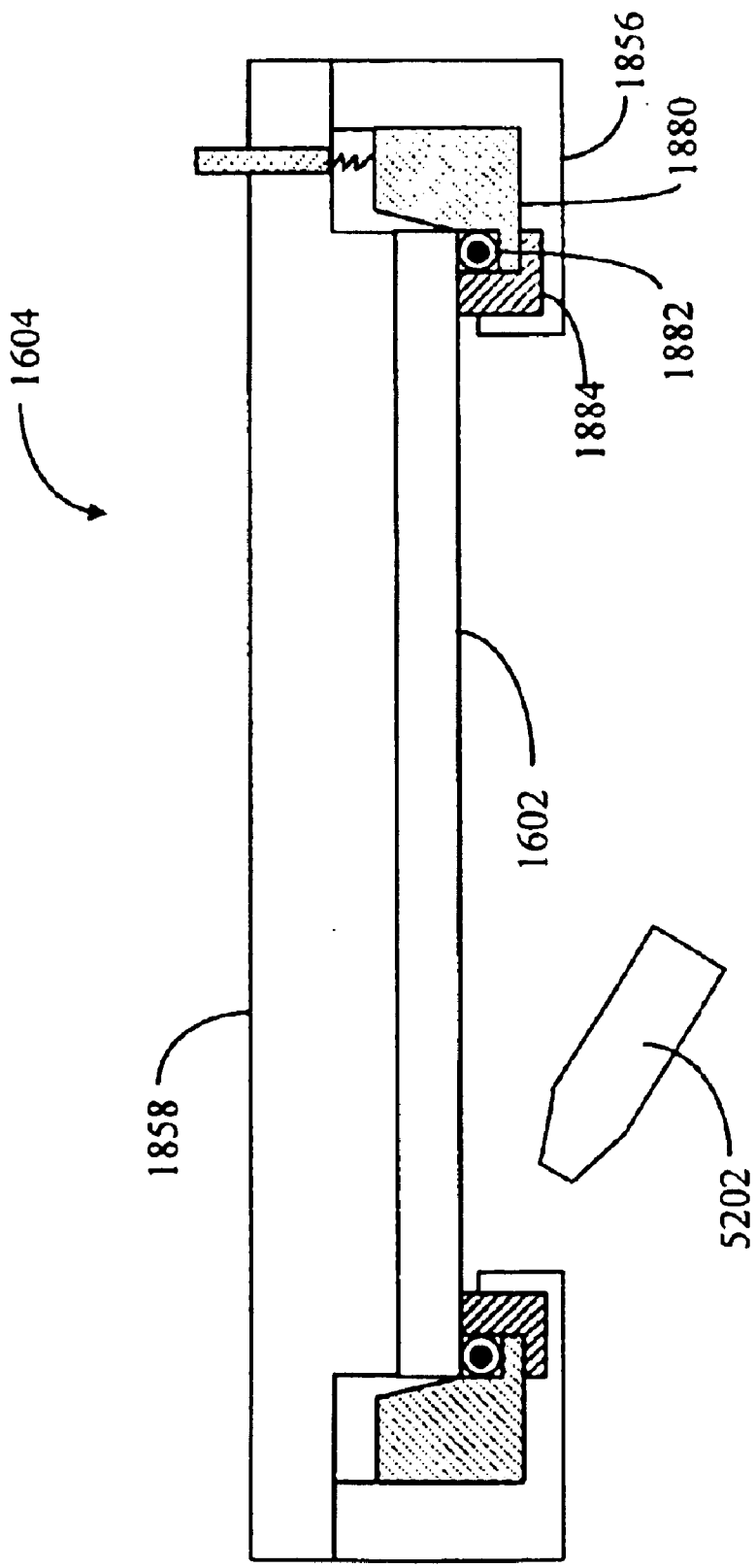
FIGS. 52A and 52B are cross section views of the wafer chuck shown in FIG. 49.

With reference again to FIG. 51, after wafer 1602 has been electroplated and/or electropolished, wafer chuck 1604 can then be raised (FIG. 54, block 5416) from electrolyte solution receptacle 1608 (FIG. 16). In accordance with another aspect of the present invention, a dry gas (such as argon, nitrogen, and the like) is applied to remove residual electrolyte solution. More particularly, with reference to FIG. 52A, the dry gas is applied through nozzle 5202 to remove residual electrolyte from the joint between seal member 1884 and wafer 1602. It should be recognized that any number of nozzles 5202 can be used depending on the particular application. Additionally, wafer chuck 1604 can be rotated while the dry gas is applied through nozzle 5202. As such, nozzle 5202 can be fixed or moveable.

Figure 52B:
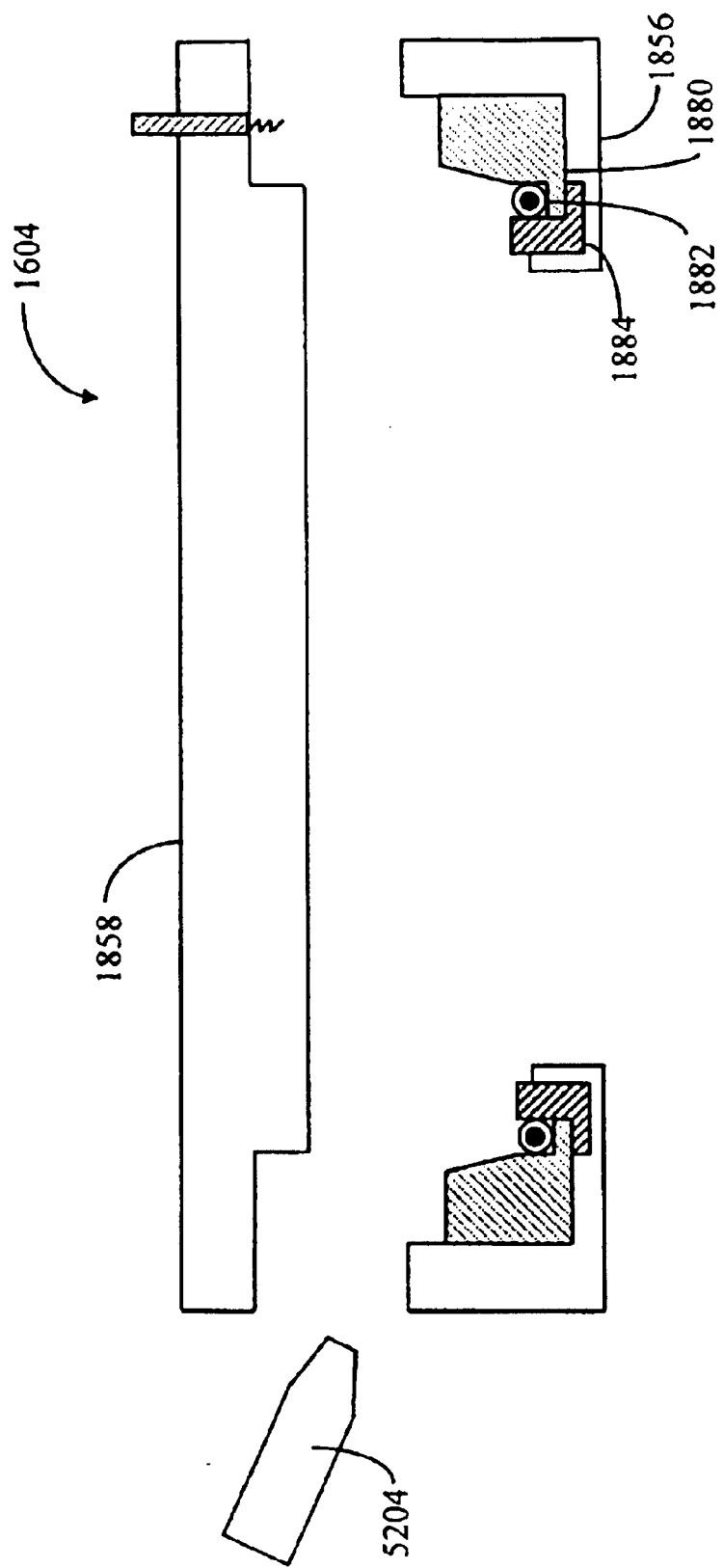
Figure 53A:
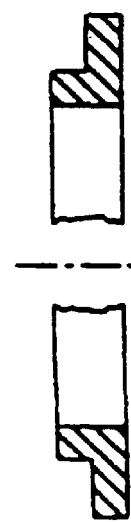
FIGS. 53A to 53G are cross section views of various alternative configurations of a portion of the wafer chuck shown in FIG. 51.
Figure 53B:
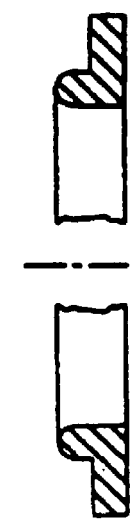
Figure 53C:
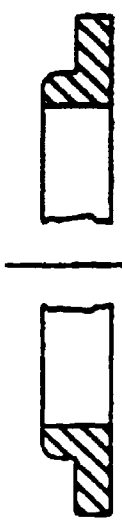
Figure 53D:
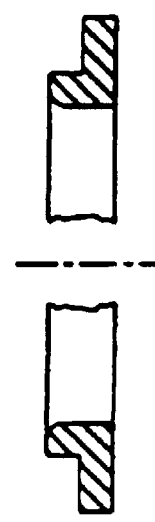
Figure 53E:
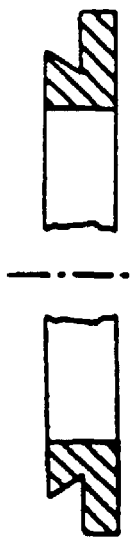
Figure 53F:
Figure 53G:
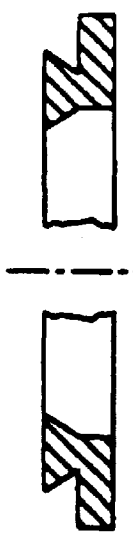

After wafer chuck 1604 has been raised, wafer chuck 1604 is opened (FIG. 54, block 5402). The processed wafer is then removed (FIG. 54, NO branch on Decision Block 5404 to Block 5406). A dry gas (such as argon, nitrogen, and the like) can be applied to remove residual electrolyte solution. More particularly, with reference to FIG. 52B, the dry gas is applied through nozzle 5204 to remove residual electrolyte from conducting member 1880, spring member 1882, and seal member 1884. Additionally, wafer chuck 1604 can be rotated while the dry gas is applied through nozzle 5204. As such, nozzle 5204 can be fixed or moveable.

After a new wafer is provided (FIG. 54, block 5408), the entire process can be repeated. It should be recognized, however, that various modifications can be made to the steps depicted in FIG. 54 without deviating from the spirit and scope of the present invention.

In the following description and associated drawing figures, various alternative embodiments in accordance with various aspects of the present invention will be described and depicted. It should be recognized, however, that these alternative embodiments are not intended to demonstrate all of the various modifications, which can be made to the present invention. Rather, these alternative embodiments are provided to demonstrate only some of the many modifications, which are possible without deviating from the spirit and/or scope of the present invention.

Figure 55:
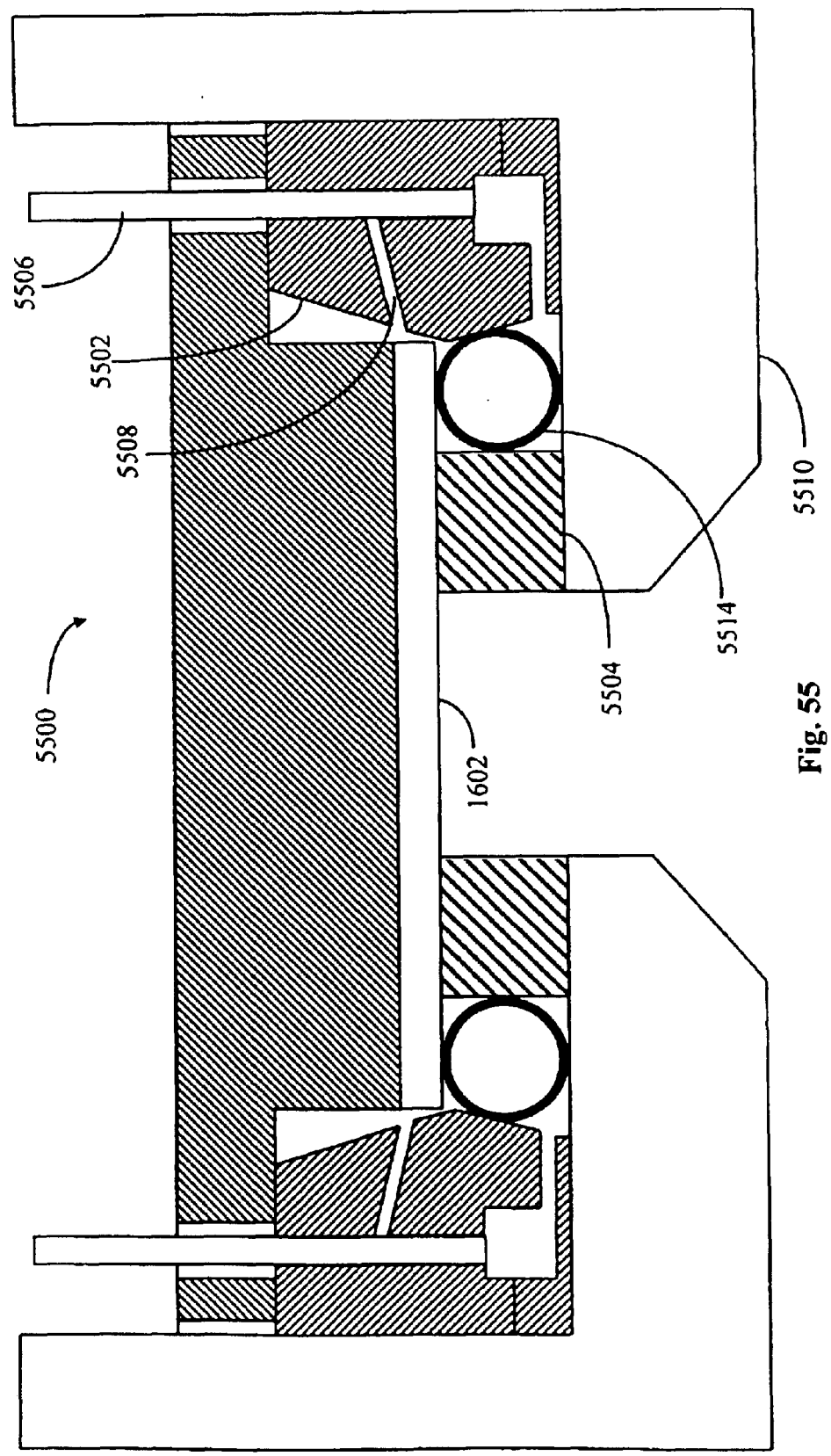
FIG. 55 is a cross section view of an alternative embodiment a wafer chuck.

With reference now to FIG. 55, in an alternative exemplary embodiment of the present invention, a wafer chuck 5500 according to various aspects of the present invention includes a purge line 5506, a nozzle 5508 and a nozzle 5510. In the present exemplary embodiment, purge line 5506 and nozzles 5508 and 5510 inject a dry gas (such as argon, nitrogen, and the like) onto spring member 5514 and seal member 5504. In this manner, after wafer 1602 is processed, residual electrolyte can be purged from spring member 5514 and seal member 5504. As described above, maintaining spring member 5514 free of electrolyte solution facilitates a more uniform electroplating process. Additionally, purging electrolyte solution from seal member 5504 facilitates a better seal when the next wafer is processed. As depicted in FIG. 55, in the present exemplary embodiment, purge line 5506 and nozzles 5508 and 5510 are formed in conducting member 5502. Additionally, purge line 5506 can be connected to pressure line 1852 (FIG. 18A). It should be recognized, however, that wafer chuck 5500 can be suitably configured with purge line 5506 and nozzles 5508 and 5510 in a variety of manners without deviating from the spirit and/or scope of the present invention. Furthermore, it should be recognized that any number of purge lines 5506, nozzles 5508 and nozzles 5510 can be formed in wafer chuck 5500.

Figure 56:
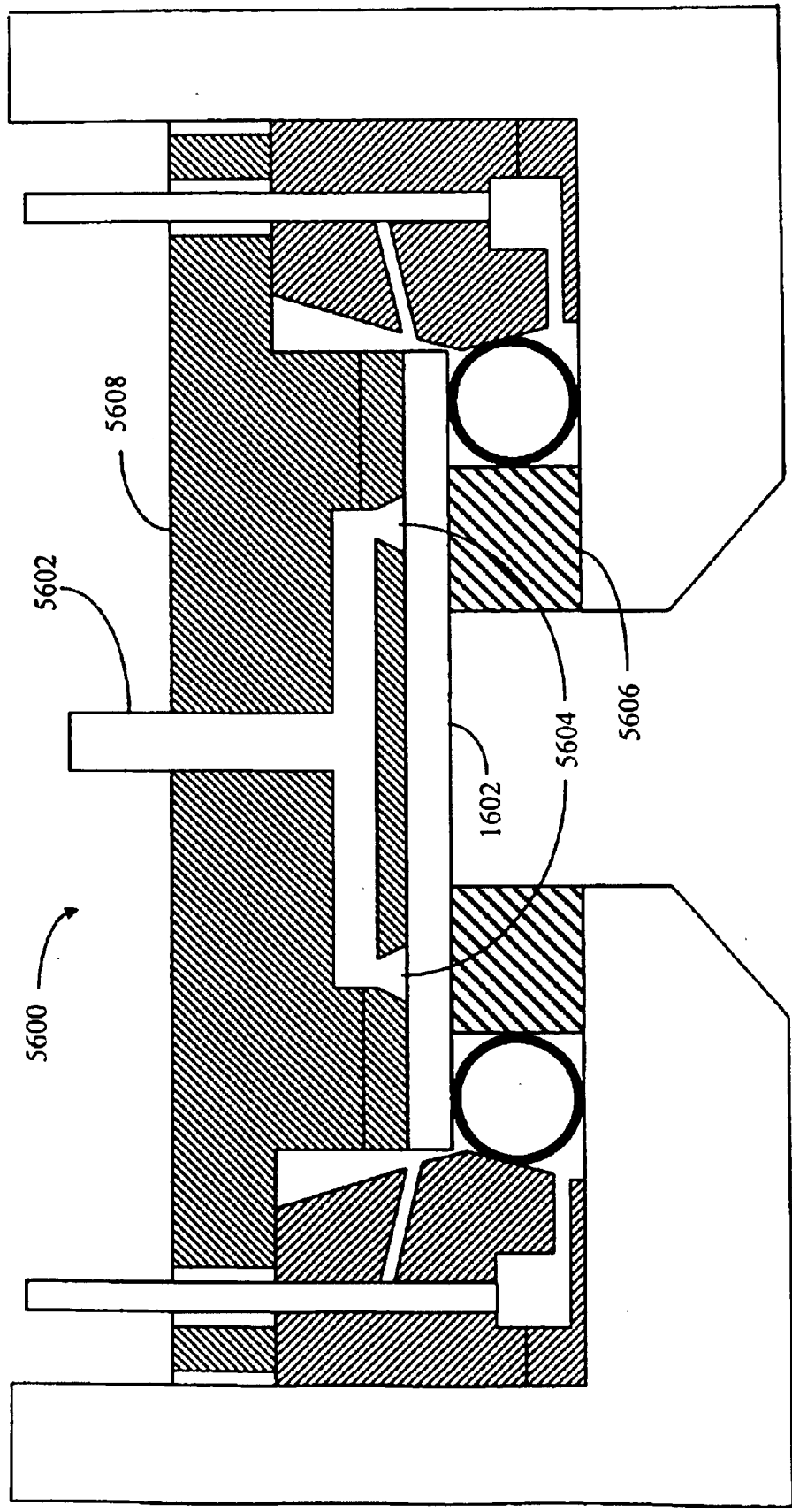
FIG. 56 is a cross section view of a second alternative embodiment of a wafer chuck.

With reference now to FIG. 56, in another alternative exemplary embodiment of the present invention, a wafer chuck 5600 according to various aspects of the present invention includes a purge line 5602 and a plurality of nozzles 5604. In the present exemplary embodiment, purge line 5602 and plurality of nozzles 5604 inject a dry gas (such as argon, nitrogen, and the like) onto seal member 5606. In this manner, after wafer 1602 is processed and removed from wafer chuck 5600, residual electrolyte can be purged from the top of seal member 5606. As depicted in FIG. 56, in the present exemplary embodiment, purge line 5602 and plurality of nozzles 5604 are formed in top section 5608. It should be recognized, however, that wafer chuck 5600 can be suitably configured in a variety manner with purge line 5602 and plurality of nozzles 5604 without deviating from the spirit and/or scope of the present invention. Furthermore, it should be recognized that any number of purge lines 5602 and nozzles 5604 can be formed in wafer chuck 5600.

Figure 57:
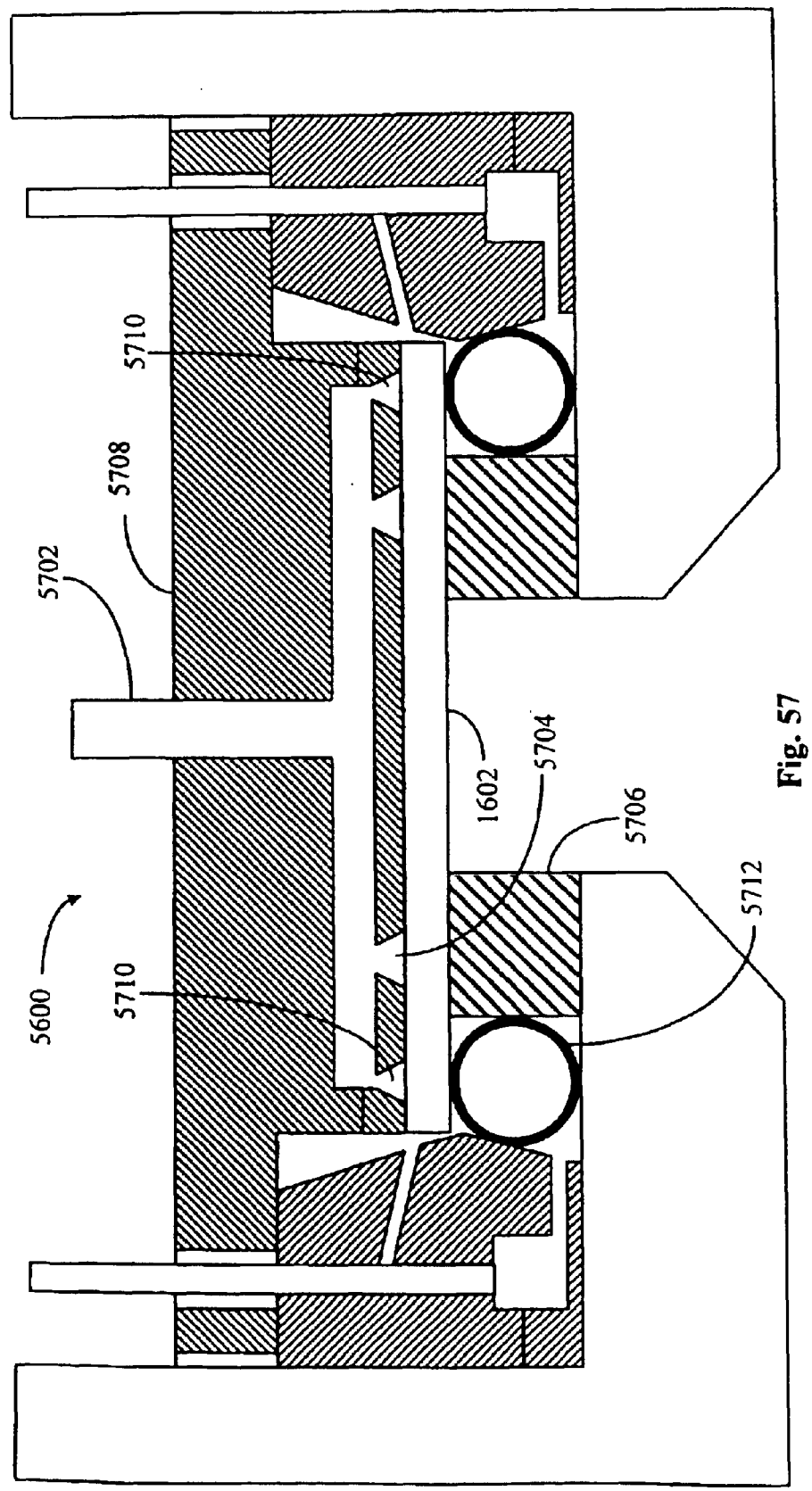
FIG. 57 is a cross section view of a third alternative embodiment of a wafer chuck.

With reference now to FIG. 57, in still another alternative exemplary embodiment of the present invention, a wafer chuck 5700 according to various aspects of the present invention includes a purge line 5702 and a plurality of nozzles 5704 and 5710. In the present exemplary embodiment, purge line 5702 and plurality of nozzles 5704 and 5710 inject a dry gas (such as argon, nitrogen, and the like) onto seal member 5706 and spring member 5712, respectively. In this manner, after wafer 1602 is processed and removed from wafer chuck 5700, residual electrolyte can be purged from the tops of seal member 5706 and spring member 5712. As depicted in FIG. 57, in the present exemplary embodiment, purge line 5702 and plurality of nozzles 5704 and 5710 are formed in top section 5708. It should be recognized, however, that wafer chuck 5700 can be suitably configured in a variety of manners with purge line 5702 and plurality of nozzles 5704 and 5710 without deviating from the spirit and/or scope of the present invention. Furthermore, it should be recognized that any number of purge lines 5702 and nozzles 5704 and 5710 can be formed in wafer chuck 5700.

Figure 58:
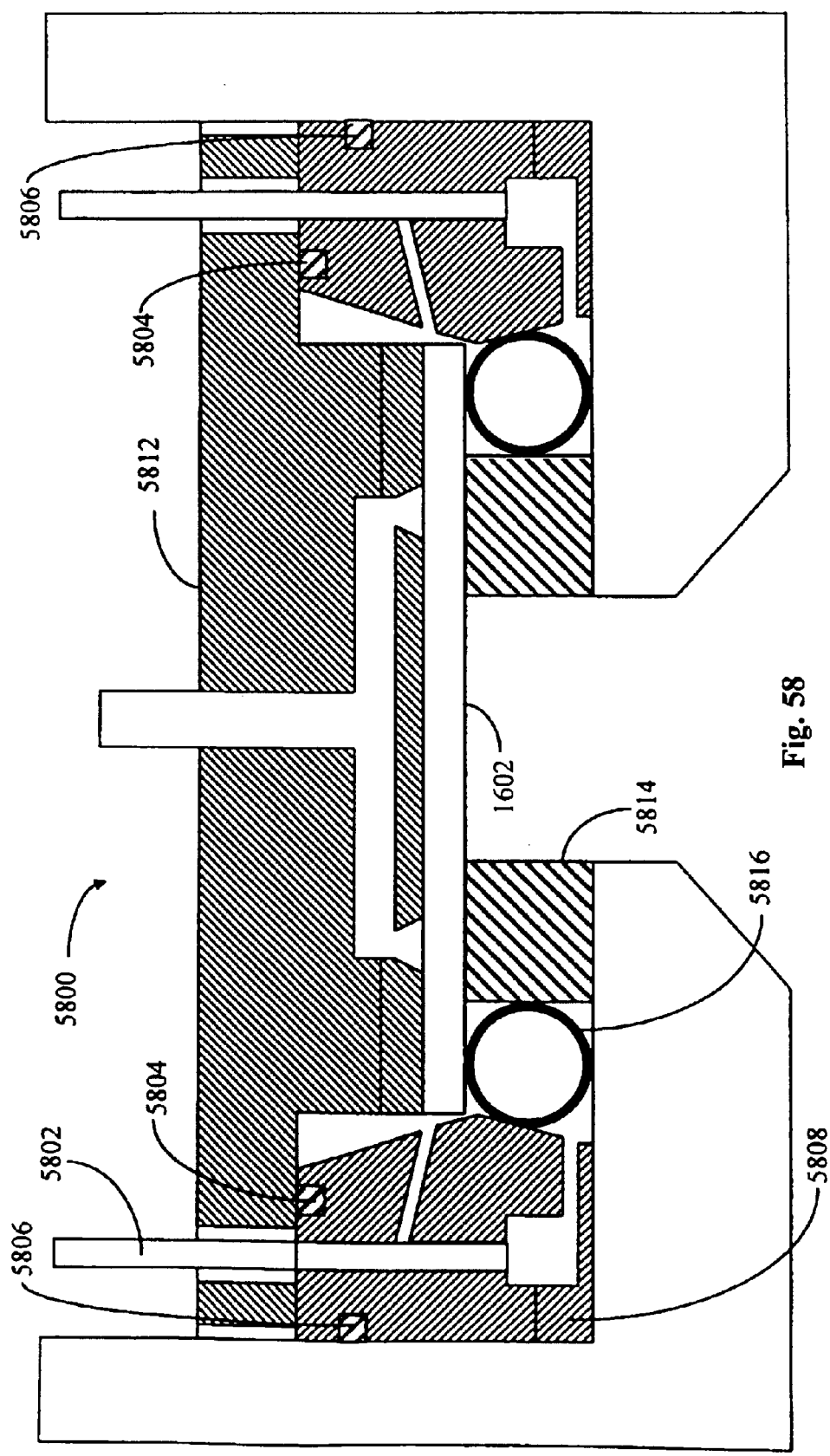
FIG. 58 is a cross section view of a fourth alternative embodiment of a wafer chuck.

With reference now to FIG. 58, in yet another alternative exemplary embodiment of the present invention, a wafer chuck 5800 according to various aspects of the present invention includes a purge line 5802 and a plurality of seal rings 5804 and 5806. In the present exemplary embodiment, seal ring 5806 forms a seal between conducting member 5808 and bottom section 5810. Similarly seal ring 5804 forms a seal between conducting member 5808 and top section 5812. As a result, by feeding positive pressure gas into purge line 5802 and checking for leakage, the seal quality between wafer 1602 and seal member 5814 can be checked. Alternatively, purge line 5802 can be pumped to generate negative pressure to check the seal quality between wafer 1602 and seal member 5814. If this latter process is used, to prevent electrolyte from being sucked into purge line 5802, the pumping of purge line 5802 should cease after processing of wafer 1602, then positive pressure should be injected through purge line 5802 prior to removing wafer 1602. After wafer 1602 is processed and removed from wafer chuck 1200, by injecting a dry gas (such as argon, nitrogen, and the like) through purge line 5802, residual electrolyte can be purged from spring member 5816 and seal member 5814.

Figure 59:
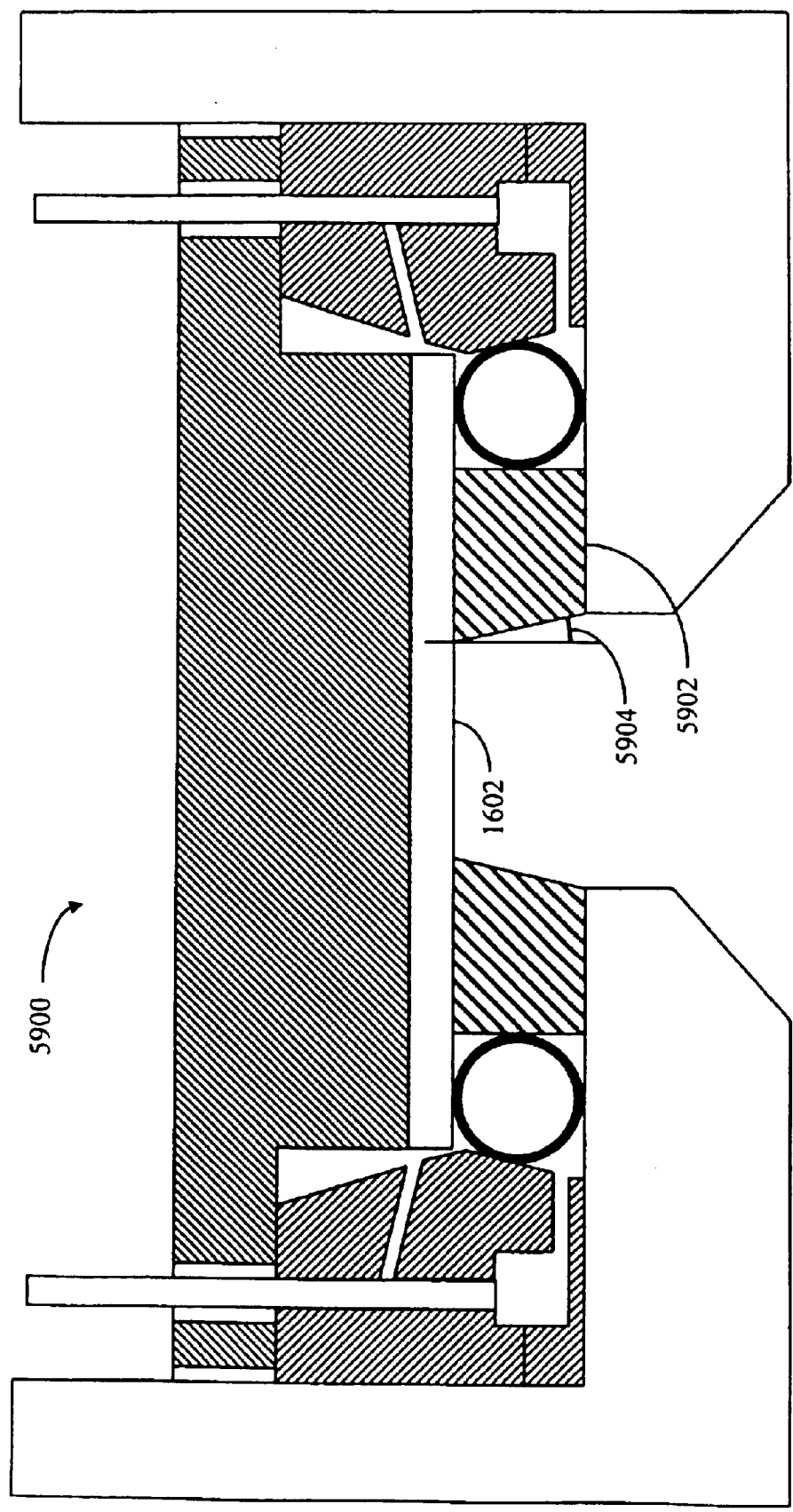
FIG. 59 is a cross section view of a fifth alternative embodiment of a wafer chuck.

With reference now to FIG. 59, in still yet another alternative exemplary embodiment of the present invention, a wafer chuck 5900 according to various aspects of the present invention includes a seal member 5902 having a trapezoidal shape. When wafer chuck 5900 is rotated after processing of wafer 1602, the trapezoidal shape of seal member 5902 facilitates the removal of residual electrolyte from seal member 5902. In the present exemplary embodiment, angle 5904 of seal member 5902 can range between about 0 degrees to about 60 degrees, and preferably about 20 degrees.

Figure 60:
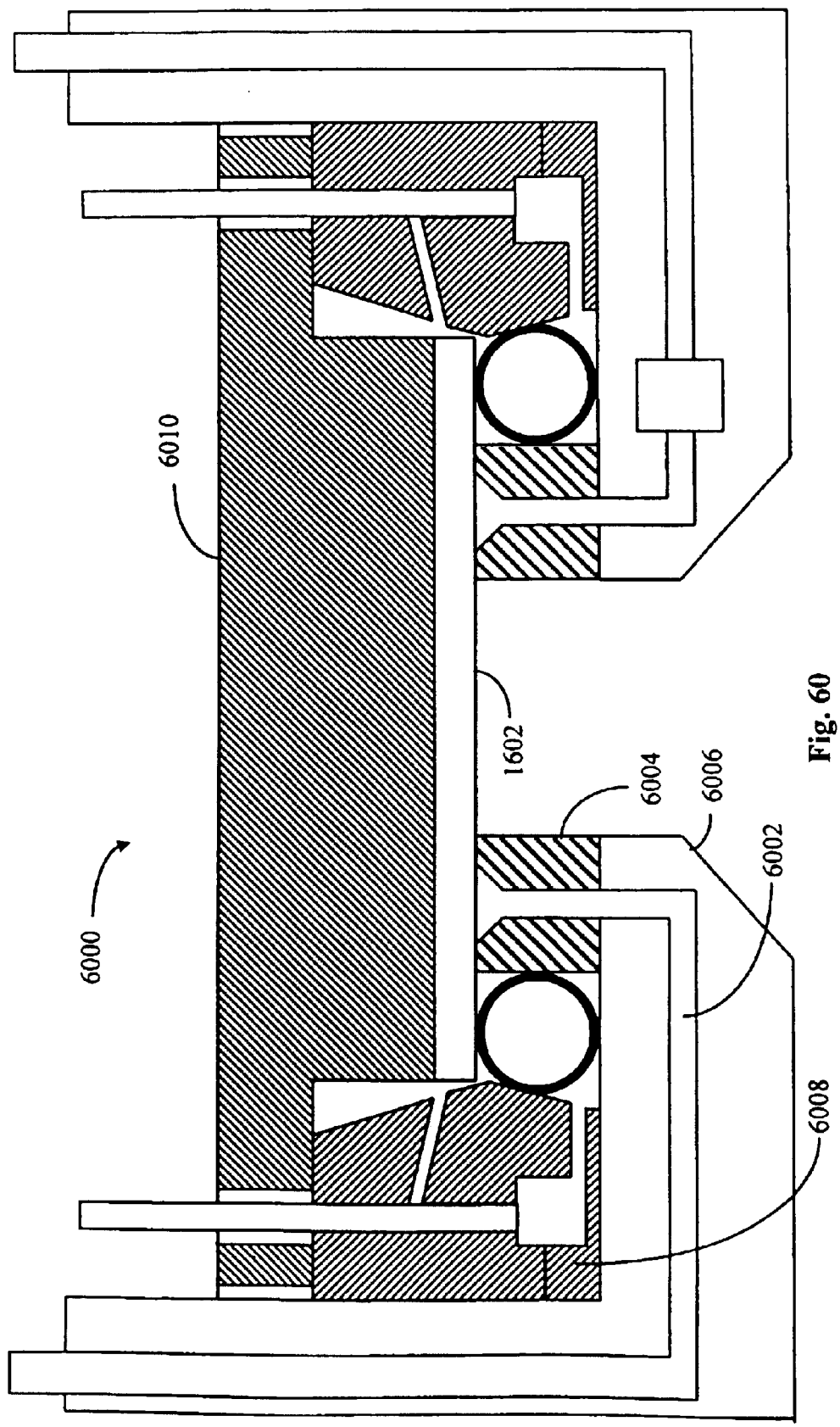
FIG. 60 is a cross section view of a sixth alternative embodiment of a wafer chuck.

With reference now to FIG. 60, in another alternative exemplary embodiment of the present invention, a wafer chuck 6000 according to various aspects of the present invention includes a purge line 6002. In the present exemplary embodiment, purge line 6002 is formed through bottom section 6006 and seal member 6004. By feeding positive pressure gas through purge line 6002, the seal quality between wafer 1602 and seal member 6004 can be checked. Alternatively, purge line 6004 can be pumped to generate negative pressure to check the seal quality between wafer 1602 and seal member 6004. As noted above, if this latter process is used, to prevent electrolyte from being sucked into purge line 6002, the pumping of purge line 6002 should cease after processing of wafer 1602 and positive pressure should be injected through purge line 6002 prior to removing wafer 1602

Figure 61:
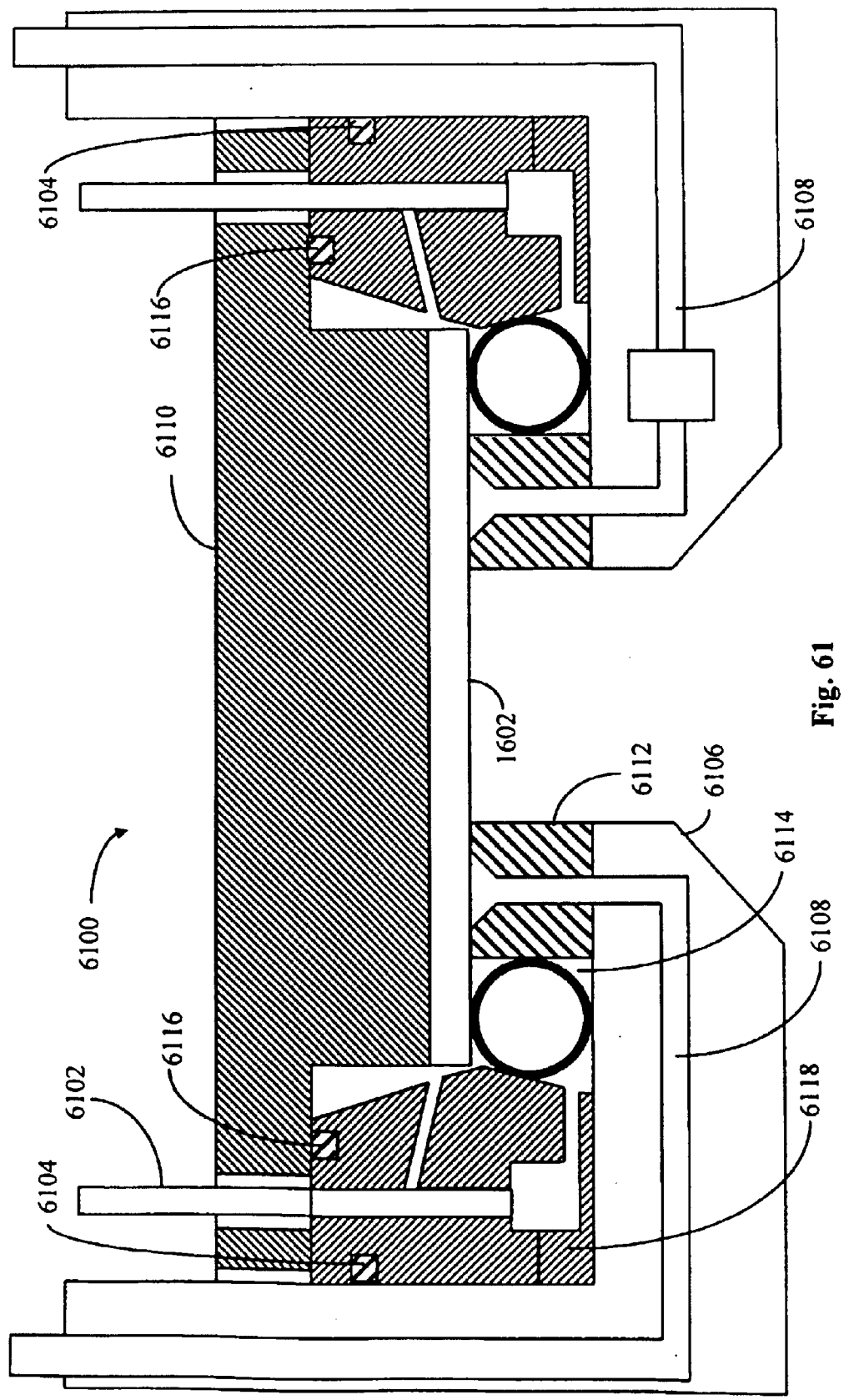
FIG. 61 is a cross section view of a seventh alternative embodiment of a wafer chuck.

With reference now to FIG. 61, in still another alternative exemplary embodiment of the present invention, a wafer chuck 6100 according to various aspects of the present invention includes a purge line 6102, a purge line 6108, and a plurality of seal rings 6116 and 6104. In the present exemplary embodiment, seal ring 6116 forms a seal between conducting member 6118 and top section 6110. Similarly seal ring 6104 forms a seal between conducting member 6118 and bottom section 6106. As a result, the seal quality between wafer 1602 and seal member 6112 can be checked using purge line 6102 and/or purge line 6108.

More particularly, in one configuration, the seal quality can be checked by feeding pressure gas into purge line 6102 and purge line 6108 and checking for leakage. In another configuration, purge line 6102 and purge line 6108 can be pumped to generate negative pressure to check the seal quality between wafer 1602 and seal member 6112. In still another configuration, either purge line 6102 or purge line 6108 can be fed with pressure while the other is pumped to generate negative pressure. When negative pressure is used to check for leakage, to prevent electrolyte from being sucked into purge line 6102 and/or purge line 6108, pumping should cease after processing of wafer 1602, then positive pressure should be injected through purge line 6102 and/or purge line 6108 prior to removing wafer 1602. After wafer 1602 is processed and removed from wafer chuck 6100, by injecting a dry gas (such as argon, nitrogen, and the like) through purge line 6102 and/or purge line 6108, residual electrolyte can be purged from seal member 6112 and spring member 6114.

Figure 62:
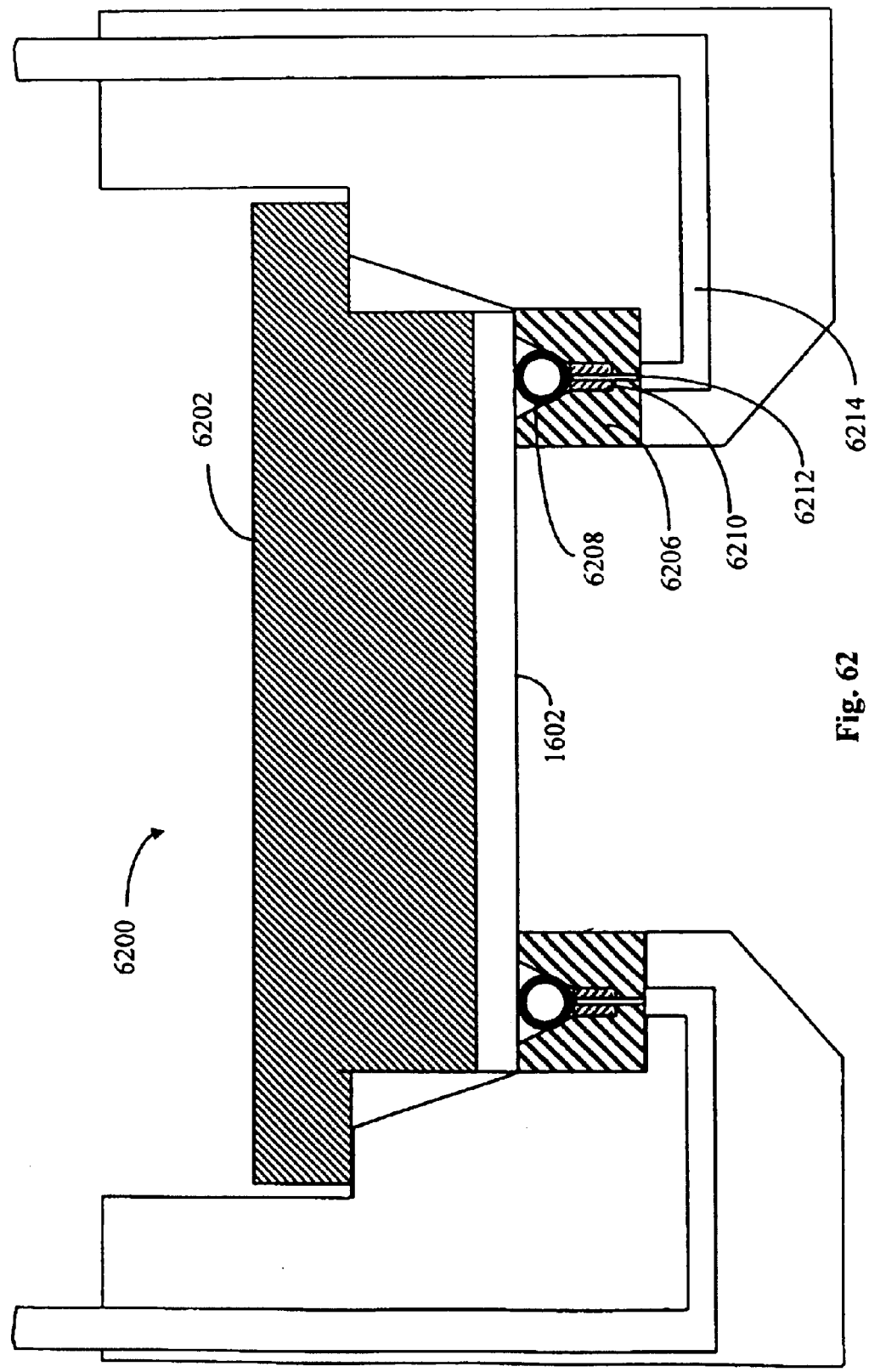
FIG. 62 is a cross section view of an eighth alternative embodiment of a wafer chuck.

With reference now to FIG. 62, in another alternative exemplary embodiment of the present invention, a wafer chuck 6200 according to various aspects of the present invention includes a spring member 6208, a conducting member 6210 and a seal member 6206. In the present exemplary embodiment, spring member 6208 and conducting member 6210 are disposed within seal member 6206. This configuration has the advantage that spring member 6208, conducting member 6210, and seal member 6206 can be pre-assembled.

Wafer chuck 6200 further includes a purge line 6214 and a plurality of nozzles 6212 formed through seal member 6214 and conducting member 6210. By feeding positive pressure gas through purge line 6214, the seal quality between wafer 1602 and seal member 6206 can be checked. Alternatively, purge line 6214 can be pumped to generate negative pressure to check the seal quality between wafer 1602 and seal member 6206. As noted above, if this latter process is used, to prevent electrolyte from being sucked into purge line 6214, the pumping of purge line 6214 should cease after processing of wafer 1602, then positive pressure should be injected through purge line 6214 prior to removing wafer 1602

Figure 63:
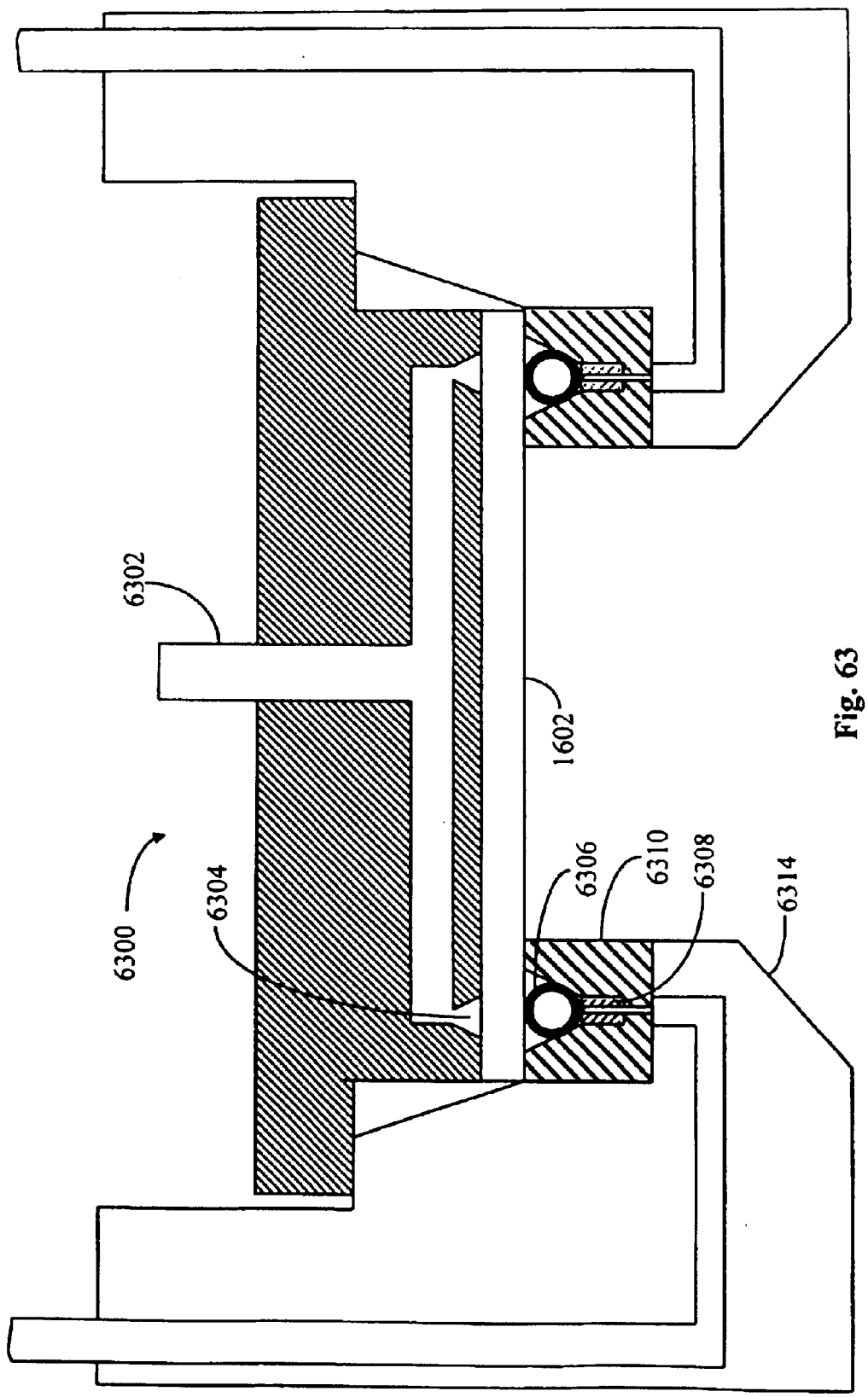
FIG. 63 is a cross section view of a ninth alternative embodiment of a wafer chuck.

With reference now to FIG. 63, in still another alternative exemplary embodiment of the present invention, a wafer chuck 6300 includes a purge line 6302 and a plurality of nozzles 6304. In the present exemplary embodiment, purge line 6302 and plurality of nozzles 6304 inject a dry gas (such as argon, nitrogen, and the like) onto seal member 6310, conducting member 6308, and spring member 6306. In this manner, after wafer 1602 is processed and removed from wafer chuck 6300, residual electrolyte can be purged from the tops of seal member 6310, conducting member 6308, and spring member 6306. As depicted in FIG. 63, in the present exemplary embodiment, purge line 6302 and plurality of nozzles 6304 are formed in top section 6312. It should be recognized, however, that wafer chuck 6300 can be suitably configured in a variety of manners with purge line 6302 and plurality of nozzles 6304 without deviating from the spirit and/or scope of the present invention. Furthermore, it should be recognized that any number of purge lines 6302 and nozzles 6304 can be formed in wafer chuck 6300.

Figure 64:
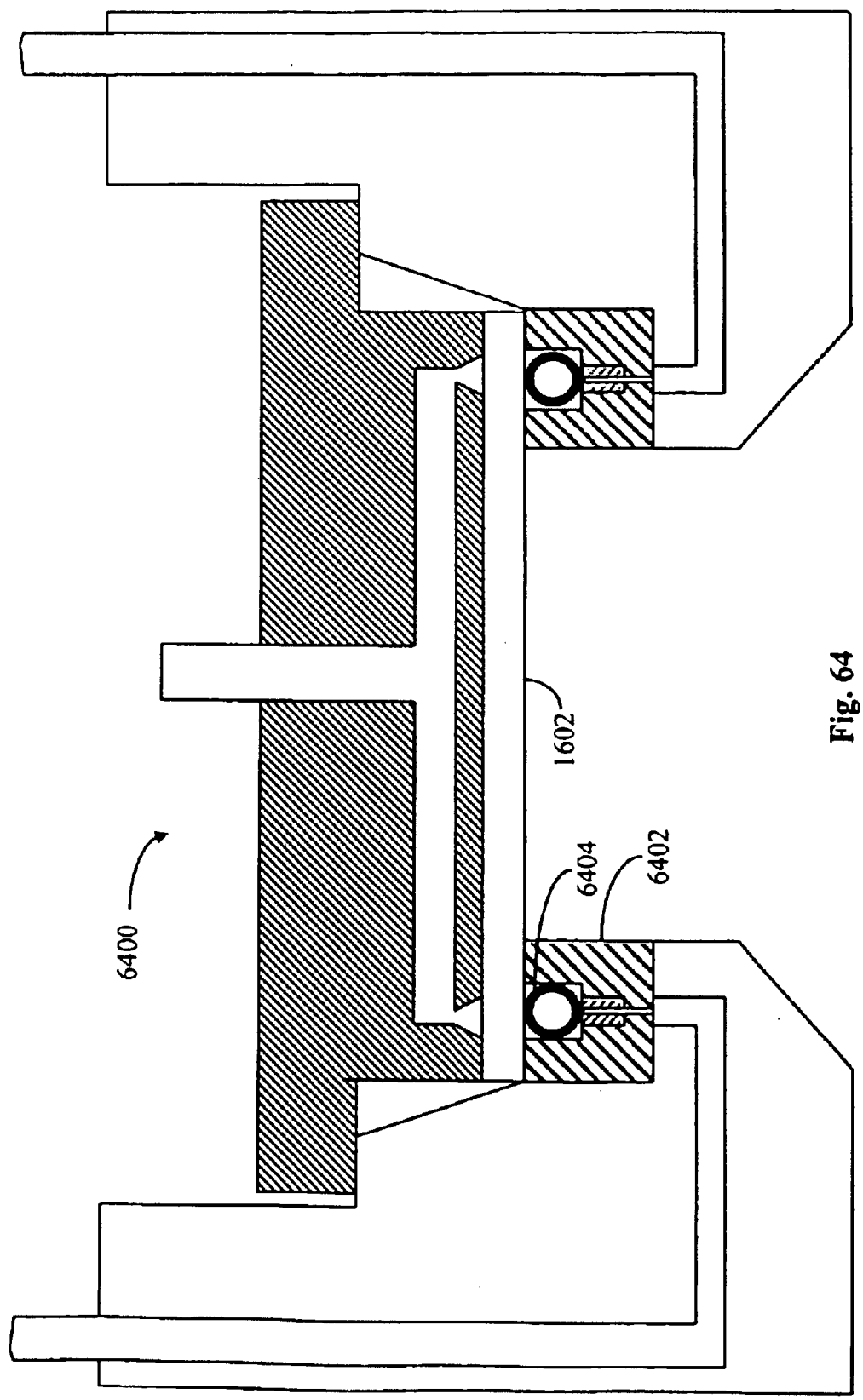
FIG. 64 is a cross section view of a tenth alternative embodiment of a wafer chuck.

With reference now to FIG. 64, in yet another alternative exemplary embodiment of the present invention, a wafer chuck 6400 includes a seal member 6402. In the present exemplary embodiment, seal member 6402 is formed with a square interior groove for receiving spring member 6404. This configuration has the advantage of more securely receiving spring member 6404. It should be recognized, however, seal member 6402 can be formed with a variety of shapes depending on the particular application.

Figure 65:
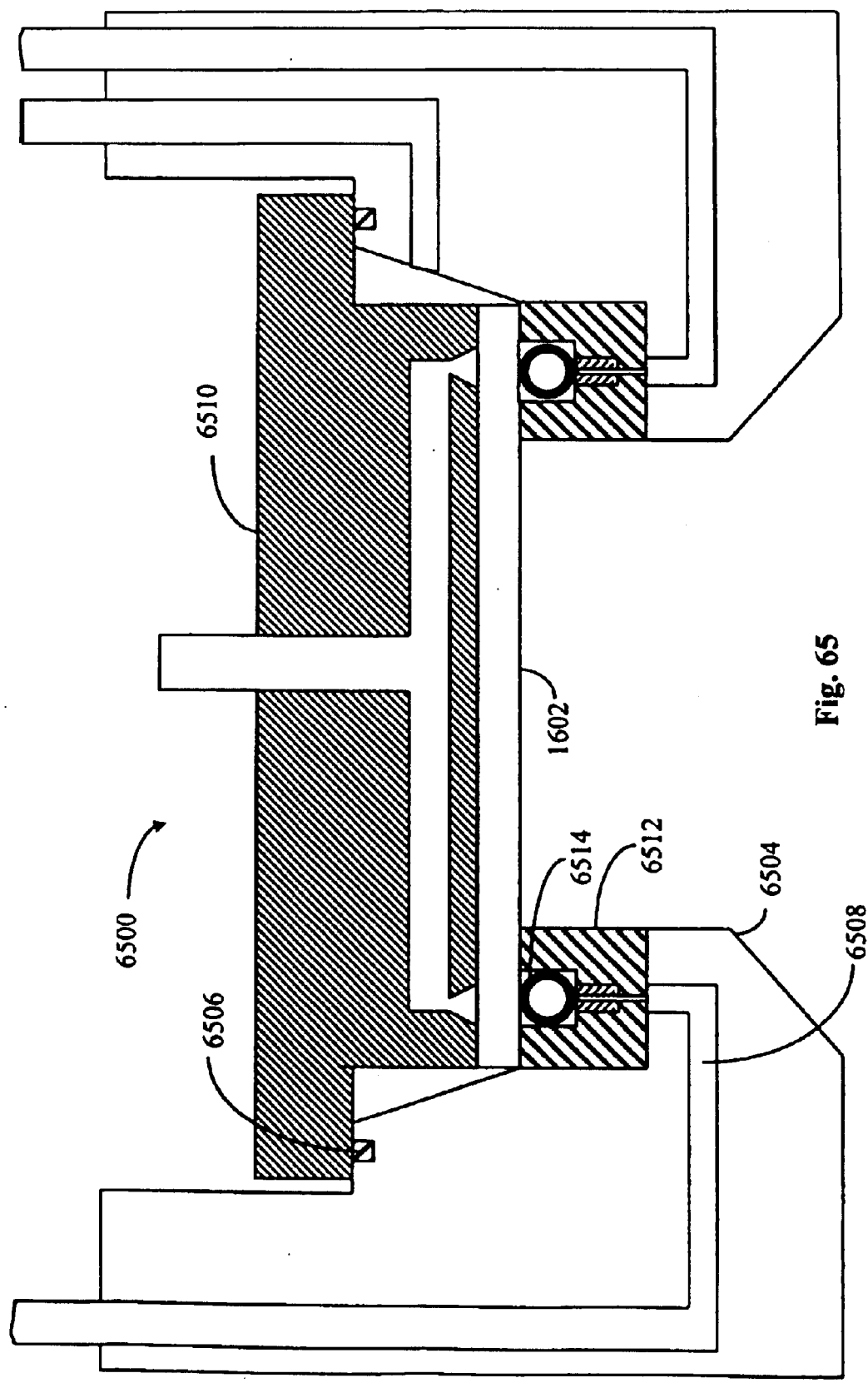
FIG. 65 is a cross section view of an eleventh alternative embodiment of a wafer chuck.

With reference now to FIG. 65, in still another alternative embodiment of the present invention, a wafer chuck 6500 according to various aspects of the present invention includes a purge line 6502, a purge line 6508, and a seal ring 6506. In the present exemplary embodiment, seal ring 6506 forms a seal between bottom section 6504 and top section 6510. As a result, the seal quality between wafer 1602 and seal member 6512 can be checked using purge line 6502 and/or purge line 6508.

More particularly, in one configuration, the seal quality can be checked by feeding pressure gas into purge line 6502 and purge line 6508 and checking for leakage. In another configuration, purge line 6502 and purge line 6508 can be pumped to generate negative pressure to check the seal quality between wafer 1602 and seal member 6512. In still another configuration, either purge line 6502 or purge line 6508 can be fed with pressure while the other is pumped to generate negative pressure. When negative pressure is used to check for leakage, to prevent electrolyte from being sucked into purge line 6502 and/or purge line 6508, pumping should cease after processing of wafer 1602, then positive pressure should be injected through purge line 6502 and/or purge line 6508 prior to removing wafer 1602. After wafer 1602 is processed and removed from wafer chuck 6500, by injecting a dry gas (such as argon, nitrogen, and the like) through purge line 6502 and/or purge line 6508, residual electrolyte can be purged from seal member 6512 and spring member 6514.

Figure 66:
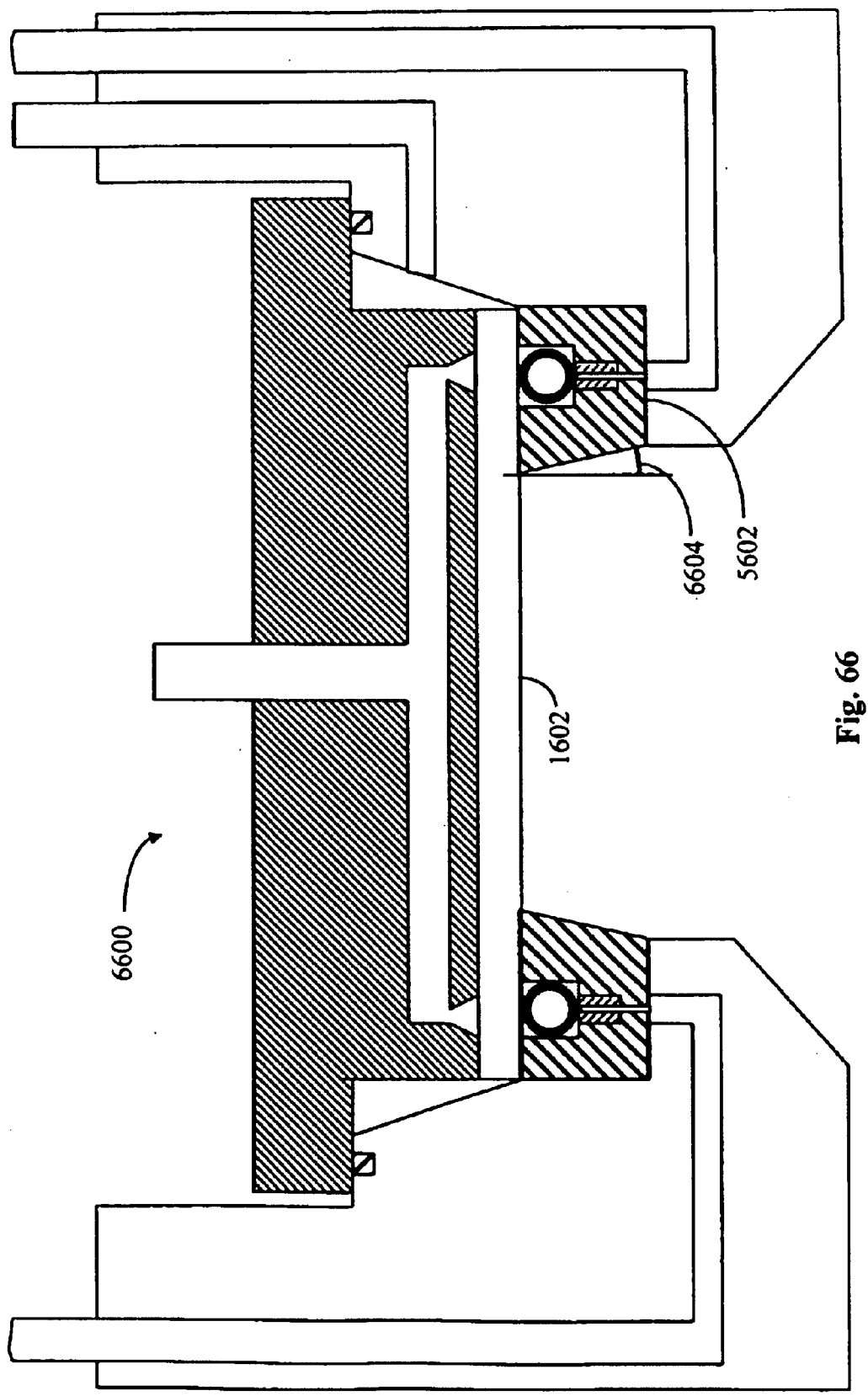
FIG. 66 is a cross section view of a twelfth alternative embodiment of a wafer chuck.

With reference now to FIG. 66, in still yet another alternative exemplary embodiment of the present invention, a wafer chuck 6600 according to various aspects of the present invention includes a seal member 6602 having a trapezoidal shape. When wafer chuck 6600 is rotated after processing of wafer 1602, the trapezoidal shape of seal member 6602 facilitates the removal of residual electrolyte from seal member 6602. In the present exemplary embodiment, angle 6604 of seal member 6602 can range between about 0 degrees to about 60 degrees, and preferably about 20 degrees.

As stated earlier, although the present invention has been described in conjunction with a number of alternative embodiments illustrated in the appended drawing figures, various modifications can be made without departing from the spirit and/or scope of the present invention. Therefore, the present invention should not be construed as being limited to the specific forms shown in the drawings and described above.

What is claimed is:

1. A wafer chuck assembly for holding a wafer comprising:
   a wafer chuck having a bottom section and a spring member disposed between said bottom section and the wafer, wherein said spring member is configured to apply an electric charge to the wafer, and
   actuator assembly configured to move said wafer chuck.

2. The wafer chuck assembly of claim 1, wherein said spring member contacts a portion of the outer perimeter of the wafer, such that the applied electric charge is distributed around the portion of the outer perimeter of the wafer.

3. The wafer chuck assembly of claim 1, wherein said spring member is formed from a compliant electrically conducting material.

4. The wafer chuck assembly of claim 3, wherein said spring member is a coil spring formed as a ring.

5. The wafer chuck assembly of claim 1, wherein said spring member comprises a plurality of springs formed as a ring.

6. The wafer chuck assembly of claim 1 further comprising a top section disposed above said bottom section, wherein said top section and said bottom section are configured to open to receive the wafer.

7. The wafer chuck assembly of claim 6 further comprising a conducting member disposed between said top section and said bottom section, wherein said conducting member is configured to apply an electric charge to said spring member.

8. The wafer chuck assembly of claim 7, wherein said conducting member comprises a lip portion, wherein said lip portion contacts the bottom of said spring member.

9. The wafer chuck assembly of claim 7 further comprising a compliant electrode disposed on said top section, wherein said compliant electrode is configured to apply an electric charge to said conducting member.

10. The wafer chuck assembly of claim 7 further comprising a purge line and a plurality of nozzles formed in said conducting member.

11. The wafer chuck assembly of claim 10 further comprising:
    a first seal ring disposed between said top section and said conducting member; and
    a second seal ring disposed between said bottom section and said conducting member.

12. The wafer chuck assembly of claim 6 further comprising a purge line and a plurality of nozzles formed in said top section.

13. The wafer chuck assembly of claim 6, wherein said actuator assembly is configured to move said wafer chuck between a first and a second position.

14. The wafer chuck assembly of claim 13, further comprising a spring assembly connected to said top section and said bottom section to open and to close said wafer chuck.

15. The wafer chuck assembly of claim 14, wherein said spring assembly opens and closes said top section and said bottom section when said wafer chuck is moved to said first position and to said second position, respectively.

16. The wafer chuck assembly of claim 14, wherein said spring assembly comprises:
- a rod having a first and a second end, said first end fixed to said bottom section; and
- a spring disposed between said second end of said rod and said top section.

17. The wafer chuck assembly of claim 16, wherein said spring extends to engage said top section with said bottom section when said wafer chuck is moved to said second position.

18. The wafer chuck assembly of claim 16, wherein said rod separates said top section from said bottom section and said spring is compressed between said second end of said rod and said top section when said wafer chuck is moved to said first position.

19. The wafer chuck assembly of claim 16 further comprising:
- a shaft having a first and a second end, said first end fixed to said top section; and
- a bracket connected to said second end of said shaft.

20. The wafer chuck assembly of claim 19, wherein said actuator assembly comprises:
- a guide rail;
- a lead screw connected to said bracket; and
- a motor connected to said lead screw, wherein said motor turns said lead screw to move said bracket along said guide rail to move said wafer chuck between said first position and said second position.

21. The wafer chuck assembly of claim 20 further comprising a lid disposed between said top section and said bracket, said lid having a shaft hole to permit said shaft to slide relative to said lid when said wafer chuck is moved between said first position and said second position.

22. The wafer chuck assembly of claim 21, wherein said second end of said rod contacts said lid when said wafer chuck is moved to said first position to stop the movement of said bottom section while said top section continues to move relative to said bottom section by compressing said springs between said top section and said second end of said rod.

23. The wafer chuck assembly of claim 1 further comprising a seal member disposed between said bottom section and the wafer, wherein said seal member forms a seal between said bottom section and the wafer.

24. The wafer chuck assembly of claim 23, wherein said seal member has an L-shaped profile.

25. The wafer chuck assembly of claim 23, wherein said seal member has a trapezoidal profile.

26. The wafer chuck assembly of claim 23 further comprising a purge line formed in said bottom section and through said sealing member.

27. The wafer chuck assembly of claim 23, wherein said seal member is formed from a synthetic rubber.

28. The wafer chuck assembly of claim 23 further comprising a conducting member disposed within a groove formed in said seal member, wherein said spring member is disposed on top of said conducting member.

29. The wafer chuck assembly of claim 28 further comprising a purge line formed through said bottom section and through said seal member and said conducting member.

30. The wafer chuck assembly of claim 28, wherein said groove formed in said seal member has a square profile to receive said spring member.

31. A wafer chuck assembly for holding a wafer comprising:
- a wafer chuck configured to open and to close; and
- an actuator assembly configured to move said wafer chuck between a first and a second position, wherein said wafer chuck is open when in said first position and closed when in said second position.

32. The wafer chuck assembly of claim 31, wherein said wafer chuck comprises:
- a top section; and
- a bottom section having an opening to expose the surface of the wafer when held between said top section and said bottom section.

33. The wafer chuck assembly of claim 32, wherein said wafer chuck further comprises a spring member disposed between said bottom section and the wafer, wherein said spring member is configured to apply an electric charge to the wafer.

34. The wafer chuck assembly of claim 33, wherein said spring member contacts a portion of the outer perimeter of the wafer, such that the applied electric charge is distributed around the portion of the outer perimeter of the wafer.

35. The wafer chuck assembly of claim 33, wherein said spring member is a coil spring.

36. The wafer chuck assembly of claim 35, further comprising a spring holder disposed within said coil spring.

37. The wafer chuck assembly of claim 33, wherein said wafer chuck further comprises a conducting member disposed between said top section and said bottom section, wherein said conducting member is configured to apply an electric charge to said spring member.

38. The wafer chuck assembly of claim 33, wherein said wafer chuck further comprises a seal member disposed between said bottom section and the wafer, wherein said seal member forms a seal between said bottom section and the wafer.

39. The wafer chuck assembly of claim 32, further comprising a spring assembly to open and to close said wafer chuck.

40. The wafer chuck assembly of claim 39, wherein said spring assembly comprises:
- a rod having a first and a second end, said first end fixed to said bottom section; and
- a spring disposed between said second end of said rod and said top section.

41. The wafer chuck assembly of claim 40, wherein said rod separates said top section from said bottom section to open said wafer chuck and said spring is compressed between said second end of said rod and said top section when said wafer chuck is moved to said first position.

42. The wafer chuck assembly of claim 40, wherein said spring extends to engage said top section with said bottom section when said wafer chuck is moved to said second position.

43. The wafer chuck assembly of claim 32, wherein said wafer chuck further comprises a vacuum chamber formed between said top section and said bottom section when said wafer chuck is closed.

44. The wafer chuck assembly of claim 43, wherein said top section is configured with a vacuum line to apply a vacuum and/or a reduced pressure gas to said vacuum chamber when said wafer chuck is in said second position.

45. The wafer chuck assembly of claim 32, wherein said top section is configured with a pressure gas line.

46. The wafer chuck assembly of claim 32, wherein said top section and said bottom section are formed from a metal inner core with an outer plastic shell.

47. The wafer chuck assembly of claims 31 further comprising:
  a shaft having a first and a second end, said first end coupled to said top section; and
  a bracket connected to said second end of said shaft.

48. The wafer chuck assembly of claim 47, wherein said actuator assembly comprises:
  a guide rail;
  a lead screw connected to said bracket; and
  a motor connected to said lead screw, wherein said motor turns said lead screw to move said bracket along said guide rail.

49. The wafer chuck assembly of claim 48, wherein said actuator assembly further comprises:
  a second bracket connected between said first bracket and said lead screw; and
  a plurality of joints disposed between said first bracket and said second bracket.

50. The wafer chuck assembly of claim 49, wherein said plurality of joints are universal joints.

51. The wafer chuck assembly of claim 47 further comprising a rotating assembly configured to rotate said wafer chuck.

52. The wafer chuck assembly of claim 51 wherein said rotating assembly rotates said wafer chuck at between about 5 revolutions per minute and about 5000 revolutions per minute.

53. The wafer chuck assembly of claim 51 wherein said rotating assembly comprises:
  a drive belt connected to said shaft; and
  a motor connected to said drive belt.

54. The wafer chuck assembly of claim 51 further comprising a bearing disposed between said shaft and said bracket.

55. The wafer chuck assembly of claim 51 further comprising a slip-ring assembly connected to said bracket.

56. The wafer chuck assembly of claim 55 wherein said slip-ring assembly is configured to deliver an electric charge to said shaft.

57. The wafer chuck assembly of claim 56 wherein said slip-ring assembly comprises a brush assembly configured to apply the electric charge to said shaft while said shaft is rotating.

58. The wafer chuck assembly of claim 55 wherein said slip-ring assembly is configured to deliver a vacuum and/or a reduced pressure gas and/or a pressurized gas into at least one inlet formed in said shaft.

59. The wafer chuck assembly of claim 58 wherein said slip-ring assembly comprises:
  at least one inlet formed in said slip-ring assembly; and
  a plurality of seals disposed between said slip-ring assembly and said shaft to form at least one sealed cavity between said inlet formed in said slip-ring and said inlet formed in said shaft.

60. A wafer chuck assembly for holding a wafer comprising:
  a wafer chuck having a top section and a bottom section; and
  an actuator assembly configured to move said wafer chuck between a loading position and a processing position, wherein said top section and bottom section are separated to open said wafer chuck when in said loading position, and are engaged to close said wafer chuck when in said processing position.

61. The wafer chuck assembly of claim 60 further comprising a spring assembly configured to separate and to engage said top section and bottom section.

62. The wafer chuck assembly of claim 61, wherein each of said spring assembly comprises:
  a rod having a first and a second end, said first end engaged to said bottom section;
  a spring disposed between said second end of said rod and said top section.

63. The wafer chuck assembly of claim 62, wherein said spring extends to engage said top section with said bottom section when said wafer chuck is moved to said processing position, and wherein said rod separates said top section from said bottom section to compress said spring between said second end of said rod and said top section when said wafer chuck is moved to said loading position.

64. The wafer chuck assembly of claim 63, wherein said wafer chuck further comprises a vacuum chamber formed between said top section and bottom section.

65. The wafer chuck assembly of claim 64, wherein said top section is configured with a vacuum line to apply a vacuum and/or a reduced pressure gas to said vacuum chamber when said wafer chuck is in said processing position.

66. The wafer chuck assembly of claim 60 further comprising:
  a shaft having a first and a second end, said first end fixed to said top section; and
  a bracket connected to said second end of said shaft.

67. The wafer chuck assembly of claim 66, wherein said actuator assembly comprises:
  a guide rail;
  a lead screw connected to said bracket;
  a motor connected to said lead screw, wherein said motor turns said lead screw to move said bracket along said guide rail.

68. The wafer chuck assembly of claim 67, wherein said actuator assembly, further comprises:
  a second bracket connected between said first bracket and said lead screw; and
  a plurality of joints disposed between said first bracket and said second bracket.

69. The wafer chuck assembly of claim 68, wherein said plurality of joints are universal joints.

70. The wafer chuck assembly of claim 66 further comprising a rotating assembly configured to rotate said wafer chuck.

71. The wafer chuck assembly of claim 70 wherein said rotating assembly rotates said wafer chuck at between about 5 revolutions per minute and about 5000 revolutions per minute.

72. The wafer chuck assembly of claim 70 wherein said rotating assembly comprises:
  a drive belt connected to said shaft; and
  a motor connected to said drive belt.

73. The wafer chuck assembly of claim 70 further comprising a bearing disposed between said shaft and said bracket.

74. The wafer chuck assembly of claim 70 further comprising a slip-ring assembly.

75. The wafer chuck assembly of claim 74 wherein said slip-ring assembly is connected to said bracket.

76. The wafer chuck assembly of claim 74 wherein said slip-ring assembly is configured to deliver an electric charge to said shaft.

77. The wafer chuck assembly of claim 76 wherein said slip-ring assembly comprises a brush assembly configured to apply the electric charge to said shaft while said shaft is rotating.

78. The wafer chuck assembly of claim 74 wherein said slip-ring assembly is configured to deliver a vacuum and/or reduced pressure gas and/or a pressurized gas into at least one inlet formed in said shaft.

79. The wafer chuck assembly of claim 78 wherein said slip-ring assembly comprises:
   at least one inlet formed in said slip-ring assembly;
   a plurality of seals disposed between said slip-ring assembly and said shaft to form at least one sealed cavity between said inlet formed in said slip-ring and said inlet formed in said shaft.

80. A wafer chuck assembly for holding a wafer comprising:
   a wafer chuck;
   a spring assembly configured to open and to close said wafer chuck; and
   an actuator assembly configured to move said wafer chuck between a first and a second position, wherein said spring assembly opens said wafer chuck when said wafer chuck is moved to said first position and closes said wafer chuck when said wafer chuck is moved to said second position.

81. The wafer chuck assembly of claim 80, wherein said wafer chuck comprises:
   a top section; and
   a bottom section having an opening to expose the surface of the wafer when held between said top section and said bottom section.

82. The wafer chuck assembly of claim 81, wherein said spring assembly comprises:
   a rod having a first and a second end, said first end fixed to said bottom section; and
   a spring disposed between said second end of said rod and said top section.

83. The wafer chuck assembly of claim 82 further comprising:
   a shaft having a first and a second end, said first end coupled to said top section; and
   a bracket connected to said second end of said shaft.

84. The wafer chuck assembly of claim 83, wherein said actuator assembly comprises:
   a guide rail;
   a lead screw connected to said bracket;
   a motor connected to said lead screw, wherein said motor turns said lead screw to move said bracket along said guide rail.

85. The wafer chuck assembly of claim 84, wherein said actuator assembly further comprises:
   a second bracket connected between said first bracket and said lead screw; and
   a plurality of joints disposed between said first bracket and said second bracket.

86. The wafer chuck assembly of claim 85, wherein said plurality of joints are universal joints.

87. The wafer chuck assembly of claim 83 further comprising a lid disposed between said top section and said bracket, said lid having a shaft hole to permit said shaft to slide relative to said lid when said wafer chuck is moved between said first position and said second position.

88. The wafer chuck assembly of cl wherein said second end of said rod contacts said lid when said wafer chuck is moved to said first position to stop the movement of said bottom section while said top section continues to move relative to said bottom section by compressing said spring between said top section and said second end of said rod.

89. The wafer chuck assembly of claim 83 further comprising a rotating assembly configured to rotate said wafer chuck.

90. The wafer chuck assembly of claim 89 wherein said rotating assembly rotates said wafer chuck at between about 5 revolutions per minute and about 5000 revolutions per minute.

91. The wafer chuck assembly of claim 89 wherein said rotating assembly comprises:
   a drive belt connected to said shaft; and
   a motor connected to said drive belt.

92. The wafer chuck assembly of claim 89 further comprising a bearing disposed between said shaft and said bracket.

93. The wafer chuck assembly of claim 89 further comprising a slip-ring assembly.

94. The wafer chuck assembly of claim 93 wherein said slip-ring assembly is connected to said bracket.

95. The wafer chuck assembly of claim 93 wherein said slip-ring assembly is configured to deliver an electric charge to said shaft.

96. The wafer chuck assembly of claim 95 wherein said slip-ring assembly comprises a brush assembly configured to apply the electric charge to said shaft while said shaft is rotating.

97. The wafer chuck assembly of claim 93 wherein said slip-ring assembly is configured to deliver a vacuum, reduced pressure gas, and/or a pressurized gas into at least one inlet formed in said shaft.

98. The wafer chuck assembly of claim 97 wherein said slip-ring assembly comprises:
   at least one inlet formed in said slip-ring assembly;
   a plurality of seals disposed between said slip-ring assembly and said shaft to form at least one sealed cavity between said inlet formed in said slip-ring and said inlet formed in said shaft.

99. The wafer chuck assembly of claim 97 wherein said shaft is formed with at least one channel to carry vacuum, reduced pressure gas, or pressurized gas from said at least one inlet in said shaft to said top section.

100. An electroplating and/or electropolishing cell for electroplating and/or electropolishing a wafer in an electrolyte solution comprising:
   a wafer chuck for holding the wafer;
   an electrolyte receptacle for receiving the electrolyte solution; and
   a wafer chuck assembly configured to move said wafer chuck between a first and a second position, wherein said wafer chuck is open when in said first position and closed when in said second position, wherein said wafer chuck is disposed within said electrolyte receptacle when in said second position.

101. The electroplating and/or electropolishing cell of claim 100, wherein said electrolyte receptacle comprises:
   a first section wall; and
   a second section wall, wherein said first and said second section walls divide said electrolyte receptacle into at least three sections.

102. The electroplating and/or electropolishing cell of claim 101 wherein said wafer chuck assembly positions said wafer chuck within said electrolyte receptacle such that a gap is formed between the wafer and said first and second section walls.

103. The electroplating and/or electropolishing cell of claim 102, wherein the electrolyte solution flows between said gap formed between the wafer and said first and second section walls.

104. The electroplating and/or electropolishing cell of claim 103, wherein said wafer chuck assembly positions the wafer level relative to the surface of the electrolyte solution.

105. The electroplating and/or electropolishing cell of claim 104, wherein said wafer chuck assembly further comprises a plurality of adjustment screws for adjusting the orientation of said wafer chuck relative to the surface of the electrolyte solution.

106. The electroplating and/or electropolishing cell of claim 100, wherein said wafer chuck comprises:
a top section; and
a bottom section having an opening to expose the surface of the wafer when held between said top section and said bottom section.

107. The electroplating and/or electropolishing cell of claim 106, wherein said wafer chuck further comprises a spring member disposed between said bottom section and the wafer, wherein said spring member is configured to apply an electric charge to the wafer.

108. The electroplating and/or electropolishing cell of claim 107, wherein said spring member contacts a portion of the outer perimeter of the wafer, such that the applied electric charge is distributed around the portion of the outer perimeter of the wafer.

109. The electroplating and/or electropolishing cell of claim 107, wherein said wafer chuck further comprises a conducting member disposed between said top section and said bottom section, wherein said conducting member is configured to apply an electric charge to said spring member.

110. The electroplating and/or electropolishing cell of claim 109, wherein said wafer chuck further comprises a seal member disposed between said bottom section and the wafer, wherein said seal member forms a seal between said bottom section and the wafer to isolate said spring member and said conducting member from the electrolyte solution.

111. The electroplating and/or electropolishing cell of claim 106, wherein said wafer chuck assembly further comprises a spring assembly configured to open and to close said wafer chuck.

112. The electroplating and/or electropolishing cell of claim 111, wherein said spring assembly comprises:
a rod having a first and a second end, said first end engaged to said bottom section; and
a spring disposed between said second end of said rod and said top section.

113. The electroplating and/or electropolishing cell of claim 112, wherein said rod separates said top section from said bottom section and said spring is compressed between said second end of said rod and said top section when said wafer chuck is moved to said first position.

114. The electroplating and/or electropolishing cell of claim 112, wherein said spring extends to engage said top section with said bottom section when said wafer chuck is moved to said second position.

115. The electroplating and/or electropolishing cell of claim 106, wherein said wafer chuck assembly further comprises:
a shaft having a first and a second end, said first end fixed to said top section;
a bracket connected to said second end of said shaft; and
an actuator assembly connected to said bracket for moving said wafer chuck between said first and said second position.

116. The electroplating and/or electropolishing cell of claim 115, wherein said actuator assembly comprises:
a guide rail;
a lead screw connected to said bracket; and
a motor connected to said lead screw, wherein said motor turns said lead screw to move said bracket along said guide rail.

117. The electroplating and/or electropolishing cell of claim 115, wherein said wafer chuck assembly further comprises a rotating assembly configured to rotate said wafer chuck.

118. The electroplating and/or electropolishing cell of claim 117, wherein said rotating assembly comprises:
a drive belt connected to said shaft; and
a motor connected to said drive belt.

119. The electroplating and/or electropolishing cell of claim 117, further comprising a slip-ring assembly connected to said bracket, wherein said shaft rotates within said slip-ring assembly.

120. The electroplating and/or electropolishing cell of claim 119, wherein said slip-ring assembly is configured to deliver an electric charge to said shaft.

121. The electroplating and/or electropolishing cell of claim 120, wherein said slip-ring assembly comprises a brush assembly configured to apply the electric charge to said shaft while said shaft is rotating.

122. The electroplating and/or electropolishing cell of claim 119, wherein said slip-ring assembly is configured to deliver a vacuum, reduced pressure gas, and/or pressurized gas into at least one inlet formed in said shaft.

123. The electroplating and/or electropolishing cell of claim 122, wherein said slip ring assembly comprises:
at least one inlet formed in said slip-ring assembly;
a plurality of seals disposed between said slip-ring assembly and said shaft to form at least one sealed cavity between said inlet formed in said slip-ring assembly and said inlet formed in said shaft.

124. The electroplating and/or electropolishing cell of claim 119, further comprising a first adjustment assembly configured to adjust the orientation of said bracket to slip-ring assembly.

125. The electroplating and/or electropolishing cell of claim 124, wherein the orientation of said bracket to said slip-ring is perpendicular.

126. The electroplating and/or electropolishing cell of claim 124, wherein said first adjustment assembly comprises:
a plurality of set screws; and
a plurality of adjustment screws.

127. The electroplating and/or electropolishing cell of claim 124, further comprising a second adjustment assembly configured to adjust the orientation of said shaft to said top section.

128. The electroplating and/or electropolishing cell of claim 127, wherein the orientation aid shaft to said top section perpendicular.

129. The electroplating and/or electropolishing cell of claim 128, wherein the centers lines of said top section, said shaft, and said slip-ring assembly are centered and co-axial.

130. The electroplating and/or electropolishing cell of claim 127, wherein said
second adjustment assembly comprises:
a set screw connecting said top section to said shaft, said set screw disposed at die center of said top section and said shaft; and
a plurality of adjustment screws connecting said top section to said shaft said plurality of adjustment screws disposed around said set screw.

131. The electroplating and/or electropolishing station of claim 106, wherein said wafer chuck further comprises a textured pad attached to said top section.

132. An electroplating and/or electropolishing station for electroplating and/or electropolishing a wafer comprising:
- a frame;
- at least one electroplating and/or electropolishing cell attached to said frame, said electroplating and/or electropolishing cell having an electrolyte solution receptacle and a lid suitably formed to cover said electrolyte solution receptacle; and
- a lid retraction assembly configured to move said lid between a first position and a second position, wherein said lid covers said electrolyte receptacle when in said first position and said lid is retracted from said electrolyte solution receptacle when in said second position.

133. The electroplating and/or electropolishing station of claim 132, wherein said electroplating and/or electropolishing cell further comprises:
- a wafer chuck for holding the wafer; and
- a wafer chuck assembly for moving said wafer chuck between a first and a second position when said lid is in said first position.

134. The electroplating and/or electropolishing station of claim 133, wherein said wafer chuck assembly opens said wafer chuck when said wafer chuck is in said first position and closes said wafer chuck when said wafer chuck is in said second position.

135. The electroplating and/or electropolishing station of claim 132 further comprising at least two electroplating and/or electropolishing cells.

136. The electroplating and/or electropolishing station of claim 135, wherein said at least two electroplating and/or electropolishing cells are stacked vertically on said frame.

137. The electroplating and/or electropolishing station of claim 132, wherein said lid retraction assembly comprises:
- a guide rail attached to said lid and said frame; and
- an actuator attached to said guide rail configured to move said lid between said first and said second position.

138. The electroplating and/or electropolishing station of claim 135, wherein said actuator is an air cylinder.

139. A method of holding a wafer during electroplating and/or electropolishing of the wafer, said method comprising:
- providing the wafer within a wafer chuck;
- moving the wafer chuck using said wafer chuck assembly between a first position and a second position, wherein said wafer chuck is open when in said first position and closed when in said second position, wherein said wafer chuck is disposed within an electrolyte solution receptacle when in said second position.

140. The method of claim 139 further comprising:
- applying an electrolyte solution to the wafer when said wafer chuck is in said second position; and
- applying an electric charge to the wafer when said wafer chuck is in said second position, wherein the charge is distributed around a portion of the outer perimeter of the wafer.

141. The method of claim 140, wherein said applying step further comprises the step of applying an electric charge to a compliant electrically conducting material, wherein said compliant electrically conducting material distributes the electric charge around the outer perimeter of the wafer.

142. The method of claim 141, wherein said spring member comprises a coil spring.

143. The method of claim 141, wherein said spring member comprises a plurality of coil springs.

144. The method of claim 141 further comprising the stop of sealing said complaint electrically conducting material from the electrolyte solution using a seal member prior to moving said wafer chuck to said second position.

145. The method of claim 144 further comprising the step of checking for leaks in the seal formed by said seal member prior to moving said wafer chuck to said second position.

146. The method of claim 144 further comprising the step of moving the wafer chuck to said-first position after applying said charge to electroplate and/or electropolish the wafer.

147. The method of claim 146 further comprising the step of injecting a dry gas to remove residual electrolyte solution from the wafer chuck after moving said wafer chuck to said first position.

148. The method of claim 146 further comprising the steps of:
- opening the wafer chuck to remove the wafer using said wafer chuck assembly; and
- removing the wafer from the wafer chuck.

149. The method of claim 148 further comprising the step of injecting a dry gas to remove residual electrolyte solution from the wafer chuck after removing the wafer from the wafer chuck.

150. The method of claim 141 further comprising the step of rotating the wafer chuck using said wafer chuck assembly.

* * * * *

UNITED STATES PATENT AND TRADEMARK OFFICE
CERTIFICATE OF CORRECTION

PATENT NO. : 6,726,823 B1
DATED : April 27, 2004
INVENTOR(S) : Wang et al.

It is certified that error appears in the above-identified patent and that said Letters Patent is hereby corrected as shown below:

<u>Column 26,</u>
Line 22, please replace "actuator assembly" with -- an actuator assembly --

Signed and Sealed this

Twenty-ninth Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,726,823 B1
DATED : April 27, 2004
INVENTOR(S) : Hui Wang et al.

It is certified that error appears in the above-identified patent and that said Letters Patent is hereby corrected as shown below:

Title page,
Item [60], Related U.S. Application Data, "60/110,136" should read -- 60/110,134. --.

Signed and Sealed this

Thirty-first Day of January, 2006

JON W. DUDAS
*Director of the United States Patent and Trademark Office*